US012695582B2

(12) United States Patent
Gao et al.

(10) Patent No.: US 12,695,582 B2
(45) Date of Patent: Jul. 28, 2026

(54) METHOD, DEVICE AND COMPUTER STORAGE MEDIUM FOR BEAM MANAGEMENT IN COMMUNICATION USING TRANSMISSION CONFIGURATION INDICATOR STATES

(71) Applicant: NEC CORPORATION, Tokyo (JP)

(72) Inventors: Yukai Gao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 377 days.

(21) Appl. No.: 18/285,152

(22) PCT Filed: Apr. 2, 2021

(86) PCT No.: PCT/CN2021/085400
§ 371 (c)(1),
(2) Date: Sep. 29, 2023

(87) PCT Pub. No.: WO2022/205455
PCT Pub. Date: Oct. 6, 2022

(65) Prior Publication Data
US 2024/0187199 A1 Jun. 6, 2024

(51) Int. Cl.
*H04L 5/00* (2006.01)
*H04W 72/232* (2023.01)

(52) U.S. Cl.
CPC .......... *H04L 5/0094* (2013.01); *H04L 5/0053* (2013.01); *H04W 72/232* (2023.01)

(58) Field of Classification Search
CPC ... H04L 5/0094; H04L 5/0053; H04L 5/0044; H04W 72/232; H04W 72/23; H04W 72/12; H04B 7/0639; H04B 7/0665; H04B 7/088
See application file for complete search history.

(56) References Cited

U.S. PATENT DOCUMENTS

2016/0344526 A1* 11/2016 Fan ........................ H04L 5/0048
2019/0141693 A1* 5/2019 Guo ....................... H04L 5/0053
(Continued)

FOREIGN PATENT DOCUMENTS

| CN | 112544048 A | 3/2021 |
|---|---|---|
| CN | 112586038 A | 3/2021 |
| WO | 2020/142900 A1 | 7/2020 |

OTHER PUBLICATIONS

Communication issued Jul. 1, 2025 in Japanese Application No. 2023-560928.
(Continued)

*Primary Examiner* — Kiet Tang
(74) *Attorney, Agent, or Firm* — Sughrue Mion, PLLC

(57) ABSTRACT

Embodiments of the present disclosure relate to methods, devices and computer storage media for communication. According to embodiments of the present disclosure, a downlink control information (DCI) indicating a transmission configuration indication (TCI) state is transmitted from a network device to a terminal device. The terminal device applies, based on a first association, the TCI state for receiving a physical downlink shared channel (PDSCH) which is scheduled by the DCI from the network device. The terminal device applies, based on a time threshold and a second association, the TCI state for receiving a physical downlink control channel (PDCCH) transmitted from the network device. As such, a common beam used for PDCCH and PDSCH, which is indicated by a common TCI state, can be updated and the updated beam can be applied for PDCCH and PDSCH transmission/reception in case of multi-TRP transmission.

12 Claims, 17 Drawing Sheets

(56) References Cited

U.S. PATENT DOCUMENTS

| 2019/0268053 A1* | 8/2019 | John Wilson | ........ H04B 7/0634 |
| 2020/0100277 A1 | 3/2020 | Khoshnevisan et al. | |
| 2020/0106645 A1* | 4/2020 | Tsai | ...................... H04B 7/022 |
| 2020/0153497 A1 | 5/2020 | Tsai et al. | |

OTHER PUBLICATIONS

"Enhancement on multi-beam operation", Futurewei, 3GPP TSG RAN WG1 Meeting #105-e, R1-2104205, May 19-27, 2021 (11 pages total).
"Work plan on Rel-17 FeMIMO RRM and LS discussion", Nokia, Nokia Shanghai Bell, 3GPP TSG-RAN WG4 Meeting #99-e, R4-2110018, May 19-27, 2021 (13 pages total).
"Further details on Multi-beam and Multi-TRP operation", ZTE, 3GPP TSG RAN WG1 Meeting #104b-e, R1-2102667, Apr. 12-20, 2021 (18 pages total).
3GPP TSG-RAN WG1#104-e, "Multi-beam Enhancements", R1-2101414, Feb. 5, 2021, pp. 1-5.
International Search Report for PCT/CN2021/085400 dated Jan. 5, 2022.
Written Opinion for PCT/CN2021/085400 dated Jan. 5, 2022.

* cited by examiner

TCI state
1-1

PDCCH
311

TCI state
2-1

PDCCH
321

TCI state
2-2

PDCCH
322

TCI state 3-1                TCI state 3-2

PDCCH
331

PDCCH
332

TCI state 4-1     TCI state 4-2

PDCCH
341

TC1        TC2

Communication
411

TC1

Communication
421

TC2

Communication
422

TC1

Communication
431

TC2

Communication
432

Frequency

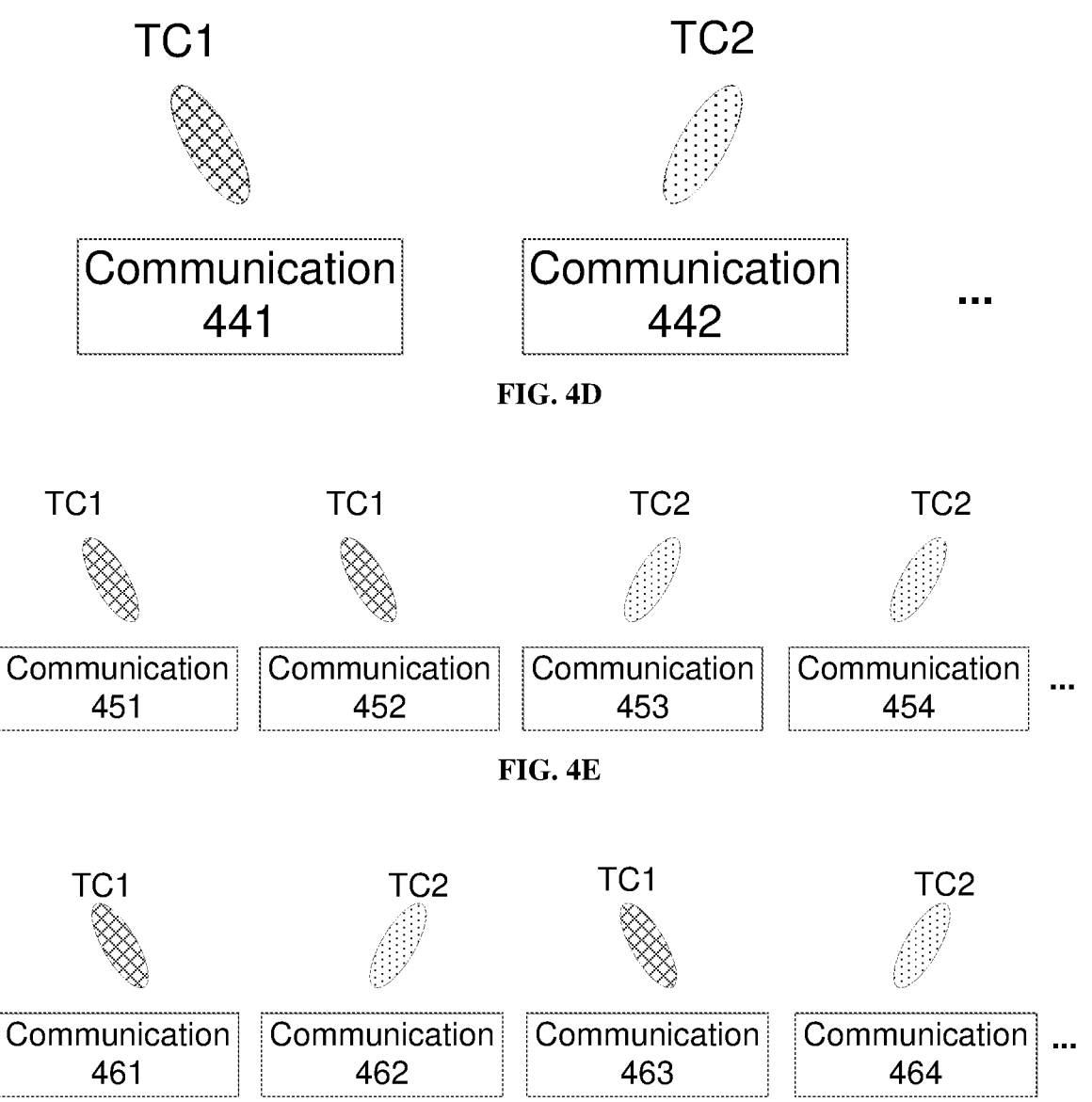

Associated

METHOD, DEVICE AND COMPUTER STORAGE MEDIUM FOR BEAM MANAGEMENT IN COMMUNICATION USING TRANSMISSION CONFIGURATION INDICATOR STATES

CROSS REFERENCE TO RELATED APPLICATIONS

This application is a National Stage of International Application No. PCT/CN2021/085400 filed Apr. 2, 2021.

TECHNICAL FIELD

Embodiments of the present disclosure generally relate to the field of telecommunication, and in particular, to methods, devices and computer storage media for communication.

BACKGROUND

In the 3GPP meeting RAN#86, it is agreed to support enhancement on multi-beam operation, mainly targeting the frequency range 2 (FR2) while also applicable to the frequency range 1 (FR1). It is agreed to identify and specify features to facilitate more efficient (lower latency and overhead) downlink (DL) and uplink (UL) beam management. For example, it is proposed to support common beam(s) for data and control information transmission/reception for both DL and UL, especially for intra-band carrier aggregation (CA). It is also proposed to support a unified Transmission Configuration Indication (TCI) framework for DL and UL beam indication. However, the current 3GPP specifications provide no details on the common beam(s) for data and control information transmission/reception.

SUMMARY

In general, example embodiments of the present disclosure provide methods, devices and computer storage media for beam management.

In a first aspect, there is provided a method of communication. The method comprises receiving, at a terminal device from a network device, a downlink control information (DCI) for scheduling a physical downlink shared channel (PDSCH), wherein the DCI comprises an indication of at least one of a first transmission configuration indicator (TCI) state and a second TCI state, and receiving, the PDSCH with at least one of a third TCI state and a fourth TCI state based on an association.

In a second aspect, there is provided a method of communication. The method comprises transmitting, from a network device to a terminal device, a downlink control information (DCI) for scheduling a physical downlink shared channel (PDSCH), wherein the DCI comprises an indication of at least one of a first transmission configuration indicator (TCI) state and a second TCI state; and transmitting, the PDSCH with at least one of a third TCI state and a fourth TCI state based on an association.

In a third aspect, there is provided a method of communication. The method comprises receiving, at a terminal device from a network device, a downlink control information (DCI) with an indication of at least one of a first transmission configuration indicator (TCI) state and a second TCI state; and receiving, after a timing, a first physical downlink control channel (PDCCH) with at least one of the first TCI state and the second TCI state based on an association.

In a fourth aspect, there is provided a method of communication. The method comprises transmitting, from a network device to a terminal device, a downlink control information (DCI) with an indication of at least one of a first transmission configuration indicator (TCI) state and a second TCI state; and transmitting, after a timing, a first physical downlink control channel (PDCCH) with at least one of the first TCI state and the second TCI state based on an association.

In a fifth aspect, there is provided a terminal device. The terminal device comprises a processor and a memory coupled to the processor. The memory stores instructions that when executed by the processor, cause the terminal device to perform the method according to the first aspect or the third aspect.

In a sixth aspect, there is provided a network device. The network device comprises a processor and a memory coupled to the processor. The memory stores instructions that when executed by the processor, cause the network device to perform the method according to the second aspect or the fourth aspect.

In a seventh aspect, there is provided a computer program product that is stored on a computer readable medium and includes machine-executable instructions. The machine-executable instructions, when being executed, cause a machine to perform the method according to the above first or third aspect.

In an eighth aspect, there is provided a computer program product that is stored on a computer readable medium and includes machine-executable instructions. The machine-executable instructions, when being executed, cause a machine to perform the method according to the above second or fourth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein:

FIGS. 4A-4F illustrate examples of communications in accordance with some embodiments of the present disclosure;

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the singular forms 'a', 'an' and 'the' are intended to include the plural forms as well, unless the context clearly indicates otherwise. The term 'includes' and its variants are to be read as open terms that mean 'includes, but is not limited to.' The term 'based on' is to be read as 'at least in part based on.' The term 'some embodiments' and 'an embodiment' are to be read as 'at least some embodiments.' The term 'another embodiment' is to be read as 'at least one other embodiment.' The terms 'first,' 'second,' and the like may refer to different or same objects. Other definitions, explicit and implicit, may be included below.

In some examples, values, procedures, or apparatus are referred to as 'best,' 'lowest,' 'highest,' 'minimum,' 'maximum,' or the like. It will be appreciated that such descriptions are intended to indicate that a selection among many used functional alternatives can be made, and such selections need not be better, smaller, higher, or otherwise preferable to other selections.

In the 3GPP meeting RAN#86, it is agreed to support enhancement on multi-beam operation, mainly targeting FR2 while also applicable to FR1. It is agreed to identify and specify features to facilitate more efficient (lower latency and overhead) DL and UL beam management. For example, it is proposed to support common beam(s) for data and control information transmission/reception for both DL and UL, especially for intra-band CA. It is also proposed to support a unified TCI framework for DL and UL beam indication. However, the current 3GPP specifications provide no details on the common beam(s) for data and control information transmission/reception. For example, it is unclear how to update the common beam used for PDCCH and PDSCH and when to apply the updated beam. It is unclear how to ensure the common beam is updated successfully. In addition, it is unclear the impact of such update of the common beam on beam failure detection.

Principle and implementations of the present disclosure will be described in detail below with reference to FIG. 1-10.

Figure 1:
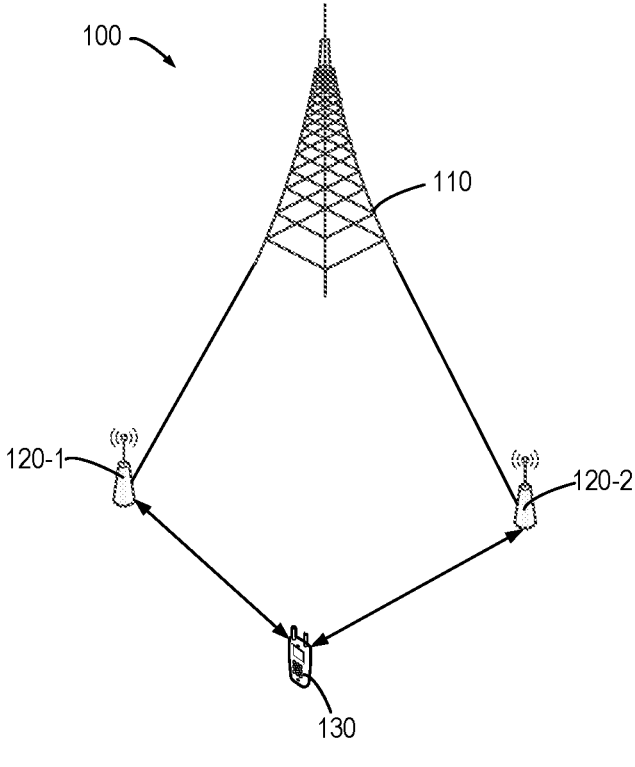
FIG. 1 illustrates an example communication network in which embodiments of the present disclosure can be implemented.

FIG. 1 illustrates an example communication network 100 in which embodiments of the present disclosure can be implemented. As shown in FIG. 1, the network 100 includes a network device 110. For example, the network device 110 may be configured with two TRPs/panels 120-1 and 120-2 (collectively referred to as TRPs 120 or individually referred to as TRP 120). The network 100 also includes a terminal device 130 served by the network device 110. It is to be understood that the number of network devices, terminal devices and TRPs as shown in FIG. 1 is only for the purpose of illustration without suggesting any limitations to the present disclosure. The network 100 may include any suitable number of devices adapted for implementing embodiments of the present disclosure.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices. machine type communication (MTC) devices, Ultra-Reliable Low latency Communication (URLLC) devices, device on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like. For the purpose of discussion, in the following, some embodiments will be described with reference to UE as an example of the terminal device 130.

As used herein, the term 'network device' or 'base station' (BS) refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB), a Transmission Reception Point (TRP), a Remote Radio Unit (RRU), a radio head (RH), a remote radio head (RRH), a low power node such as a femto node, a pico node, and the like. The term "TRP" refers to an antenna array (with one or more antenna elements) available to the network device located at a specific geographical location. For example, a network device may be coupled with multiple TRPs in different geographical locations to achieve better coverage. It is to be understood that the TRP can also be referred to as a "panel", which also refers to an antenna array (with one or more antenna elements) or a group of antennas.

In one embodiment, the terminal device 130 may be connected with a first network device and a second network device (not shown in FIG. 1). One of the first network device and the second network device may be in a master node and the other one may be in a secondary node. The first network device and the second network device may use different radio access technologies (RATs). In one embodiment, the first network device may be a first RAT device and the second network device may be a second RAT device. In one embodiment, the first RAT device may be an eNB and the second RAT device is a gNB. Information related to different RATs may be transmitted to the terminal device 130 from at least one of the first network device and the second network device. In one embodiment, first information may be transmitted to the terminal device 130 from the first network device and second information may be transmitted to the terminal device 130 from the second network device directly or via the first network device. In one embodiment, information related to configuration for the terminal device configured by the second network device may be transmitted from the second network device via the first network device. Information related to reconfiguration for the terminal device configured by the second network device may be transmitted to the terminal device from the second network device directly or via the first network device. The information may be transmitted via any of the following: Radio Resource Control (RRC) signaling, Medium Access Control (MAC) control element (CE) or Downlink Control Information (DCI).

In the communication network 100, the network device 110 can communicate data and control information to the terminal device 130 and the terminal device 130 can also communication data and control information to the network device 110. A link from the network device 110 to the terminal device 130 is referred to as a downlink (DL), while a link from the terminal device 130 to the network device 110 is referred to as an uplink (UL).

The communications in the network 100 may conform to any suitable standards including, but not limited to, Global System for Mobile Communications (GSM), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), Machine Type Communication (MTC) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

As shown in FIG. 1, the network device 110 may communicate with the terminal device 130 via the TRPs 120-1 and 120-2. In the following text, the TRP 120-1 may be also referred to as the first TRP, while the TRP 120-2 may be also referred to as the second TRP. Each of the TRPs 120 may provide a plurality of beams for communication with the terminal device 130.

In some embodiments, the first and second TRPs 120 may be explicitly associated with different higher-layer configured identities. For example, a higher-layer configured identity can be associated with a pre-defined Control Resource Set (CORESET), a pre-defined reference signal (RS), or a pre-defined Transmission Configuration Indication (TCI) state, which is used to differentiate between transmissions between different TRPs 120 and the terminal device 130. When the terminal device 130 receives two DCIs from two CORESETs which are associated with different higher-layer configured identities, the two DCIs are indicated from different TRPs. Further, the first and second TRPs 120 may be implicitly identified by a dedicated configuration to the physical channels or signals. For example, a dedicated CORESET, a RS, and a TCI state, which are associated with a TRP, are used to identify a transmission from a different TRP to the terminal device 130. For example, when the terminal device 130 receives a DCI from a dedicated CORESET, the DCI is indicated from the associated TRP dedicated by the CORESET.

In the repeated transmission or reception via the two TRPs 120, the network device 110 may select a repetition scheme from among a number of available repetition schemes. The repetition scheme may specify a transmission manner for the network device 110 to use the two TRPs 120 cooperatively, for example, a multiplexing scheme between the two TRPs 120, the respective resource allocations for the two TRPs 120, or the like.

For example, schemes for multi-TRP/multi-panel based URLLC, scheduled by single downlink control information (DCI) at least, may be as following.

Scheme 1 (SDM): n (n<=$N_s$) TCI states within the single slot, with overlapped time and frequency resource allocation.

Scheme 1a: Each transmission occasion is a layer or a set of layers of the same transport block (TB), with each layer or layer set is associated with one TCI and one set of DMRS port(s). Single codeword with one RV is used across all spatial layers or layer sets. From the UE perspective, different coded bits are mapped to different layers or layer sets with the same mapping rule as in Rel-15.

Scheme 1b: Each transmission occasion is a layer or a set of layers of the same TB, with each layer or layer set is associated with one TCI and one set of DMRS port(s). Single codeword with one RV is used for each spatial layer or layer set. The RVs corresponding to each spatial layer or layer set can be the same or different. Codeword-to-layer mapping when total number of layers <=4 is for future study.

Scheme 1c: One transmission occasion is one layer of the same TB with one DMRS port associated with multiple TCI state indices, or one layer of the same TB with multiple DMRS ports associated with multiple TCI state indices one by one.

In addition, it is indicated that applying different MCS/modulation orders for different layers or layer sets can be discussed.

Scheme 2 (FDM): n (n<=$N_f$) TCI states are within the single slot, with non-overlapped frequency resource allocation. Each non-overlapped frequency resource allocation is associated with one TCI state. Same single/multiple DMRS port(s) are associated with all non-overlapped frequency resource allocations.

Scheme 2a: Single codeword with one RV is used across full resource allocation. From UE perspective, the common RB mapping (codeword to layer mapping as in Rel-15) is applied across full resource allocation. In some embodiments, a terminal device may be configured or set with FDMschemeA by a high layer parameter. For example, the high layer parameter may be an RRC parameter. For example, the high layer parameter may be URLLCSchemeEnabler.

Scheme 2b: Single codeword with one RV is used for each non-overlapped frequency resource allocation. The RVs corresponding to each non-overlapped frequency resource allocation can be the same or different. In some embodiments, a terminal device may be configured or set with FDMschemeB by a high layer parameter. For example, the high layer parameter may be an RRC parameter. For example, the high layer parameter may be URLLCSchemeEnabler.

In addition, it is indicated that applying different MCS/modulation orders for different non-overlapped frequency resource allocations can be discussed. It is also indicated that details of frequency resource allocation mechanism for FDM 2a/2b with regarding to allocation granularity, time domain allocation can be discussed.

Scheme 3 (TDM or intra-slot repetition): n (n<=$N_{t1}$) TCI states within the single slot, with non-overlapped time resource allocation. Each transmission occasion of the TB has one TCI and one RV with the time granularity of mini-slot. All transmission occasion (s) within the slot use a common MCS with same single or multiple DMRS port(s).

RV/TCI state can be same or different among transmission occasions. Channel estimation interpolation across mini-slots with the same TCI index is for future study. In some embodiments, a terminal device may be configured or set with TDMschemeA by a high layer parameter. For example, the high layer parameter may be an RRC parameter. For example, the high layer parameter may be URLLCSchemeEnabler.

Scheme 4 (TDM or inter-slot repetition): n ($n<=N_{r2}$) TCI states with K ($n<=K$) different slots. Each transmission occasion of the TB has one TCI and one RV. All transmission occasion (s) across K slots use a common MCS with same single or multiple DMRS port(s). RV/TCI state can be same or different among transmission occasions. Channel estimation interpolation across slots with the same TCI index is for future study.

In addition, before transmitting data (such as, via the TRP 120-1 and/or 120-2) to the terminal device 130, the network device 110 may transmit control information associated with the transmission of the data. For example, the control information can schedule a set of resources for the transmission of the data and indicate various transmission parameters related to the transmission of the data, such as, one or more TCI states, a Frequency Domain Resource Assignment (FDRA), a Time Domain Resource Assignment (TDRA) which may include a slot offset and a start/length indicator value, a Demodulation Reference Signal (DMRS) group, a Redundancy Version (RV), as defined in the 3GPP specifications. It is to be understood that the transmission parameters indicated in the control information 135 are not limited to the ones as listed above. Embodiments of the present disclosure may equally applicable to control information including any transmission parameters.

In the following, the terms "transmission occasions", "reception occasions", "repetitions", "transmission", "reception", "PDSCH transmission occasions", "PDSCH repetitions", "PUSCH transmission occasions", "PUSCH repetitions", "PUCCH occasions", "PUCCH repetitions", "repeated transmissions", "repeated receptions", "PDSCH transmissions", "PDSCH receptions", "PUSCH transmissions", "PUSCH receptions", "PUCCH transmissions", "PUCCH receptions", "RS transmission", "RS reception", "communication", "transmissions" and "receptions" can be used interchangeably. The terms "TCI state", "set of QCL parameter(s)", "QCL parameter(s)", "QCL assumption" and "QCL configuration" can be used interchangeably. The terms "TCI field", "TCI state field", and "transmission configuration indication" can be used interchangeably. The terms "transmission occasion", "transmission", "repetition", "reception", "reception occasion", "monitoring occasion", "PDCCH monitoring occasion", "PDCCH transmission occasion", "PDCCH transmission", "PDCCH candidate", "PDCCH reception occasion", "PDCCH reception", "search space", "CORESET", "multi-chance" and "PDCCH repetition" can be used interchangeably. In the following, the terms "PDCCH repetitions", "repeated PDCCHs", "repeated PDCCH signals", "PDCCH candidates configured for same scheduling", "PDCCH", "PDCCH candidates" and "linked PDCCH candidates" can be used interchangeably. The terms "DCI" and "DCI format" can be used interchangeably. In some embodiments, the embodiments in this disclosure can be applied to PDSCH and PUSCH scheduling, and in the following, PDSCH scheduling is described as examples. For example, the embodiments in this disclosure can be applied to PUSCH by replacing "transmit" to "receive" and/or "receive" to "transmit". The terms "PDSCH" and "PUSCH"

can be used interchangeably. The terms "transmit" and "receive" can be used interchangeably.

As specified in the 3GPP specifications (TS 38.214), a UE can be configured with a list of up to M TCI-State configurations within the higher layer parameter PDSCH-Config to decode PDSCH according to a detected PDCCH with DCI intended for the UE and the given serving cell, where M depends on the UE capability maxNumberConfiguredT-CIstatesPerCC. Each TCI-State contains parameters for configuring a quasi co-location relationship between one or two downlink reference signals and the DMRS ports of the PDSCH, the DMRS port of PDCCH or the channel state information reference signal (CSI-RS) port(s) of a CSI-RS resource. The quasi co-location relationship is configured by the higher layer parameter qcl-Type1 for the first downlink (DL) RS, and qcl-Type2 for the second DL RS (if configured). For the case of two DL RSs, the QCL types shall not be the same, regardless of whether the references are to the same DL RS or different DL RSs. The quasi co-location types corresponding to each DL RS are given by the higher layer parameter qcl-Type in QCL-Info and may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

The UE receives an activation command, as described in clause "TCI States Activation/Deactivation for UE-specific PDSCH MAC CE" (for example, clause 6.1.3.14) of [TS 38.321] or in clause "Enhanced TCI States Activation/Deactivation for UE-specific PDSCH MAC CE" (for example, clause 6.1.3) of [TS 38.321], used to map up to 8 TCI states to the codepoints of the DCI field 'Transmission Configuration Indication' in one CC/DL BWP or in a set of CCs/DL BWPs, respectively. When a set of TCI state IDs are activated for a set of CCs/DL BWPs, where the applicable list of CCs is determined by indicated CC in the activation command, the same set of TCI state IDs are applied for all DL BWPs in the indicated CCs.

When a UE supports two TCI states in a codepoint of the DCI field 'Transmission Configuration Indication' the UE may receive an activation command, as described in clause "TCI States Activation/Deactivation for UE-specific PDSCH MAC CE" or clause "Enhanced TCI States Activation/Deactivation for UE-specific PDSCH MAC CE" (for example, clause 6.1.3.14 or subclause under 6.1.3) of [TS 38.321], the activation command is used to map up to 8 combinations of one or two TCI states to the codepoints of the DCI field 'Transmission Configuration Indication'. The UE is not expected to receive more than 8 TCI states in the activation command.

When the DCI field 'Transmission Configuration Indication' is present in DCI format 1_2 and when the number of codepoints S in the DCI field 'Transmission Configuration Indication' of DCI format 1_2 is smaller than the number of TCI codepoints that are activated by the activation command, as described in clause 6.1.3.14 and 6.1.3.24 of [10, TS38.321], only the first S activated codepoints are applied for DCI format 1_2.

When the UE would transmit a PUCCH with HARQ-ACK information in slot n corresponding to the PDSCH carrying the activation command, the indicated mapping between TCI states and codepoints of the DCI field 'Transmission Configuration Indication' should be applied starting from the first slot that is after $$\text{slot } n + 3N_{slot}^{subframe,\mu}$$

where μ is the SCS configuration for the PUCCH. If tci-PresentInDCI is set to 'enabled' or tci-PresentDCI-1-2 is configured for the CORESET scheduling the PDSCH, and the time offset between the reception of the DL DCI and the corresponding PDSCH is equal to or greater than timeDurationForQCL if applicable, after a UE receives an initial higher layer configuration of TCI states and before reception of the activation command, the UE may assume that the DM-RS ports of PDSCH of a serving cell are quasi co-located with the SS/PBCH block determined in the initial access procedure with respect to qcl-Type set to 'typeA', and when applicable, also with respect to qcl-Type set to 'typeD'.

In some embodiments, if a UE is configured with the higher layer parameter tci-PresentInDCI that is set as 'enabled' or tci-PresentInDCI-ForFormat1_2 is configured for the CORESET scheduling the PDSCH, the UE assumes that the TCI field is present in the DCI (for example DCI format 1_1 or DCI format 1_2) of the PDCCH transmitted on the CORESET. If tci-PresentInDCI or tci-PresentInDCI-ForFormat1_2 is not configured for the CORESET scheduling the PDSCH or the PDSCH is scheduled by a DCI (for example, DCI format 1_0), the UE assumes that the TCI field is not present in the DCI (for example DCI format 1_1 or DCI format 1_2 or DCI format 1_0) of the PDCCH transmitted on the CORESET. If the PDSCH is scheduled by a DCI format not having the TCI field present, and the time offset between the reception of the DL DCI and the corresponding PDSCH of a serving cell is equal to or greater than a threshold timeDurationForQCL if applicable, where the threshold is based on reported UE capability [13, TS 38.306], for determining PDSCH antenna port quasi co-location, the UE assumes that the TCI state or the QCL assumption for the PDSCH is identical to the TCI state or QCL assumption whichever is applied for the CORESET used for the PDCCH transmission within the active BWP of the serving cell.

If tci-PresentInDCI is set to "enabled" or tci-PresentInDCI-ForFormat1_2 is configured for the CORESET scheduling the PDSCH, and the time offset between the reception of the DL DCI and the corresponding PDSCH is equal to or greater than timeDurationForQCL if applicable, after a UE receives an initial higher layer configuration of TCI states and before reception of the activation command, the UE may assume that the DMRS ports of PDSCH of a serving cell are quasi co-located with the SS/PBCH block determined in the initial access procedure with respect to 'QCL-TypeA', and when applicable, also with respect to 'QCL-TypeD'. The value of timeDurationForQCL is based on reported UE capability.

If a UE is configured with the higher layer parameter tci-PresentInDCI that is set as 'enabled' for the CORESET scheduling the PDSCH, the UE assumes that the TCI field is present in the DCI (for example, DCI format 1_1) of the PDCCH transmitted on the CORESET. If a UE is configured with the higher layer parameter tci-PresentInDCI-ForFormat1_2 for the CORESET scheduling the PDSCH, the UE assumes that the TCI field with a DCI field size indicated by tci-PresentInDCI-ForFormat1_2 is present in the DCI (for example, DCI format 1_2) of the PDCCH transmitted on the CORESET. If the PDSCH is scheduled by a DCI format not having the TCI field present, and the time offset between the reception of the DL DCI and the corresponding PDSCH is equal to or greater than a threshold timeDurationForQCL if applicable, where the threshold is based on reported UE capability [TS 38.306], for determining PDSCH antenna port quasi co-location, the UE assumes that the TCI state or the QCL assumption for the PDSCH is identical to the TCI state or QCL assumption whichever is applied for the CORESET used for the PDCCH transmission within the active BWP of the serving cell.

If the PDSCH is scheduled by a DCI format having the TCI field present, the TCI field in DCI in the scheduling component carrier points to the activated TCI states in the scheduled component carrier or DL BWP, the UE shall use the TCI-State according to the value of the 'Transmission Configuration Indication' field in the detected PDCCH with DCI for determining PDSCH antenna port quasi co-location. The UE may assume that the DM-RS ports of PDSCH of a serving cell are quasi co-located with the RS(s) in the TCI state with respect to the QCL type parameter(s) given by the indicated TCI state if the time offset between the reception of the DL DCI and the corresponding PDSCH is equal to or greater than a threshold timeDurationForQCL, where the threshold is based on reported UE capability [TS 38.306]. When the UE is configured with a single slot PDSCH, the indicated TCI state should be based on the activated TCI states in the slot with the scheduled PDSCH. When the UE is configured with a multi-slot PDSCH, the indicated TCI state should be based on the activated TCI states in the first slot with the scheduled PDSCH, and UE shall expect the activated TCI states are the same across the slots with the scheduled PDSCH. When the UE is configured with CORESET associated with a search space set for cross-carrier scheduling, and the PDCCH carrying the scheduling DCI and the PDSCH scheduled by that DCI are transmitted on the same carrier, the UE expects tci-PresentInDCI is set as 'enabled' or tci-PresentInDCI-ForFormat1_2 is configured for the CORESET, and if one or more of the TCI states configured for the serving cell scheduled by the search space set contains 'QCL-TypeD', the UE expects the time offset between the reception of the detected PDCCH in the search space set and the corresponding PDSCH is larger than or equal to the threshold timeDurationForQCL.

Independent of the configuration of tci-PresentInDCI and tci-PresentInDCI-ForFormat1_2 in RRC connected mode, if the offset between the reception of the DL DCI and the corresponding PDSCH is less than the threshold timeDurationForQCL and at least one configured TCI state for the serving cell of scheduled PDSCH contains qcl-Type set to 'typeD'.

The UE may assume that the DM-RS ports of PDSCH of a serving cell are quasi co-located with the RS(s) with respect to the QCL parameter(s) used for PDCCH quasi co-location indication of the CORESET associated with a monitored search space with the lowest controlResourceSetId in the latest slot in which one or more CORESETs within the active BWP of the serving cell are monitored by the UE. In this case, if the qcl-Type is set to 'typeD' of the PDSCH DM-RS is different from that of the PDCCH DM-RS with which they overlap in at least one symbol, the UE is expected to prioritize the reception of PDCCH associated with that CORESET. This also applies to the intra-band CA case (when PDSCH and the CORESET are in different component carriers).

If a UE is configured with enableDefaultTCIStatePerCoresetPoolIndex and the UE is configured by higher layer parameter PDCCH-Config that contains two different values of coresetPoolIndex in different ControlResourceSets.

The UE may assume that the DM-RS ports of PDSCH associated with a value of coresetPoolIndex of a serving cell are quasi co-located with the RS(s) with respect to the QCL parameter(s) used for PDCCH quasi co-location indication of the CORESET associated with a monitored search space with the lowest controlResourceSetId among CORESETs, which are configured with the same value of coresetPoolIndex as the PDCCH scheduling that PDSCH, in the latest slot in which one or more CORESETs associated with the same value of coresetPoolIndex as the PDCCH scheduling that PDSCH within the active BWP of the serving cell are monitored by the UE. In this case, if the 'QCL-TypeD' of the PDSCH DM-RS is different from that of the PDCCH DM-RS with which they overlap in at least one symbol and they are associated with same coresetPoolIndex, the UE is expected to prioritize the reception of PDCCH associated with that CORESET. This also applies to the intra-band CA case (when PDSCH and the CORESET are in different component carriers).

If a UE is configured with enableTwoDefaultTCI-States, and at least one TCI codepoint indicates two TCI states, the UE may assume that the DM-RS ports of PDSCH or PDSCH transmission occasions of a serving cell are quasi co-located with the RS(s) with respect to the QCL parameter(s) associated with the TCI states corresponding to the lowest codepoint among the TCI codepoints containing two different TCI states. When the UE is configured by higher layer parameter repetitionScheme set to 'tdmSchemeA' or is configured with higher layer parameter repetitionNumber, the mapping of the TCI states to PDSCH transmission occasions is determined according to clause 5.1.2.1 by replacing the indicated TCI states with the TCI states corresponding to the lowest codepoint among the TCI codepoints containing two different TCI states based on the activated TCI states in the slot with the first PDSCH transmission occasion. In this case, if the 'QCL-TypeD' in both of the TCI states corresponding to the lowest codepoint among the TCI codepoints containing two different TCI states is different from that of the PDCCH DM-RS with which they overlap in at least one symbol, the UE is expected to prioritize the reception of PDCCH associated with that CORESET. This also applies to the intra-band CA case (when PDSCH and the CORESET are in different component carriers).

In all cases above, if none of configured TCI states for the serving cell of scheduled PDSCH is configured with qcl-Type set to 'typeD', the UE shall obtain the other QCL assumptions from the indicated TCI states for its scheduled PDSCH irrespective of the time offset between the reception of the DL DCI and the corresponding PDSCH.

If the PDCCH carrying the scheduling DCI is received on one component carrier, and the PDSCH scheduled by that DCI is on another component carrier and the UE is configured with enableDefaultBeam-ForCCS:

The timeDurationForQCL is determined based on the subcarrier spacing of the scheduled PDSCH. If $\mu_{PDCCH} < \mu_{PDSCH}$ an additional timing delay $$d \frac{2^{\mu_{PDSCH}}}{2^{\mu_{PDCCH}}}$$

is added to the timeDurationForQCL, where d is defined in 5.2.1.5.1a-1, otherwise d is zero;

For both the cases, when the offset between the reception of the DL DCI and the corresponding PDSCH is less than the threshold timeDurationForQCL, and when the DL DCI does not have the TCI field present, the UE obtains its QCL assumption for the scheduled PDSCH from the activated TCI state with the lowest ID applicable to PDSCH in the active BWP of the scheduled cell.

For a periodic CSI-RS resource in an NZP-CSI-RS-ResourceSet configured with higher layer parameter trs-Info, the UE shall expect that a TCI-State indicates one of the following quasi co-location type(s):

'typeC' with an SS/PBCH block and, when applicable, 'typeD' with the same SS/PBCH block, or 'typeC' with an SS/PBCH block and, when applicable, 'typeD' with a CSI-RS resource in an NZP-CSI-RS-ResourceSet configured with higher layer parameter repetition, or For an aperiodic CSI-RS resource in an NZP-CSI-RS-ResourceSet configured with higher layer parameter trs-Info, the UE shall expect that a TCI-State indicates qcl-Type set to 'typeA' with a periodic CSI-RS resource in a NZP-CSI-RS-ResourceSet configured with higher layer parameter trs-Info and, when applicable, qcl-Type set to 'typeD' with the same periodic CSI-RS resource.

For a CSI-RS resource in an NZP-CSI-RS-ResourceSet configured without higher layer parameter trs-Info and without the higher layer parameter repetition, the UE shall expect that a TCI-State indicates one of the following quasi co-location type(s):

'typeA' with a CSI-RS resource in a NZP-CSI-RS-ResourceSet configured with higher layer parameter trs-Info and, when applicable, 'typeD' with the same CSI-RS resource, or 'typeA' with a CSI-RS resource in a NZP-CSI-RS-ResourceSet configured with higher layer parameter trs-Info and, when applicable, 'typeD' with an SS/PBCH block, or 'typeA' with a CSI-RS resource in a NZP-CSI-RS-ResourceSet configured with higher layer parameter trs-Info and, when applicable, 'typeD' with a CSI-RS resource in a NZP-CSI-RS-ResourceSet configured with higher layer parameter repetition, or 'typeB' with a CSI-RS resource in a NZP-CSI-RS-ResourceSet configured with higher layer parameter trs-Info when 'typeD' is not applicable.

For a CSI-RS resource in an NZP-CSI-RS-ResourceSet configured with higher layer parameter repetition, the UE shall expect that a TCI-State indicates one of the following quasi co-location type(s):

'typeA' with a CSI-RS resource in a NZP-CSI-RS-ResourceSet configured with higher layer parameter trs-Info and, when applicable, 'typeD' with the same CSI-RS resource, or 'typeA' with a CSI-RS resource in a NZP-CSI-RS-ResourceSet configured with higher layer parameter trs-Info and, when applicable, 'typeD' with a CSI-RS resource in a NZP-CSI-RS-ResourceSet configured with higher layer parameter repetition, or 'typeC' with an SS/PBCH block and, when applicable, 'typeD' with the same SS/PBCH block.

For the DM-RS of PDCCH, the UE shall expect that a TCI-State indicates one of the following quasi co-location type(s):

'typeA' with a CSI-RS resource in a NZP-CSI-RS-ResourceSet configured with higher layer parameter trs-Info and, when applicable, 'typeD' with the same CSI-RS resource, or 'typeA' with a CSI-RS resource in a NZP-CSI-RS-ResourceSet configured with higher layer parameter trs- Info and, when applicable, 'typeD' with a CSI-RS resource in an NZP-CSI-RS-ResourceSet configured with higher layer parameter repetition, or 'typeA' with a CSI-RS resource in a NZP-CSI-RS-ResourceSet configured without higher layer parameter trs-Info and without higher layer parameter repetition and, when applicable, 'typeD' with the same CSI-RS resource.

For the DM-RS of PDSCH, the UE shall expect that a TCI-State indicates one of the following quasi co-location type(s):

'typeA' with a CSI-RS resource in a NZP-CSI-RS-ResourceSet configured with higher layer parameter trs-Info and, when applicable, 'typeD' with the same CSI-RS resource, or 'typeA' with a CSI-RS resource in a NZP-CSI-RS-ResourceSet configured with higher layer parameter trs-Info and, when applicable, 'typeD' with a CSI-RS resource in an NZP-CSI-RS-ResourceSet configured with higher layer parameter repetition, or typeA' with a CSI-RS resource in a NZP-CSI-RS-ResourceSet configured without higher layer parameter trs-Info and without higher layer parameter repetition and, when applicable, 'typeD' with the same CSI-RS resource.

If the PDCCH carrying the scheduling DCI is received on one component carrier, and the PDSCH scheduled by that DCI is on another component carrier: The timeDuration-ForQCL is determined based on the subcarrier spacing of the scheduled PDSCH. If μPDCCH<μPDSCH an additional timing delay d is added to the timeDurationForQCL, where d is defined as 8 symbols if subcarrier spacing for the PDCCH is 15 kHz, or 8 symbols if subcarrier spacing for the PDCCH is 30 kHz, or 14 symbols if subcarrier spacing for the PDCCH is 60 kHz. For example, the symbol is PDCCH symbol, or the symbol is based on the subcarrier spacing of PDCCH (for example, as defined in Table 5.2.1.5.1a-1 of TS 38.214); For both the cases when tci-PresentInDCI is set to 'enabled' and the offset between the reception of the DL DCI and the corresponding PDSCH is less than the threshold timeDurationForQCL and when tci-PresentInDCI is not configured, the UE obtains its QCL assumption for the scheduled PDSCH from the activated TCI state with the lowest ID applicable to PDSCH in the active BWP of the scheduled cell.

As specified in the 3GPP specifications (TS 38.214), when a UE is configured by higher layer parameter Rep-SchemeEnabler set to one of 'FDMSchemeA', 'FDMSchemeB', 'TDMSchemeA', if the UE is indicated with two TCI states in a codepoint of the DCI field 'Transmission Configuration Indication' and DMRS port(s) within one CDM (Code Domain Multiplexing) group in the DCI field "Antenna Port(s)". When two TCI states are indicated in a DCI and the UE is set to 'FDMSchemeA', the UE shall receive a single PDSCH transmission occasion of the TB with each TCI state associated to a non-overlapping frequency domain resource allocation as described in clause "Physical resource block (PRB) bundling" (for example Clause 5.1.2.3) in TS 38.214. When two TCI states are indicated in a DCI and the UE is set to 'FDMSchemeB', the UE shall receive two PDSCH transmission occasions of the same TB with each TCI state associated to a PDSCH transmission occasion which has non-overlapping frequency domain resource allocation with respect to the other PDSCH transmission occasion as described in clause "Physical resource block (PRB) bundling" (for example Clause 5.1.2.3) in TS 38.214. When two TCI states are indicated in a DCI and the UE is set to 'TDMSchemeA', the UE shall receive two PDSCH transmission occasions of the same TB with each TCI state associated to a PDSCH transmission occasion which has non-overlapping time domain resource allocation with respect to the other PDSCH transmission occasion and both PDSCH transmission occasions shall be received within a given slot as described in Clause "Resource allocation in time domain" (for example, clause 5.1.2.1) in TS 38.214.

When a UE is configured by the higher layer parameter PDSCH-config that indicates at least one entry in pdsch-TimeDomainAllocationList containing RepNumR16 in PDSCH-TimeDomainResourceAllocation, the UE may expect to be indicated with one or two TCI states in a codepoint of the DCI field 'Transmission Configuration Indication' together with the DCI field "Time domain resource assignment' indicating an entry in pdsch-TimeDomainAllocationList which contain RepNum16 in PDSCH-TimeDomainResourceAllocation and DM-RS port(s) within one CDM group in the DCI field "Antenna Port(s)". When two TCI states are indicated in a DCI with 'Transmission Configuration Indication' field, the UE may expect to receive multiple slot level PDSCH transmission occasions of the same TB with two TCI states used across multiple PDSCH transmission occasions as defined in Clause "Resource allocation in time domain" (for example, clause 5.1.2.1) in TS 38.214. When one TCI state is indicated in a DCI with 'Transmission Configuration Indication' field, the UE may expect to receive multiple slot level PDSCH transmission occasions of the same TB with one TCI state used across multiple PDSCH transmission occasions as defined in Clause "Resource allocation in time domain" (for example, clause 5.1.2.1) in TS 38.214.

When a UE is not indicated with a DCI that DCI field "Time domain resource assignment' indicating an entry in pdsch-TimeDomainAllocationList which contain RepNumR16 in PDSCH-TimeDomainResourceAllocation, and it is indicated with two TCI states in a codepoint of the DCI field 'Transmission Configuration Indication' and DM-RS port(s) within two CDM groups in the DCI field "Antenna Port(s)", the UE may expect to receive a single PDSCH where the association between the DM-RS ports and the TCI states are as defined in Clause "DMRS reception procedure" (for example, clause 5.1.6.2) in TS 38.214.

When a UE is not indicated with a DCI that DCI field "Time domain resource assignment' indicating an entry in pdsch-TimeDomainAllocationList which contain RepNumR16 in PDSCH-TimeDomainResourceAllocation, and it is indicated with one TCI states in a codepoint of the DCI field 'Transmission Configuration Indication', the UE procedure for receiving the PDSCH upon detection of a PDCCH follows Clause "UE procedure for receiving the physical downlink shared channel" (for example, Clause 5.1) in TS 38.214.

In the following, the terms "FDMSchemeA" and "Scheme 2a" can be used interchangeably. The terms "FDMSchemeB" and "Scheme 2b" can be used interchangeably. The terms "TDMSchemeA" and "Scheme 3" can be used interchangeably. The terms "RepNumR16" and "Scheme 4" can be used interchangeably.

As specified in the 3GPP specifications (TS 38.214), when a UE is configured by the higher layer parameter Rep-SchemeEnabler set to 'TDMSchemeA' and indicated DM-RS port(s) within one CDM group in the DCI field "Antenna Port(s)", the number of PDSCH transmission occasions is derived by the number of TCI states indicated by the DCI field 'Transmission Configuration Indication' of the scheduling DCI. If two TCI states are indicated by the DCI field 'Transmission Configuration Indication', the UE is expected to receive two PDSCH transmission occasions, where the first TCI state is applied to the first PDSCH transmission occasion and resource allocation in time domain for the first PDSCH transmission occasion follows Clause "Resource allocation in time domain" (for example, clause 5.1.2.1) in TS 38.214. The second TCI state is applied to the second PDSCH transmission occasion, and the second PDSCH transmission occasion shall have the same number of symbols as the first PDSCH transmission occasion. If the UE is configured by the higher layers with a value $\overline{K}$ in StartingSymbolOffsetK, it shall determine that the first symbol of the second PDSCH transmission occasion starts after $\overline{K}$ symbols from the last symbol of the first PDSCH transmission occasion. If the value $\overline{K}$ is not configured via the higher layer parameter StartingSymbolOffsetK, $\overline{K}$=0 shall be assumed by the UE. The UE is not expected to receive more than two PDSCH transmission layers for each PDSCH transmission occasion. For two PDSCH transmission occasions, the redundancy version to be applied is derived according to Table 5.1.2.1-2 in TS 38.214, where n=0, 1 applied respectively to the first and second TCI state. Otherwise, the UE is expected to receive a single PDSCH transmission occasion, and the resource allocation in the time domain follows Clause "Resource allocation in time domain" (for example, clause 5.1.2.1) in TS 38.214.

As specified in the 3GPP specifications (TS 38.214), when a UE configured by the higher layer parameter PDSCH-config that indicates at least one entry in pdsch-TimeDomainAllocationList contain RepNumR16 in PDSCH-TimeDomainResourceAllocation. If two TCI states are indicated by the DCI field 'Transmission Configuration Indication' together with the DCI field "Time domain resource assignment' indicating an entry in pdsch-TimeDomainAllocationList which contain RepNumR16 in PDSCH-TimeDomainResourceAllocation and DM-RS port(s) within one CDM group in the DCI field "Antenna Port(s)", the same SLIV (Start and length indicator value) is applied for all PDSCH transmission occasions, the first TCI state is applied to the first PDSCH transmission occasion and resource allocation in time domain for the first PDSCH transmission occasion follows Clause "Resource allocation in time domain" (for example, clause 5.1.2.1) in TS 38.214. When the value indicated by RepNumR16 in PDSCH-TimeDomainResourceAllocation equals to two, the second TCI state is applied to the second PDSCH transmission occasion. When the value indicated by RepNumR16 in PDSCH-TimeDomainResourceAllocation is larger than two, the UE may be further configured to enable CycMapping or SeqMapping in RepTCIMapping. When CycMapping is enabled, the first and second TCI states are applied to the first and second PDSCH transmission occasions, respectively, and the same TCI mapping pattern continues to the remaining PDSCH transmission occasions. When SeqMapping is enabled, first TCI state is applied to the first and second PDSCH transmissions, and the second TCI state is applied to the third and fourth PDSCH transmissions, and the same TCI mapping pattern continues to the remaining PDSCH transmission occasions. The UE may expect that each PDSCH transmission occasion is limited to two transmission layers. For all PDSCH transmission occasions associated with the first TCI state, the redundancy version to be applied is derived according to Table 5.1.2.1-2 [TS 38.214], where n is counted only considering PDSCH transmission occasions associated with the first TCI state. The redundancy version for PDSCH transmission occasions associated with the second TCI state is derived according to Table 5.1.2.1-3 [TS 38.214], where additional shifting operation for each redundancy version $rv_s$ is configured by higher layer parameter RVSeqOffset and n is counted only considering PDSCH transmission occasions associated with the second TCI state. If one TCI state is indicated by the DCI field 'Transmission Configuration Indication' together with the DCI field "Time domain resource assignment' indicating an entry in pdsch-TimeDomainAllocationList which contain RepNumR16 in PDSCH-TimeDomainResourceAllocation and DM-RS port(s) within one CDM group in the DCI field "Antenna Port(s)", the same SLIV is applied for all PDSCH transmission occasions, the first PDSCH transmission occasion follows Clause "Resource allocation in time domain" (for example, clause 5.1.2.1) in TS 38.214, the same TCI state is applied to all PDSCH transmission occasions. The UE may expect that each PDSCH transmission occasion is limited to two transmission layers. For all PDSCH transmission occasions, the redundancy version to be applied is derived according to Table 5.1.2.1-2 [TS 38.214], where n is counted considering PDSCH transmission occasions. Otherwise, the UE is expected to receive a single PDSCH transmission occasion, and the resource allocation in the time domain follows Clause "Resource allocation in time domain" (for example, clause 5.1.2.1) in TS 38.214.

TABLE 5.1.2.1-2

| $rv_{id}$ indicated by the DCI scheduling the PDSCH | Applied redundancy version when pdsch-AggregationFactor is present $rv_{id}$ to be applied to $n^{th}$ transmission occasion | | | |
| --- | --- | --- | --- | --- |
| | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

TABLE 5.1.2.1-3

| $rv_{id}$ indicated by the DCI scheduling the PDSCH | Applied redundancy version for the second TCI state when RVSeqOffset is present $rv_{id}$ to be applied to $n^{th}$ transmission occasion with second TCI state | | | |
| --- | --- | --- | --- | --- |
| | n mod 4 = 0 | n mod 4 = 1 | n mod 4 = 2 | n mod 4 = 3 |
| 0 | $(0 + rv_s)$ mod 4 | $(2 + rv_s)$ mod 4 | $(3 + rv_s)$ mod 4 | $(1 + rv_s)$ mod 4 |
| 2 | $(2 + rv_s)$ mod 4 | $(3 + rv_s)$ mod 4 | $(1 + rv_s)$ mod 4 | $(0 + rv_s)$ mod 4 |
| 3 | $(3 + rv_s)$ mod 4 | $(1 + rv_s)$ mod 4 | $(0 + rv_s)$ mod 4 | $(2 + rv_s)$ mod 4 |
| 1 | $(1 + rv_s)$ mod 4 | $(0 + rv_s)$ mod 4 | $(2 + rv_s)$ mod 4 | $(3 + rv_s)$ mod 4 |

As specified in the 3GPP specifications (TS 38.214), For a UE configured by the higher layer parameter RepSchemeEnabler set to 'FDMSchemeA' or 'FDMSchemeB', and when the UE is indicated with two TCI states in a codepoint of the DCI field 'Transmission Configuration Indication and DM-RS port(s) within one CDM group in the DCI field "Antenna Port(s)". If $$P'_{BWP,i}$$

is determined as "wideband", the first $$\left\lceil \frac{n_{PRB}}{2} \right\rceil$$

PRBs are assigned to the first TCI state and the remaining $$\left\lfloor \frac{n_{PRB}}{2} \right\rfloor$$

PRBs are assigned to the second TCI state, where $n_{PRB}$ is the total number of allocated PRBs for the UE. If $P'_{BWP,i}$ is determined as one of the values among {2, 4}, even PRGs within the allocated frequency domain resources are assigned to the first TCI state and odd PRGs within the allocated frequency domain resources are assigned to the second TCI state. The UE is not expected to receive more than two PDSCH transmission layers for each PDSCH transmission occasion.

For a UE configured by the higher layer parameter RepSchemeEnabler set to 'FDMSchemeB', and when the UE is indicated with two TCI states in a codepoint of the DCI field 'Transmission Configuration Indication and DM-RS port(s) within one CDM group in the DCI field "Antenna Port(s)", each PDSCH transmission occasion shall follow the Clause "Physical downlink shared channel" (for example Clause 7.3.1) of [TS 38.211] with the mapping to resource elements determined by the assigned PRBs for corresponding TCI state of the PDSCH transmission occasion, and the UE shall only expect at most two code blocks per PDSCH transmission occasion when a single transmission layer is scheduled and a single code block per PDSCH transmission occasion when two transmission layers are scheduled. For two PDSCH transmission occasions, the redundancy version to be applied is derived according to Table 5.1.2.1-2 of [TS 38.214], where n=0, 1 are applied to the first and second TCI state, respectively.

In some embodiments, the terminal device 130 may be configured with a first PDCCH candidate and a second PDCCH candidate, where the first PDCCH candidate and the second PDCCH candidate are linked. For example, the linked first PDCCH candidate and second PDCCH candidate are applied for PDCCH repetition. For another example, the linked first PDCCH candidate and second PDCCH candidate are applied for same scheduling. For example, the scheduling may be at least one of downlink data scheduling, PDSCH scheduling, uplink data scheduling, PUSCH scheduling, downlink RS scheduling, uplink RS scheduling and PUCCH scheduling.

In some embodiments, the terminal device 130 may be configured with multiple control-resource sets (i.e. CORE-SET).

In some embodiments, a CORESET may consist of $$N_{RB}^{CORESET}$$

resource blocks (RBs) in the frequency domain and $$N_{symb}^{CORESET} \in \{1, 2, 3\}$$

symbols in the time domain. In some embodiments, a control-channel element (CCE) consists of 6 resource-element groups (REGs) where a REG equals to one resource block during one orthogonal frequency-division multiplexing (OFDM) symbol. In some embodiments, REGs within a control-resource set are numbered in increasing order in a time-first manner, starting with 0 for the first OFDM symbol and the lowest-numbered resource block in the control resource set.

In some embodiments, one CORESET may be associated with one or more search space sets. One search space set may include or may be associated with one or more PDCCH candidates. In some embodiments, PDCCH monitoring periodicity and/or slot offset and/or symbol index within a slot can be configured per search space set. In some embodiments, one PDCCH candidate may be associated with or may correspond to a search space.

In some embodiments, a procedure may be defined for determining physical downlink control channel candidates for the terminal device 130. That is, determining the CCE index(es) for each of a plurality of PDCCH candidates that is potentially to be used for PDCCH transmission between the network device 110 and the terminal device 130. With the CCE index for PDCCH candidates determined, the terminal device 130 can perform blind detection on these PDCCH candidates. Once PDCCH transmission is detected or received on a PDCCH candidate, the terminal device 130 may decode it to obtain information such as DCI.

In some embodiments, the terminal device 130 may assume that a Demodulation Reference Signal (DM-RS) antenna port associated with PDCCH reception(s) in the CORESET is quasi co-located (QCLed) with the one or more reference signal (RS) configured by a transmission control indicator (TCI) state, where the TCI state is indicated for the CORESET, if any.

In some embodiments, the terminal device 130 may assume that a DM-RS antenna port associated with PDCCH reception(s) in the CORESET is quasi co-located (QCLed) with a Synchronization Signal/Physical Broadcast Channel (SS/PBCH) block the UE identified during a most recent random access procedure not initiated by a PDCCH order that triggers a contention-free random access procedure, if no Medium Access Control (MAC) control element (CE) activation command indicating a TCI state for the CORE-SET is received after the most recent random access procedure the one or more reference signal (RS) configured by a TCI state, where the TCI state is indicated for the CORE-SET, if any.

In some embodiments, the network device 110 may transmit, to the terminal device 130, a configuration (e.g. 210) indicative of N PDCCH candidates, where N is a positive integer. For example, 1≤N≤32. For another example, N=2. For example, the configuration may be transmitted via any of Radio Resource Control (RRC) signaling, Medium Access Control (MAC) control element (CE) and DCI.

In some embodiments, the network device 110 may transmit, to the terminal device 130, one or more configurations (e.g. 210) for a first PDCCH candidate and a second PDCCH candidate. In some embodiments, the first PDCCH candidate may be comprised in a first search space or a first search space set. In some embodiments, the first search space or the first search space set may be associated with a first CORESET. In some embodiments, the first CORESET may be associated or configured with a first TCI state T1 or a first set of QCL parameters Q1. In some embodiments, the second PDCCH candidate may be comprised in a second search space or a second search space set. In some embodiments, the second search space or the second search space set may be associated with a second CORESET. In some embodiments, the second CORESET may be associated or configured with a second TCI state T2 or a second set of QCL parameters Q2. In some embodiments, T1 may be different from T2. In some embodiments, Q1 may be different from Q2.

In some embodiments, the first PDCCH candidate and the second PDCCH candidate may be configured to be explicitly linked/associated together. For example, the terminal device 130 is able to know the linking/association before decoding. In some embodiments, there may be a first PDCCH/DCI transmitted/received in the first PDCCH candidate. In some embodiments, there may be a second PDCCH/DCI transmitted/received in the second PDCCH candidate. In some embodiments, the DCI payload and/or the coded bits and/or the number of CCEs in the first PDCCH/DCI are same with the second PDCCH/DCI. In some embodiments, the first PDCCH/DCI and the second PDCCH/DCI schedule a same communication between the network device 110 and the terminal device 130. For example, the communication may be at least one of PDSCH, PUSCH, Sounding Reference Signal (SRS), Channel State Information-Reference Signal (CSI-RS), transport block, an active UL BWP change, and an active DL BWP change, PUCCH.

In some embodiment, the network device 110 may transmit, to the terminal device 130, a configuration (e.g. 210) indicating the first PDCCH candidate and the second PDCCH candidate are linked together for PDCCH repetition. In some embodiment, the network device 110 may transmit, to the terminal device 130, a configuration (e.g. 210) indicating the first search space (or the first search space set or the first CORESET) and the second search space (or the second search space set or the second CORESET) are linked together. For example, the configuration can be transmitted from the network device 110 to the terminal device 130 via any of the following: Radio Resource Control (RRC) signaling, Medium Access Control (MAC) control element (CE) or DCI. For example, the first PDCCH candidate and the second PDCCH candidate can be used to carry a single or a same DCI format (or DCI payload).

In some embodiments, the first PDCCH candidate may end no later or earlier than the second PDCCH candidate in time domain.

In some embodiments, the network device 110 may transmit at least one configuration (e.g. 210) about a first CORESET and a second CORESET to the terminal device 120.

In some embodiments, the at least one configuration may configure a first set of search spaces which is associated with the first CORESET. In some embodiments, the at least one configuration may configure a second set of search spaces which is associated with the second CORESET. In some embodiments, the at least one configuration may configure a first set of PDCCH candidates in a first search space of the first set of search spaces. In some embodiments, the at least one configuration may configure a second set of PDCCH candidates in a second search space of the second set of search spaces. In some embodiments, the at least one configuration may configure that a first PDCCH candidate in the first search space of the first set of search spaces associated with the first CORESET is linked or associated or related to a second PDCCH candidate in the second search space of the second set of search spaces associated with the second CORESET. For example, the terminal device knows the linking or association or relationship before decoding the PDCCH or DCI in the first and second PDCCH candidates. In some embodiments, the first and second PDCCH candidates may be used for PDCCH repetitions. For example, encoding and/or rate matching of the PDCCH or DCI in the PDCCH in the first PDCCH candidate and/or the second PDCCH candidate is based on one repetition (for example, PDCCH or DCI in the PDCCH in one of the first and second PDCCH candidates). For example, the same coded bits are repeated for the other repetition. For another example, each repetition has the same number of control channel elements (CCEs) and coded bits, and corresponds to the same DCI payload. In some embodiments, the at least one configuration may be transmitted/received via at least one of RRC signaling. MAC CE and DCI.

In some embodiments, a PDCCH candidate in the first search space set is linked with the a PDCCH candidate in the second search space set based on the two PDCCH candidates having the same aggregation level and same candidate index. For example, the aggregation level of the first PDCCH candidate and the aggregation level of the second PDCCH candidate are same. For another example, the candidate index of the first PDCCH candidate and the candidate index of the second PDCCH candidate are same.

In some embodiments, the network device 110 may transmit one or more configurations (e.g. 210) of a third CORESET to the terminal device 130. The one or more configurations may indicate two active TCI states for the third CORESET. For example, the terminal device 130 may detect/decode PDCCH in the search space sets which associated with the third CORESET with the two active TCI states.

In some embodiments, the network device 110 may transmit one or more configurations (e.g. 210) for a first number of PDSCH/PUSCH/PUCCH transmissions/receptions/repetitions/occasions to the terminal device 130. For example, the first number is denoted as G. For example, $1 \le G \le 32$. For another example, G may be at least one of $\{1,2,3,4,5,6,7,8,16,32\}$. In some embodiments, the network device 110 may transmit a scheduling (e.g. 210) for the first number of PDSCH/PUSCH/PUCCH transmissions/receptions/repetitions/occasions in a single DCI/PDCCH or in PDCCH in linked PDCCH candidates to the terminal device 130. In some embodiments, there may be two TCI states (e.g. first TCI state and second TCI state) or two spatial relation info (e.g. first spatial relation info and a second spatial relation info) indicated/configured in the single DCI/PDCCH or in the PDCCH in linked PDCCH candidates.

In some embodiments, if $M \ge 2$, there may be two sets of PDSCH/PUSCH/PUCCH transmissions/receptions/repetitions/occasions for the plurality of PDSCH/PUSCH/PUCCH transmissions/receptions/repetitions/occasions (e.g., set 1 and set 2), and set 1 with a second number of PDSCH/PUSCH/PUCCH transmissions/receptions/repetitions/occasions (second number is G1, G1 is a positive integer, e.g. G1=G/2 or G1=ceil(G/2) or G1=floor(G/2)), and set 2 with a third number of PDSCH/PUSCH/PUCCH transmissions/receptions/repetitions/occasions (third number is G2, and G2=G−G1). In some embodiments, the set 1 of PDSCH/PUSCH/PUCCH transmissions/receptions/repetitions/occasions is transmitted/received with the first TCI state or the first spatial relation info, and the set 2 of PDSCH/PUSCH/PUCCH transmissions/receptions/repetitions/occasions is transmitted/received with the second TCI state or the second spatial relation info.

In some embodiments, the network device 110 may configure (e.g. 210) a mapping type to the terminal device 130. For example, the mapping type may indicate the association between the TCI states and the PDSCH/PUSCH/PUCCH transmissions/receptions/repetitions/occasions. In some embodiments, the network device 110 may configure (e.g. 210) cyclic mapping type to the terminal device 130, and the network device may configure the first number of PDSCH/PUSCH/PUCCH transmissions/receptions/repetitions/occasions to be larger than 2. And the first and second TCI states are applied to the first and second PDSCH/PUSCH/PUCCH transmissions/receptions/repetitions/occasions, respectively, and the same TCI mapping pattern continues to the remaining PDSCH/PUSCH/PUCCH transmissions/receptions/repetitions/occasions. In some embodiments, the network device 110 may configure (e.g. 210) sequential mapping type to the terminal device 130, and the network device may configure the first number of PDSCH/PUSCH/PUCCH transmissions/receptions/repetitions/occasions to be larger than 2. And the first TCI state is applied to the first and second PDSCH/PUSCH/PUCCH transmissions/receptions/repetitions/occasions, and the second TCI state is applied to the third and/or fourth PDSCH/PUSCH/PUCCH transmissions/receptions/repetitions/occasions, and same TCI mapping pattern continues to the remaining PDSCH/PUSCH/PUCCH transmissions/receptions/repetitions/occasions. In some embodiments, the network device 110 may configure (e.g. 210) the first number of PDSCH/PUSCH/PUCCH transmissions/receptions/repetitions/occasions to be 2. And the first TCI state is applied to the first PDSCH/PUSCH/PUCCH transmission/reception/repetition/occasion, and the second TCI state is applied to the second PDSCH/PUSCH/PUCCH transmission/reception/repetition/occasion.

When a UE configured by the higher layer parameter repetitionScheme set to 'fdmSchemeA' or 'fdmSchemeB', and the UE is indicated with two TCI states in a codepoint of the DCI field 'Transmission Configuration Indication' and DM-RS port(s) within one CDM group in the DCI field 'Antenna Port(s)', the UE shall receive a single PT-RS port which is associated with the lowest indexed DM-RS antenna port among the DM-RS antenna ports assigned for the PDSCH, a PT-RS frequency density is determined by the number of PRBs associated to each TCI state, and a PT-RS resource element mapping is associated to the allocated PRBs for each TCI state.

In addition to normal data communications, the network device 110 may send a RS to the terminal device 130 in a downlink. Similarly, the terminal device 130 may transmit a RS to the network device 110 in an uplink. Generally speaking, a RS is a signal sequence (also referred to as "RS sequence") that is known by both the network device 110 and the terminal devices 130. For example, a RS sequence may be generated and transmitted by the network device 110 based on a certain rule and the terminal device 130 may deduce the RS sequence based on the same rule. For another example, a RS sequence may be generated and transmitted by the terminal device 130 based on a certain rule and the network device 110 may deduce the RS sequence based on the same rule. Examples of the RS may include but are not limited to downlink or uplink Demodulation Reference Signal (DMRS), CSI-RS, Sounding Reference Signal (SRS), Phase Tracking Reference Signal (PTRS), Tracking Reference Signal (TRS), fine time-frequency Tracking Reference Signal (TRS), CSI-RS for tracking, Positioning Reference Signal (PRS) and so on.

In addition to normal data communications, the network device 110 may transmit DCI via a PDCCH to the terminal device 130. The DCI may indicate resource allocation for data transmission in a DL or UL. Concurrently, a DMRS associated with the PDCCH may also be transmitted from the network device 110 to the terminal device 130. The DMRS may be used by the terminal device 130 for channel demodulation. Then, the terminal device 130 may attempt to blindly decode the DCI in a PDCCH in a search space which is associated with a control information set (CORESET). As used herein, a "CORESET" and/or a search space refers to a set of resource element groups (REGs) within which the terminal device attempts to blindly decode the DCI. A search space indicating the start time and a periodicity for monitoring a PDCCH in the CORESET may be indicated to the terminal device 130. In response to decoding the DCI successfully, the terminal device 130 may perform the UL and/or DL data transmission (for example, data transmission via PDSCH and/or Physical Uplink Shared Channel (PUSCH)) with the network device 110 accordingly.

The network device 110 may communicate data and control information to the terminal device 130 via a plurality of beams (also referred to as "DL beams"). The terminal device 130 may also communicate data and control information to the network device 110 via a plurality of beams (also referred to as "UL beams"). In 3GPP specifications for new radio (NR), a beam is also defined and indicated by parameters of a transmission configuration indicator. For example, there may be a transmission configuration indication (TCI) field in DCI. A value of the TCI field may be referred to as a "TCI codepoint". A TCI codepoint may indicate one or more TCI states. Each TCI state contains parameters for configuring a quasi co-location (QCL) relationship between one or two DL and/or UL reference signals and the DMRS ports of the PDSCH, the DMRS ports of PDCCH, the DMRS ports of PUSCH, the DMRS ports of PUCCH, the SRS ports of a SRS resource or the CSI-RS ports of a CSI-RS resource.

Figure 2:
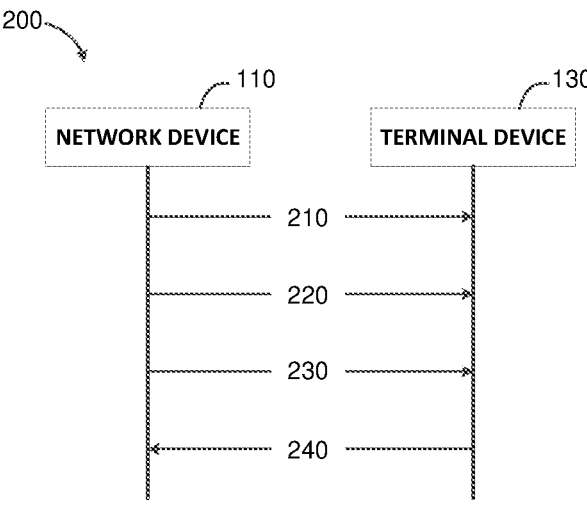
FIG. 2 illustrates a signaling chart for signaling communication in accordance with some embodiments of the present disclosure.

FIG. 2 illustrates a signaling chart for signaling communication in accordance with some embodiments of the present disclosure. For the purpose of discussion, the process 200 will be described with reference to FIG. 1. The process 200 may involve the network device 110 and the terminal device 130 as shown in FIG. 1.

In some embodiments, for example, as shown in FIG. 2, the network device 110 configures/transmits one or more configurations 210 to the terminal device 130. In some embodiments, for example, as shown in FIG. 2, the terminal device 130 receives one or more configurations 210 from the network device 110. In some embodiments, the one or more configurations 210 may include at least one of configuration of TCI state(s), configuration of CORESET, configuration of search space, configuration of PDCCH, configuration of PDSCH, configuration of PUSCH, configuration of PUCCH, configuration of control information for data transmission/reception, configuration of reference signal (RS) transmission/reception, configuration of repetition/transmission/reception scheme. In some embodiments, the network device 110 may transmit one or two or more PDCCHs (e.g. 220 as shown in FIG. 2) to the terminal device 130. In some embodiments, the terminal device 130 may receive one or two or more PDCCHs (e.g. 220 as shown in FIG. 2) from the network device 110. In some embodiments, the DCI payload/information is same in the one or two or more PDCCHs. In some embodiments, the one or two or more PDCCHs are applied for same scheduling. For example, same scheduling for uplink data transmission/reception, downlink data transmission/reception, uplink RS transmission/reception, downlink RS transmission/reception, PUCCH transmission/reception. In some embodiments, the network device 110 may transmit the scheduled PDSCH and/or RS transmission(s)/repetition(s) (e.g. 230 as shown in FIG. 2) to the terminal device 130. In some embodiments, the terminal device 130 may receive the scheduled PDSCH and/or RS reception(s)/repetition(s) (e.g. 230 as shown in FIG. 2) from the network device 110. For example, the PDSCH and/or RS transmission(s)/reception(s)/repetition(s) is based on the scheduling in 220. In some embodiments, the terminal device 130 may transmit the scheduled PUSCH and/or PUCCH and/or RS transmission(s)/repetition(s) (e.g. 240 as shown in FIG. 2) to the network device 110. In some embodiments, the network device 110 may receive the scheduled PUSCH and/or PUCCH and/or RS reception(s)/repetition(s) (e.g. 230 as shown in FIG. 2) from the terminal device 130. For example, the PUSCH and/or PUCCH and/or RS transmission(s)/reception(s)/repetition(s) is based on the scheduling in 220. In some embodiments, there may be only a subset of signaling in process 200. For example, there may be only 210, 220 and 230 in process 200. For another example, there may be only 210, 220 and 240 in process 200.

FIGS. 3A-3D illustrate examples of PDCCH in accordance with some embodiments of the present disclosure. And the one or two PDCCHs are applied for a same scheduling of a communication between the network device 110 and the terminal device 130. For example, the communication may be at least one of PDSCH, PUSCH, PUCCH, downlink RS and uplink RS.

Figure 3A:
FIGS. 3A-3D illustrate examples of PDCCH in accordance with some embodiments of the present disclosure.
Figure 3A:

In the example of FIG. 3A, TCI state 1-1 may be configured to the terminal device 130 for monitoring a PDCCH in a CORESET/search space. As shown in FIG. 3A, the terminal device 130 may receive PDCCH 311 with TCI state 1-1 for a scheduling of a communication. In some embodiments, there may be one or two or more TCI states or spatial relation info indicated in PDCCH 311 for the scheduling of communication.

Figure 3B:
Figure 3B:

In the example of FIG. 3B, TCI state 2-1 may be configured to the terminal device 130 for monitoring a first PDCCH in a first CORESET/search space, and TCI state 2-2 may be configured to the terminal device 130 for monitoring a second PDCCH in a second CORESET/search space. For example, the scheduling of communication in the first PDCCH and the scheduling of communication in the second PDCCH may be independent/separate. As shown in FIG. 3B, the terminal device 130 may receive PDCCH 321 with TCI state 2-1 for a first scheduling of communication. In some embodiments, there may be one or two or more TCI states or spatial relation info indicated in PDCCH 321 for the first scheduling of communication. Also as shown in FIG. 3B, the terminal device 130 may receive PDCCH 322 with TCI state 2-2 for a second scheduling of communication. In some embodiments, there may be one or two or more TCI states or spatial relation info indicated in PDCCH 322 for the second scheduling of communication. In some embodiments, the PDCCH 321 and PDCCH 322 may be non-overlapping or partial overlapping or full overlapping in time and/or frequency domain. In some embodiments, the first communication and the second communication may be non-overlapping or partial overlapping or full overlapping in time and/or frequency domain.

Figure 3C:
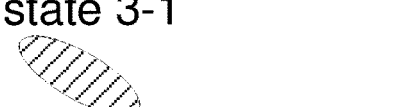
Figure 3C:

In the example of FIG. 3C, TCI state 3-1 may be configured to the terminal device 130 for monitoring a first PDCCH in a first CORESET/search space, and TCI state 3-2 may be configured to the terminal device 130 for monitoring a second PDCCH in a second CORESET/search space, and the first CORESET/search space and the second CORESET/search space are configured to be linked according to some embodiments in this disclosure. For example, the first PDCCH and the second PDCCH are applied to schedule same communication between the network device 110 and the terminal device 130. For another example, the payload or information in the first PDCCH and the second PDCCH is same. As shown in FIG. 3C, the terminal device 130 may receive PDCCH 331 with TCI state 3-1 for a scheduling of a communication and the terminal device 130 may receive PDCCH 332 with TCI state 3-2 for the same scheduling of the communication. In some embodiments, there may be one or two or more TCI states or spatial relation info indicated in PDCCH 331 and in PDCCH 332 for the scheduling of communication.

Figure 3D:
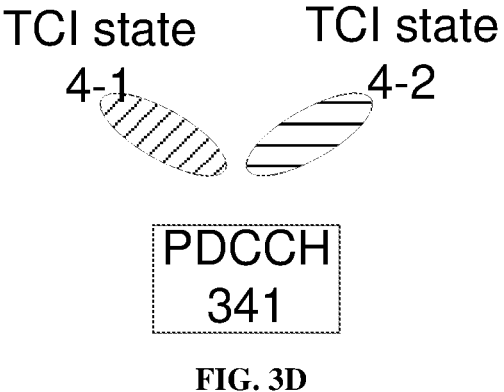

In the example of FIG. 3D, TCI state 4-1 and TCI state 4-2 may be configured to the terminal device 130 for monitoring a PDCCH in a CORESET/search space. As shown in FIG. 3D, the terminal device 130 may receive PDCCH 341 with TCI state 4-1 and TCI state 4-2 for a scheduling of a communication. In some embodiments, there may be one or two or more TCI states or spatial relation info indicated in PDCCH 341 for the scheduling of communication.

FIGS. 4A-4F illustrate examples of communications in accordance with some embodiments of the present disclosure. For example, the one or more communications may be at least one of PDSCH, PUSCH, PUCCH, downlink RS and uplink RS. And the scheduling of the one or more communications may be scheduled by the one or more PDCCHs as shown in FIG. 3A-3D.

Figure 4A:
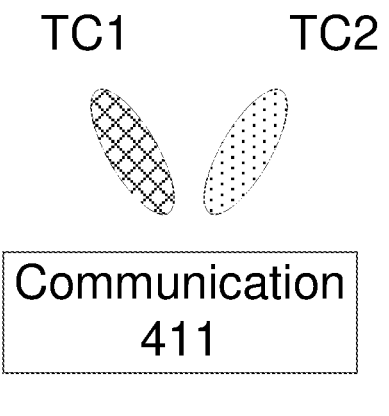

In the example of FIG. 4A, two TCI states or two spatial relation info (For example, represented as TC1 and TC2) may be configured/indicated to the terminal device 130 for Communication 411. As shown in FIG. 4A, the terminal device 130 may receive or transmit Communication 411 with TC1 and TC2. For example, the terminal device 130 may receive PDSCH 411 and/or downlink RS 411 with TC1 and TC2. For another example, the terminal device 130 may transmit PUSCH 411 and/or PUCCH 411 and/or uplink RS 411 with TC1 and TC2. In some embodiments, the scheduling of Communication 411 may be scheduled by PDCCH 311. For example, the TCI state 1-1 and TC1 (or TC2) may be same or different. In some embodiments, the scheduling of Communication 411 may be scheduled by PDCCH 331 and PDCCH 332. For example, the TCI state 3-1 and TC1 (or TC2) may be same or different. For another example, the TCI state 3-2 and TC1 (or TC2) may be same or different. In some embodiments, the scheduling of Communication 411 may be scheduled by PDCCH 341. For example, the TCI state 4-1 and TC1 (or TC2) may be same or different. For another example, the TCI state 4-2 and TC1 (or TC2) may be same or different.

Figure 4B:
Figure 4B:
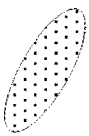

In the example of FIG. 4B, one TCI state or one spatial relation info (For example, represented as TC1) may be configured/indicated to the terminal device 130 for Communication 421, and one TCI state or one spatial relation info (For example, represented as TC2) may be configured/indicated to the terminal device 130 for Communication 422. As shown in FIG. 4B, the terminal device 130 may receive or transmit Communication 421 with TC1. For example, the terminal device 130 may receive PDSCH 421 and/or downlink RS 421 with TC1. For another example, the terminal device 130 may transmit PUSCH 421 and/or PUCCH 421 and/or uplink RS 421 with TC2. Also as shown in FIG. 4B, the terminal device 130 may receive or transmit Communication 422 with TC2. For example, the terminal device 130 may receive PDSCH 422 and/or downlink RS 422 with TC2. For another example, the terminal device 130 may transmit PUSCH 422 and/or PUCCH 422 and/or uplink RS 422 with TC2. In some embodiments, Communication 421 and Communication 422 may be non-overlapping or partial overlapping or full overlapping in time and/or frequency domain. In some embodiments, the scheduling of Communication 421 may be scheduled by PDCCH 311. For example, the TCI state 1-1 and TC1 may be same or different. In some embodiments, the scheduling of Communication 421 may be scheduled by PDCCH 331 and PDCCH 332. For example, the TCI state 3-1 and TC1 may be same or different. For another example, the TCI state 3-2 and TC1 may be same or different. In some embodiments, the scheduling of Communication 421 may be scheduled by PDCCH 341. For example, the TCI state 4-1 and TC1 may be same or different. For another example, the TCI state 4-2 and TC1 may be same or different. In some embodiments, the scheduling of Communication 422 may be scheduled by PDCCH 311. For example, the TCI state 1-1 and TC2 may be same or different. In some embodiments, the scheduling of Communication 422 may be scheduled by PDCCH 331 and PDCCH 332. For example, the TCI state 3-1 and TC2 may be same or different. For another example, the TCI state 3-2 and TC2 may be same or different. In some embodiments, the scheduling of Communication 422 may be scheduled by PDCCH 341. For example, the TCI state 4-1 and TC2 may be same or different. For another example, the TCI state 4-2 and TC2 may be same or different.

Figure 4C:
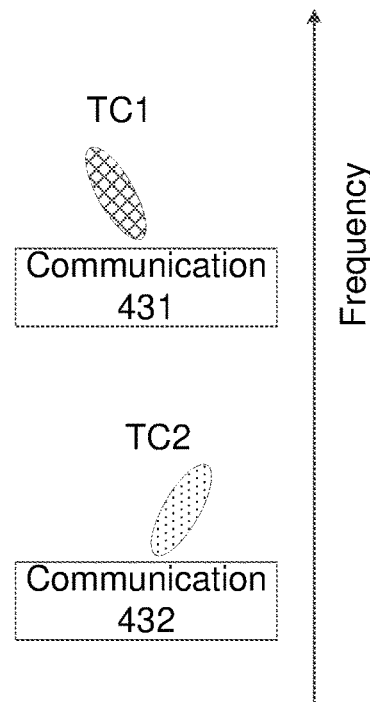

In the example of FIG. 4C, two TCI states or two spatial relation info (For example, represented as TC1 and TC2) may be configured/indicated to the terminal device 130 for Communication 431 and Communication 432, respectively. As shown in FIG. 4C, the terminal device 130 may receive or transmit Communication 431 with TC1 and receive or transmit Communication 432 with TC2. For example, the terminal device 130 may receive PDSCH 431 (and/or downlink RS 431) with TC1 and receive PDSCH 432 (and/or downlink RS 432) with TC2. For another example, the terminal device 130 may transmit PUSCH 431 (and/or PUCCH 431 and/or uplink RS 431) with TC1 and transmit PUSCH 432 (and/or PUCCH 432 and/or uplink RS 432) with TC2. In some embodiments, the scheduling of Communication 431 and Communication 432 may be scheduled by PDCCH 311. For example, the TCI state 1-1 and TC1 (or TC2) may be same or different. In some embodiments, the scheduling of Communication 431 and Communication 432 may be scheduled by PDCCH 331 and PDCCH 332. For example, the TCI state 3-1 and TC1 (or TC2) may be same or different. For another example, the TCI state 3-2 and TC1 (or TC2) may be same or different. In some embodiments, the scheduling of Communication 431 and Communication 432 may be scheduled by PDCCH 341. For example, the TCI state 4-1 and TC1 (or TC2) may be same or different. For another example, the TCI state 4-2 and TC1 (or TC2) may be same or different. In some embodiments, Communication 431 and Communication 432 may be scheduled with same information of frequency domain resource assignment and/or same information of time domain resource assignment in PDCCH 311 or (PDCCH 331 and PDCCH 332) or PDCCH 341. In some embodiments, the time domain resource assignments (for example, slot index, starting symbol index, symbol length, ending symbol index) are same for Communication 431 and Communication 432. In some embodiments, the frequency domain resource assignments for Communication 431 and Communication 432 are different or non-overlapping. In some embodiments, Communication 431 and Communication 432 may be parts of an RV of same codeword or same transport block. In some embodiments, Communication 431 and Communication 432 may be different RVs of same codeword or same transport block. In some embodiments, Communication 431 and Communication 432 may be same RV of same codeword or same transport block. In other words, information in Communication 431 and Communication 432 is same.

In the example of FIG. 4D, two TCI states or two spatial relation info (For example, represented as TC1 and TC2) may be configured/indicated to the terminal device 130 for Communication 441 and Communication 442, respectively. As shown in FIG. 4D, the terminal device 130 may receive or transmit Communication 441 with TC1 and receive or transmit Communication 442 with TC2. For example, the terminal device 130 may receive PDSCH 441 (and/or downlink RS 441) with TC1 and receive PDSCH 442 (and/or downlink RS 442) with TC2. For another example, the terminal device 130 may transmit PUSCH 441 (and/or PUCCH 441 and/or uplink RS 441) with TC1 and transmit PUSCH 442 (and/or PUCCH 442 and/or uplink RS 442) with TC2. In some embodiments, Communication 441 and Communication 442 may be PDSCH or PUSCH or PUCCH repetitions. In some embodiments, Communication 441 and Communication 442 may be different RVs of same codeword or same transport block. In some embodiments, Communication 441 and Communication 442 may be same RV of same codeword or same transport block. In other words, information in Communication 441 and Communication 442 is same. In some embodiments, Communication 441 and Communication 442 may be in same slot. In some embodiments, Communication 441 and Communication 442 may be in different slots. For example, Communication 441 and Communication 442 may be adjacent/consequent two slots. For example, in slot n and slot n+1. In some embodiments, the scheduling of Communication 441 and Communication 442 may be scheduled by PDCCH 311. For example, the TCI state 1-1 and TC1 (or TC2) may be same or different. In some embodiments, the scheduling of Communication 441 and Communication 442 may be scheduled by PDCCH 331 and PDCCH 332. For example, the TCI state 3-1 and TC1 (or TC2) may be same or different. For another example, the TCI state 3-2 and TC1 (or TC2) may be same or different. In some embodiments, the scheduling of Communication 441 and Communication 442 may be scheduled by PDCCH 341. For example, the TCI state 4-1 and TC1 (or TC2) may be same or different. For another example, the TCI state 4-2 and TC1 (or TC2) may be same or different.

In the example of FIG. 4E, two TCI states or two spatial relation info (For example, represented as TC1 and TC2) may be configured/indicated to the terminal device 130 for Communications 451, 452, 453 and 454. As shown in FIG. 4E, the terminal device 130 may receive or transmit Communication 451 and Communication 452 with TC1 and receive or transmit Communication 453 and Communication 454 with TC2. For example, the terminal device 130 may receive PDSCH 451 and PDSCH 452 (and/or downlink RS 451 and downlink RS 452) with TC1 and receive PDSCH 453 and PDSCH 454 (and/or downlink RS 453 and downlink RS 454) with TC2. For another example, the terminal device 130 may transmit PUSCH 451 and PUSCH 452 (and/or PUCCH 451 and PUCCH 452 and/or uplink RS 451 and uplink RS 452) with TC1 and transmit PUSCH 453 and PUSCH 454 (and/or PUCCH 453 and PUCCH 454 and/or uplink RS 453 and uplink RS 454) with TC2. In some embodiments, Communications 451, 452, 453 and 454 may be PDSCH or PUSCH or PUCCH repetitions. In some embodiments, Communications 451, 452, 453 and 454 may be different RVs of same codeword or same transport block. In some embodiments, Communications 451, 452, 453 and 454 may be same RV of same codeword or same transport block. In other words, information in Communications 451, 452, 453 and 454 is same. In some embodiments, Communications 451, 452, 453 and 454 may be in same slot. In some embodiments, Communications 451, 452, 453 and 454 may be in different slots. For example, Communications 451, 452, 453 and 454 may be adjacent/consequent four slots. For example, in slot n, slot n+1, slot n+2 and slot n+3. In some embodiments, the scheduling of Communications 451, 452, 453 and 454 may be scheduled by PDCCH 311. For example, the TCI state 1-1 and TC1 (or TC2) may be same or different. In some embodiments, the scheduling of Communications 451, 452, 453 and 454 may be scheduled by PDCCH 331 and PDCCH 332. For example, the TCI state 3-1 and TC1 (or TC2) may be same or different. For another example, the TCI state 3-2 and TC1 (or TC2) may be same or different. In some embodiments, the scheduling of Communications 451, 452, 453 and 454 may be scheduled by PDCCH 341. For example, the TCI state 4-1 and TC1 (or TC2) may be same or different. For another example, the TCI state 4-2 and TC1 (or TC2) may be same or different.

In the example of FIG. 4F, two TCI states or two spatial relation info (For example, represented as TC1 and TC2) may be configured/indicated to the terminal device 130 for Communications 461, 462, 463 and 464. As shown in FIG. 4F, the terminal device 130 may receive or transmit Communication 461 and Communication 463 with TC1 and receive or transmit Communication 462 and Communication 464 with TC2. For example, the terminal device 130 may receive PDSCH 461 and PDSCH 463 (and/or downlink RS 461 and downlink RS 463) with TC1 and receive PDSCH 462 and PDSCH 464 (and/or downlink RS 462 and downlink RS 464) with TC2. For another example, the terminal device 130 may transmit PUSCH 461 and PUSCH 463 (and/or PUCCH 461 and PUCCH 463 and/or uplink RS 461 and uplink RS 463) with TC1 and transmit PUSCH 462 and PUSCH 464 (and/or PUCCH 462 and PUCCH 464 and/or uplink RS 462 and uplink RS 464) with TC2. In some embodiments, Communications 461, 462, 463 and 464 may be PDSCH or PUSCH or PUCCH repetitions. In some embodiments, Communications 461, 462, 463 and 464 may be different RVs of same codeword or same transport block. In some embodiments, Communications 461, 462, 463 and 464 may be same RV of same codeword or same transport block. In other words, information in Communications 461, 462, 463 and 464 is same. In some embodiments, Communications 461, 462, 463 and 464 may be in same slot. In some embodiments, Communications 461, 462, 463 and 464 may be in different slots. For example, Communications 461, 462, 463 and 464 may be adjacent/consequent four slots. For example, in slot n, slot n+1, slot n+2 and slot n+3. In some embodiments, the scheduling of Communications 461, 462, 463 and 464 may be scheduled by PDCCH 311. For example, the TCI state 1-1 and TC1 (or TC2) may be same or different. In some embodiments, the scheduling of Communications 461, 462, 463 and 464 may be scheduled by PDCCH 331 and PDCCH 332. For example, the TCI state 3-1 and TC1 (or TC2) may be same or different. For another example, the TCI state 3-2 and TC1 (or TC2) may be same or different. In some embodiments, the scheduling of Communications 461, 462, 463 and 464 may be scheduled by PDCCH 341. For example, the TCI state 4-1 and TC1 (or TC2) may be same or different. For another example, the TCI state 4-2 and TC1 (or TC2) may be same or different.

In some embodiments, the terminal device 130 may receive an indication to indicate a downlink TCI state (or a beam or a set of QCL parameters), and the source reference signal(s) in the TCI state provides QCL information at least for reception on PDSCH and all of CORESETs in a component carrier (CC). For example, the PDSCH is dedicated or UE-specific.

In some embodiments, the terminal device 130 may receive an indication to indicate an uplink TCI state (or a beam or a spatial relation), and the source reference signal(s) in the TCI state provides a reference for determining uplink transmission spatial filter at least for dynamic grant or configured grant based PUSCH, and all of PUCCH resources in a CC. For example, the PUCCH is dedicated or UE-specific.

In some embodiments, the terminal device 130 may receive an indication to indicate a joint TCI state (or a beam or a set of QCL parameters), and the TCI state refers to at least a common source reference signal used for determining both the downlink QCL information and the uplink transmission spatial filter.

In some embodiments, the terminal device 130 may receive an indication to indicate a downlink TCI state (or a beam or a set of QCL parameters) and an uplink TCI state (or a beam or a spatial relation), and the source reference signal(s) in the DL TCI state provides QCL information at least for reception on PDSCH and all of CORESETs in a component carrier (CC), and the source reference signal(s) in the TCI state provides a reference for determining uplink transmission spatial filter at least for dynamic grant or configured grant based PUSCH, and all of PUCCH resources in a CC. For example, the PUCCH is dedicated or UE-specific. For another example, the PDSCH is dedicated or UE-specific.

In some embodiments, the terminal device 130 may be configured with more than one (For example, represented as M, M is positive integer. For example, M may be 2 or 3 or 4) downlink TCI states, and/or the terminal device 130 may receive an indication to indicate one of the M TCI states, and the source reference signal(s) in the one of the M TCI states or in the indicated one TCI state provides QCL information at least for reception on PDSCH and/or a subset of CORESETs in a CC. For example, the PDSCH is dedicated or UE-specific.

In some embodiments, the terminal device 130 may be configured with more than one (For example, represented as N, N is positive integer. For example, N may be 2 or 3 or 4) uplink TCI states, and/or the terminal device 130 may receive an indication to indicate one of the N TCI states, and the source reference signal(s) in the one of the N TCI states or in the indicated one TCI state provides a reference for determining uplink transmission spatial filter at least for dynamic grant or configured grant based PUSCH, and/or a subset of PUCCH resources in a CC. For example, the PUCCH is dedicated or UE-specific.

In some embodiments, the terminal device 130 may be configured with more than one (For example, represented as M, M is positive integer. For example, M may be 2 or 3 or 4) joint DL/UL TCI states, and/or receive an indication to indicate one from the M joint TCI states, and each one of the M TCI states or the indicated one TCI state refers to at least a common source reference signal used for determining both the downlink QCL information and the uplink transmission spatial filter.

In some embodiments, the terminal device 130 may be configured with more than one (For example, represented as M, M is positive integer. For example, M may be 2 or 3 or 4) downlink TCI states and the terminal device 130 may be configured with more than one (For example, represented as N, N is positive integer. For example, N may be 2 or 3 or 4) uplink TCI states, and/or the terminal device 130 may receive an indication to indicate one from the M downlink TCI states and one from the N uplink TCI states, and the source reference signal(s) in each one of the M DL TCI states or the indicated one DL TCI state provides QCL information at least for reception on PDSCH and/or a subset of CORESETs in a component carrier (CC), and the source reference signal(s) in each one of the N TCI states or in the indicated one UL TCI state provides a reference for determining uplink transmission spatial filter at least for dynamic grant or configured grant based PUSCH, and/or a subset of PUCCH resources in a CC. For example, the PUCCH is dedicated or UE-specific. For another example, the PDSCH is dedicated or UE-specific.

In this disclosure, the terms "time threshold", "threshold" and "timing" can be used interchangeably. The terms "first threshold" and "threshold A" can be used interchangeably. The terms "second threshold" and "threshold B" can be used interchangeably. The terms "transmit", "receive", "transmission", "reception", "scheduling", "schedule", "buffering", "buffer", "detection", "detecting", "detect", "monitor" and "monitoring" can be used interchangeably. The terms "predetermined", "determined", "configured", "indicated", "signaled" and "reported" can be used interchangeably. The terms "configuration", "indication", "information", "signaling" and "parameter" can be used interchangeably. The terms "set", "subset" and "group" can be used interchangeably.

In some embodiments, there may be a first time threshold X and/or a second time threshold Y for the terminal device 130. For example, the first time threshold X and/or the second time threshold Y may be predefined for the terminal device 130. For another example, the first time threshold X and/or the second time threshold Y may be defined based on the capability of the terminal device 130. For another example, the first time threshold X and/or the second time threshold Y may be configured for the terminal device via at least one of RRC, MAC CE and DCI. In some embodiments, the first time threshold X may be the same as or different from the second time threshold Y. In some embodiments, the first time threshold X and/or the second time threshold Y may be the same as the threshold timeDurationForQCL as specified in TS 38.214 or TS 38.306.

In some embodiments, the first time threshold X may be a time duration for determining TCI state for PDSCH or for beam switching. In some embodiments, the first time threshold X may indicate a predetermined/configured time period. The predetermined/configured time period may be Xi ms/us/slots/symbols/sub-slot, where Xi is an integer. For example, $1 \leq Xi \leq 336$. For example, the predetermined time period Xi may be 7, 14 or 28 symbols, such as, 7, 14 or 28 symbols if the subcarrier spacing is 60 KHz and 14 or 28 symbols if the subcarrier spacing is 120 KHz. For another example, the predetermined time period Xi may be L slots, where L is an integer and L may be any one of {0, 1, 2, 3, 4, 5, 6, 7, 8}.

In some embodiments, the second time threshold Y may be a time duration for application timing of an indicated/updated TCI state. In some embodiments, the second time threshold Y may indicate a predetermined/configured time period. The predetermined/configured time period may be Yi ms/us/slots/symbols/sub-slot, where Yi is an integer. For example, $1 \leq Yi \leq 336$. For example, the predetermined time period Yi may be 7, 14 or 28 symbols, such as, 7, 14 or 28 symbols if the subcarrier spacing is 60 KHz and 14 or 28 symbols if the subcarrier spacing is 120 KHz. For another example, the predetermined time period Yi may be may be M slots, where M is an integer and M may be any one of {0, 1, 2, 3, 4, 5, 6, 7, 8}.

In some embodiments, the first time threshold X may indicate a predetermined/configured time period after the last symbol of a PDCCH (represented as "PDCCH P") which schedules a PDSCH. For example, the predetermined/configured time period may be Xi ms/us/slots/symbols/sub-slot. For example, the predetermined time period may be 7, 14 or 28 symbols, such as, 7, 14 or 28 symbols if the subcarrier spacing is 60 KHz and 14 or 28 symbols if the subcarrier spacing is 120 KHz. For example, the predetermined/configured time period may depend on UE capability reported by the terminal device 130.

In some embodiments, the terminal device may receive or detect a PDCCH, and the PDCCH indicates a joint DL/UL TCI state or a separate DL/UL TCI state or a DL TCI state or a UL TCI state. In some embodiments, the second time threshold Y may indicate a predetermined/configured time period after the first or last symbol of the PDCCH or the first or last symbol of the acknowledge of the indication. For example, the indicated joint DL/UL TCI state or separate DL/UL TCI state or DL TCI state or UL TCI state may be applied to PDSCH and/or CORESET and/or PUSCH and/or PUCCH and/or uplink RS and/or downlink RS after the second time threshold Y.

In some embodiments, the terminal device 130 may be configured/indicated with a first TCI state for reception of PDSCH and/or all or a subset of CORESETs. And the terminal device 130 may receive or detect a PDCCH with the first TCI state, and the PDCCH is associated with one CORESET. The terminal device 130 may be indicated with a second TCI state in the DCI received or detected in the PDCCH. After a timing or after the second time threshold Y, the terminal device 130 may receive PDSCH and/or all or the subset of CORESETs with the second TCI state.

Figure 5A:
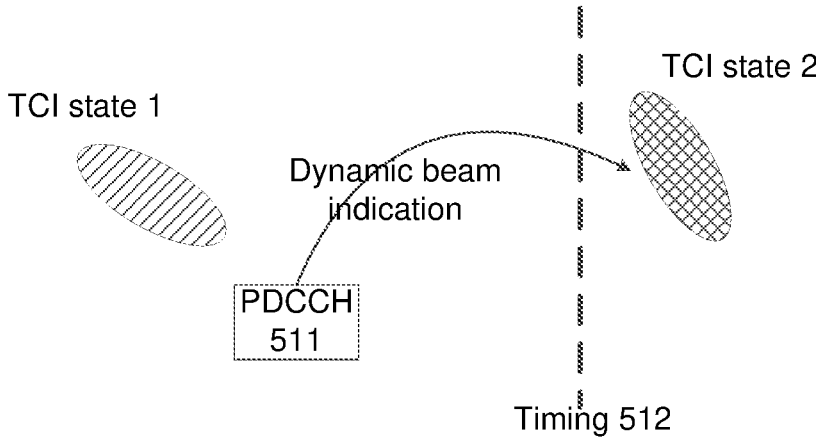
FIGS. 5A-5D illustrate examples of TCI state configuration in accordance with some embodiments of the present disclosure.

FIGS. 5A-5D illustrate examples of TCI state configuration in accordance with some embodiments of the present disclosure. As shown in FIG. 5A, the terminal device 130 may be configured/indicated with TCI state 1 for reception of PDSCH and/or all or a subset of CORESETs. And the terminal device 130 may receive or detect a PDCCH 511 with the TCI state 1. And the PDCCH 511 or the DCI detected in the PDCCH 511 may indicate TCI state 2. And after the timing 512, the terminal device 130 may receive PDSCH and/or all or the subset of CORESETs with the TCI state 2.

The current 3GPP specifications or discussions provide no details on the common beam(s) for data and control information transmission/reception. For example, in case of multi-TRP transmission, more than one beam (TCI state) may be applied for PDCCH (PDCCH repetitions or SFN PDCCH), and/or PDSCH (PDSCH repetitions), and/or PUSCH (PUSCH repetitions), it is unclear how to determine the beam to be updated. For another example, in case of PDCCH repetition, each PDCCH repetition is in one CORESET, and received with one beam, if the PDCCH is to schedule one beam for PDSCH or PUSCH, it is unclear that the indicated one beam is applied to which CORESET. For another example, in case of SFN PDCCH, the PDCCH is in one CORESET, and received with two beams, if the PDCCH is to schedule one beam for PDSCH or PUSCH, it is unclear whether and how the indicated one beam is applied to the CORESET. For another example, in case of PDSCH/PUSCH repetition and/or multi-TRP PDSCH/PUSCH scheduling, two TCI states are indicated in the PDCCH, it is unclear that whether and how to apply the two TCI states to the CORESET.

Figure 5B:
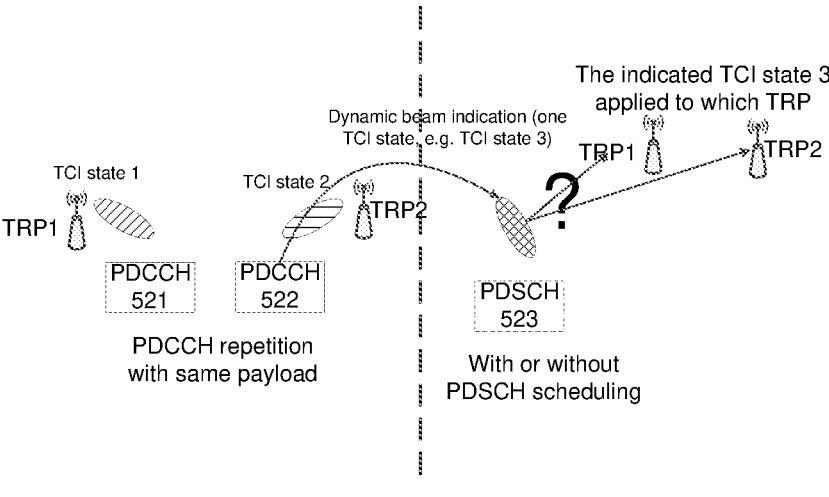

In some embodiments, the terminal device 130 may be configured with two CORESETs (for example, a first CORESET and a second CORESET), and each CORESET is associated with one active TCI state. For example, the first CORESET is associated with TCI state 1, and the second CORESET is associated with TCI state 2. For another example, as shown in FIG. 5B, PDCCH 521 may be in a search space set associated with the first CORESET, and PDCCH 522 may be in a search space set associated with the second CORESET. As shown in FIG. 5B, the terminal device 130 may be configured to receive PDCCH 521 with TCI state 1, and receive PDCCH 522 with TCI state 2. For example, TCI state 1 may be associated with or from TRP1, and TCI state 2 may be associated with or from TRP2. In some embodiments, the payload in PDCCH 521 is same with the payload in PDCCH 522. For example, PDCCH 521 and PDCCH 522 are two PDCCH repetitions. For another example, PDCCH 521 and PDCCH 522 are linked. In some embodiments, the PDCCH 521 and PDCCH 522 indicates a (same) TCI state in the corresponding DCI, for example TCI state 3. In some embodiments, the PDCCH 521 and PDCCH 522 may schedule same PDSCH transmission(s) (For example, 523 as shown in FIG. 5B). In some embodiments, the PDCCH 521 and PDCCH 522 may not schedule PDSCH transmission. For example, as shown in FIG. 5B, 523 may not exist. It is unclear the indicated TCI state 3 is applied to which TRP or which subset of CORESETs after a timing (for example, after the second threshold). For example, it is unclear the indicated TCI state 3 is applied to the first CORESET or the second CORESET after a timing (for example, after the second threshold).

Figure 5C:
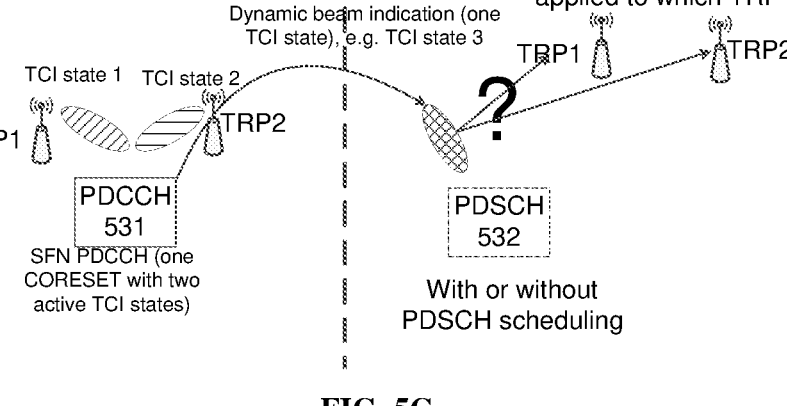

As shown in FIG. 5C, the terminal device 130 may be configured/activated with a CORESET with two activated TCI states. For example, TCI state 1 and TCI state 2. In some embodiments, the terminal device 130 may be configured to receive PDCCH 531 with TCI state 1 and TCI state 2. For example, TCI state 1 may be associated with or from TRP1, and TCI state 2 may be associated with or from TRP2. For example, PDCCH 531 may be transmitted/received in single frequency network (SFN) manner. In some embodiments, the PDCCH 531 may indicate a TCI state in the corresponding DCI, for example TCI state 3. In some embodiments, the PDCCH 531 may schedule PDSCH transmission(s) (For example, 532 as shown in FIG. 5C). In some embodiments, the PDCCH 531 may not schedule PDSCH transmission. For example, as shown in FIG. 5C, 532 may not exist. It is unclear the indicated TCI state 3 is applied to which TRP or which subset of CORESETs after a timing (for example, after the second threshold). It is unclear that whether the indicated TCI state 3 is applied to the CORESET and/or PDCCH after a timing (for example, after the second threshold). For example, it is unclear whether the indicated TCI state 3 is applied to the CORESET after a timing (for example, after the second threshold). For another example, it is unclear the indicated TCI state 3 is applied to replace TCI state 1 or TCI state 2 of the CORESET after a timing (for example, after the second threshold).

Figure 5D:
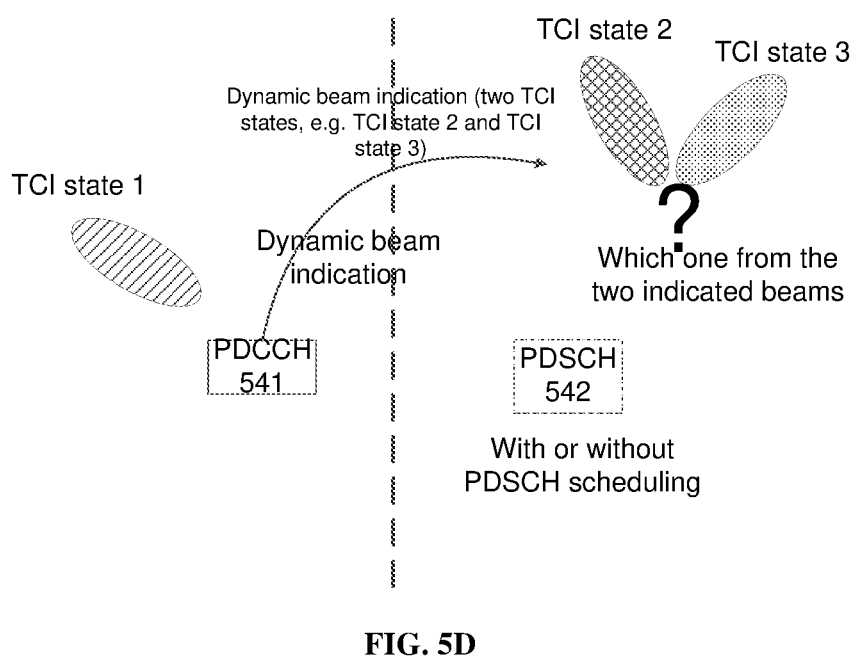

As shown in FIG. 5D, the terminal device 130 may be configured/activated with a CORESET with one TCI state.

For example, TCI state 1. In some embodiments, the terminal device 130 may be configured to receive PDCCH 531 with TCI state 1. In some embodiments, the PDCCH 541 may indicate two TCI states in the corresponding DCI, for example TCI state 2 and TCI state 3. For example, TCI state 1 may be associated with or from either one of TRP1 or TRP2. For another example, TCI state 2 may be associated with or from TRP1, and TCI state 2 may be associated with or from TRP2. In some embodiments, the PDCCH 541 may schedule PDSCH transmission(s) (For example, 542 as shown in FIG. 5D). In some embodiments, the PDCCH 541 may not schedule PDSCH transmission. For example, as shown in FIG. 5D, 542 may not exist. It is unclear the which one of the indicated TCI state 2 and TCI state 3 is applied to the CORESET and/or PDCCH and/or PDSCH after a timing (for example, after the second threshold).

In some embodiments, the terminal device 130 may be configured with M TRPs, where M is a positive integer. For example, 1≤M≤4. For another example, M=2. In some embodiments, each TRP in the M TRPs may be represented by or associated with at least one of the following: a control resource set (CORESET) pool index; a CORESET subset identifier (ID); a subset of CORESETs; a SRS resource set; a SRS resource set ID; a TCI state; a group of TCI states; an ID of a set of reference signals (RSs) for beam failure detection; an ID of a set of RSs for new beam identification; spatial relation information; a subset of spatial relation information; a set of QCL parameters; a subset of RSs for beam failure detection; a subset of RSs for new beam identification; and so on. In some embodiments, the first TRP may be represented by or associated with at least one of the following: a first CORESET pool index (for example, with a value of 0. For another example, CORESET(s) without configuration of the parameter "CORESET pool index"); a first CORESET subset ID; a first subset of CORESETs (For example, CORESET(s) configured with the first CORESET pool index or the first CORESET subset ID. For another example, CORESET(s) not configured with the parameter "CORESET pool index" or the parameter "CORESET subset ID"); a first SRS resource set; a first SRS resource set ID; a first TCI state; a first subset of TCI states; an ID of a first set of reference signals (RSs) for beam failure detection; an ID of a second set of RSs for new beam identification; first spatial relation information; a first subset of spatial relation information; a first set of QCL parameters; a first subset of RSs for beam failure detection; a first subset of RSs for new beam identification; and so on. In some embodiments, the second TRP may be represented by at least one of the following: a second CORESET pool index (for example, with a value of 1); a second CORESET subset ID; a second subset of CORESETs (For example, CORESET(s) configured with the second CORESET pool index or the second CORESET subset ID.); a second SRS resource set; a second SRS resource set ID; a second TCI state; a second subset of TCI states; an ID of a third set of reference signals (RSs) for beam failure detection; an ID of a fourth set of RSs for new beam identification; second spatial relation information; a second subset of spatial relation information; a second set of QCL parameters; a second subset of RSs for beam failure detection; a second subset of RSs for new beam identification; and so on.

In this disclosure, the terms "TRP", "CORESET pool index"; "CORESET subset ID"; "subset of CORESETs", "SRS resource set", "SRS resource set ID", "TCI state", "subset of TCI states", "ID of a set of RSs for beam failure detection", "ID of a set of RSs for new beam identification", "spatial relation information", "subset of spatial relation information", "set of QCL parameters", "subset of RSs for beam failure detection" and "subset of RSs for new beam identification" can be used interchangeably. The terms "first TRP", "TRP 1", "T1", "first CORESET pool index"; "first CORESET subset ID"; "first subset of CORESETs", "first SRS resource set", "first SRS resource set ID", "first TCI state", "first subset of TCI states", "first ID of a set of RSs for beam failure detection", "first ID of a set of RSs for new beam identification", "first spatial relation information", "first subset of spatial relation information", "first set of QCL parameters", "first subset of RSs for beam failure detection" and "first subset of RSs for new beam identification" can be used interchangeably. The terms "second TRP", "TRP 2", "T2", "second CORESET pool index"; "second CORESET subset ID"; "second subset of CORE-SETs", "second SRS resource set", "second SRS resource set ID", "second TCI state", "second subset of TCI states", "second ID of a set of RSs for beam failure detection", "second ID of a set of RSs for new beam identification", "second spatial relation information", "second subset of spatial relation information", "second set of QCL parameters", "second subset of RSs for beam failure detection" and "second subset of RSs for new beam identification" can be used interchangeably. The terms "PUSCH" and "PUSCH MAC CE" can be used interchangeably.

In some embodiments, a TCI state may be configured/indicated to be applied/associated to a channel and/or a RS. For example, the channel may be at least one of PDCCH, PDSCH, PUSCH, PUCCH and CORESET. For another example, the RS may be at least one of DMRS, SRS, UL DMRS, DL DMRS and CSI-RS. In this case, the terminal device may assume that the DMRS port(s) of channel and/or the RS is quasi co-located with the RS(s) in the TCI state with respect to the QCL type parameter(s) given by the TCI state. In this disclosure, the terms "TCI state applied/associated to a channel", "the DMRS port(s) of channel is quasi co-located with the TCI state", "the DMRS port(s) of channel is associated with the TCI state", "channel is QCLed/associated with the TCI state", "DMRS of channel is QCLed/associated with the TCI state" and "the DMRS port(s) of channel is quasi co-located with the RS(s) in the TCI state with respect to the QCL type parameter(s) given by the TCI state" can be used interchangeably. The terms "TCI state applied/associated to a RS", "the RS is quasi co-located with the TCI state", "the RS is quasi co-located with the RS(s) in the TCI state with respect to the QCL type parameter(s) given by the TCI state" and "the RS is quasi co-located with the RS(s) in the TCI state with respect to the QCL type parameter(s) given by the TCI state" can be used interchangeably.

In some embodiments, the terminal device 130 may be configured with Q CORESETs, Q is positive integer. For example, $1 \leq Q \leq 8$. In some embodiments, the CORESETs may be comprised with Q1 subsets, Q1 is positive integer. For example, $1 \leq Q1 \leq 4$. For another example, Q1=2. In some embodiments, the terminal device 130 may be configured with R TCI states, R is positive integer. For example, $1 \leq R \leq 128$. For another example, $1 \leq R \leq 8$. For another example, R may be M and/or N as disclosed in some embodiments. In some embodiments, the R TCI states may be comprised by two groups. For example, the first subset of TCI states and the second subset of TCI states. In some embodiments, the TCI states may be applied for downlink channels/RSs. For example, the channels/RSs include at least one of PDCCH, PDSCH, CSI-RS and DMRS. In some embodiments, the TCI states may be applied for uplink channels/RSs. For example, the channels/RSs include at least one of PUCCH, PUSCH, SRS and DMRS. In some embodiments, the Q CORESETs may be configured for a CC or for a bandwidth part (BWP).

In some embodiments, the terminal device 130 may be configured/activated with R TCI states, and each TCI state is associated with one TRP or one subset of CORESETs. In some embodiments, the index of TRP or the index of subset of CORESETs may be configured or associated with one TCI state. For example, value 0 indicates the TCI state is associated with the first TRP. For another example, value 1 indicates the TCI state is associated with the second TRP. For another example, if the index is not configured for a TCI state, the TCI state is associated with the first TRP. In some embodiments, for the first subset of CORESETs or the first TRP, a first subset of TCI states may be configured or associated. In some embodiments, for the second subset of CORESETs or the second TRP, a second subset of TCI states may be configured or associated. In some embodiments, the first subset of TCI states and the second subset of TCI states are included in the R TCI states. In some embodiments, the R TCI states may be configured for a CC or for a bandwidth part (BWP).

Figure 6A:
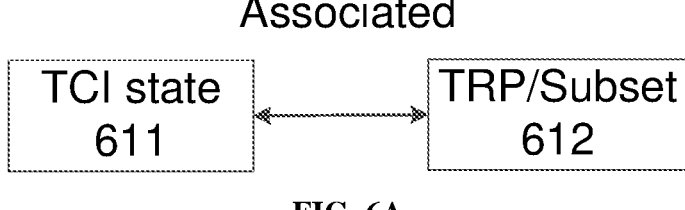
FIGS. 6A and 6B illustrate examples of association between TCI state and CORESET in accordance with some embodiments of the present disclosure.
Figure 6B:
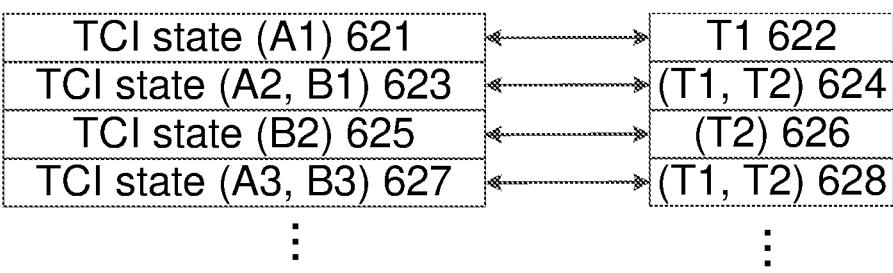

FIGS. 6A and 6B illustrate examples of association between TCI state and CORESET in accordance with some embodiments of the present disclosure. As shown in FIG. 6A, the terminal device 130 may be configured that a TCI state 611 associated with a TRP or a subset 612.

In some embodiments, the terminal device 130 may be configured that TCI states A1, A2, A3 associated with T1, and TCI states B1, B2, B3 associated with T2. As shown in FIG. 6B, TCI state A1 621 may be mapped to a first codepoint, TCI states (A2, B1) 623 may be mapped to a second codepoint, TCI state B2 625 may be mapped to a third codepoint, and TCI states (A3, B3) 627 may be mapped to a fourth codepoint. And if the terminal device 130 is indicated by one of the codepoints, the terminal device 130 obtains the information of TCI state(s), and also obtains the information of associated TRP or associated subset.

In some embodiments, there may be F TCI state fields in a PDCCH or linked two PDCCH candidates for indicating/updating the TCI state(s) for a terminal device. F is positive integer. For example, $1 \leq F \leq 8$. For another example, F may be any one of $\{1,2,3,4\}$. In some embodiments, a first TCI state field may be used for indicating TCI state(s) for a first subset of CORESETs and/or PDSCH and/or a first subset of CSI-RS and/or PUSCH and/or a first subset of PUCCH and/or a first subset of SRS and/or for downlink and/or for jointly downlink and uplink. In some embodiments, a second TCI state field may be used for indicating TCI state(s) for a second subset of CORESETs and/or PDSCH and/or a second subset of CSI-RS and/or PUSCH and/or a second subset of PUCCH and/or a second subset of SRS and/or for uplink. In some embodiments, a third TCI state field may be used for indicating downlink (DL) TCI state(s). In some embodiments, a fourth TCI state field may be used for indicating uplink (UL) TCI state(s). In some embodiments, a fifth TCI state field may be used for indicating TCI state(s) for a first subset of CORESETs and/or PDSCH and/or a first subset of CSI-RS. In some embodiments, a sixth TCI state field may be used for indicating TCI state(s) for PUSCH and/or a first subset of PUCCH and/or a first subset of SRS and/or for downlink and/or for jointly downlink and uplink. In some embodiments, a seventh TCI state field may be used for indicating TCI state(s) for a second subset of CORESETs and/or PDSCH and/or a second subset of CSI-RS. In some embodiments, an eighth TCI state field may be used for indicating TCI state(s) for PUSCH and/or a second subset of PUCCH and/or a second subset of SRS and/or for uplink.

In some embodiments, the configuration and/or association and/or indication may be transmitted to the terminal device 130 via at least one of RRC, MAC CE and DCI.

In some embodiments, the network device 110 may configure a set of TCI states/TCI state groups to the terminal device 130 via RRC signaling and/or MAC CE. For example, the set of TCI states/TCI state groups may include P1 TCI states/TCI state groups, where P1 is an integer. For example, $0 \leq P1 \leq 128$. For another example, $0 \leq P1 \leq 8$. In some embodiments, the set of TCI states/TCI state groups T1 may be the same as those TCI states (for example, up to C TCI states. C is positive integer. For example, $1 \leq C \leq 64$. For another example, C may be any one of {8, 16, 32, 64}.) mapping to the TCI codepoints in one component carrier (CC)/DL bandwidth part (BWP) or in a set of CCs/DL BWPs. In some embodiments, each TCI state or TCI state group may be mapped to a codepoint in a TCI state field. In some embodiments, the TCI states in a TCI state group may be mapped to codepoints in F TCI state fields. For example, one or two TCI states may be mapped to each codepoint in one of the F TCI state field. In some embodiments, there may be D TCI states in a TCI state group. D is positive integer. For example, $1 \leq D \leq 4$. In some embodiments, the set of TCI states/TCI state groups T1 may be used by the terminal device 130 for channel/RS reception and/or channel/RS transmission. For example, the channel/RS reception and/or channel/RS transmission may include at least one of PDSCH reception and/or PDCCH reception and/or PUSCH transmission and/or PUCCH transmission and/or CSI-RS reception and/or SRS transmission and/or DMRS transmission and/or DMRS reception. For example, the TCI state or the group of TCI states (that is, TCI state A) selected from the set of TCI states/TCI state groups may be indicated, via DCI, to the terminal device 130. And TCI state A may be used for QCL information for at least one of PDCCH, PDSCH, CSI-RS, PUSCH, PUCCH and SRS.

In some embodiments, the network device 110 may transmit (for example, 220 as shown in FIG. 2), to the terminal device 130, a PDCCH or linked two PDCCH candidates for indicating the first TCI state or the first group of TCI states (that is, TCI state A). For example, a second TCI state or a second group of TCI states (also referred to as "TCI state B" in the following) may be used at the time when receiving the PDCCH or linked two PDCCH candidates, and the second TCI state or the second group of TCI states may be updated to be the first TCI state or the first group of TCI states (that is, TCI state A) after a timing. For example, the timing may be based on the second threshold.

In this disclosure, the terms "TCI state", "a pair of TCI states", "TCI state pair", "TCI state group", "a group of TCI states", "spatial relation", "spatial relation info", "spatial relation information", "beam", "spatial relation", "set of QCL parameter(s)", "QCL parameter(s)", "QCL assumption" and "QCL configuration" can be used interchangeably. The terms "TCI state A", "first TCI state", "first pair of TCI states", "first group of TCI states", "first spatial relation", "first spatial relation info", "first spatial relation information", "first beam", "first spatial relation", "first set of QCL parameter(s)", "first QCL parameter(s)", "first QCL assumption" and "first QCL configuration" can be used interchangeably. The terms "TCI state B", "second TCI state", "second pair of TCI states", "second group of TCI states", "second spatial relation", "second spatial relation info", "second spatial relation information", "second beam", "second spatial relation", "second set of QCL parameter(s)", "second QCL parameter(s)", "second QCL assumption" and "second QCL configuration" can be used interchangeably.

In some embodiments, the terminal device 130 may be indicated with one or two TCI states in a DCI, and the indicated TCI state(s) is applied to corresponding/associated TRP and/or subset of CORESETs and/or RS and/or PDSCH and/or PUSCH and/or PUCCH after a timing. For example, the timing is based on the second threshold. In some embodiments, the corresponding/associated TRP and/or subset of CORESETs and/or RS and/or PDSCH and/or PUSCH and/or PUCCH is based on the associated index of TRP/subset for the indicated TCI states. For example, there may be one TCI state indicated in the DCI, and the indicated TCI state is applied to the first TRP/subset of CORESETs after the timing if the indicated TCI state is configured/associated with the first TRP/subset. For another example, there may be one TCI state indicated in the DCI, and the indicated TCI state is applied to the second TRP/subset of CORESETs after the timing if the indicated TCI state is configured/associated with the second TRP/subset. For another example, there may be one TCI state indicated in the DCI, and the indicated TCI state is applied to the first TRP/subset of CORESETs after the timing if the indicated TCI state is not configured/associated with an index of TRP/subset.

In some embodiments, the terminal device 130 may be configured with a first subset of CORESETs and a second subset of CORESETs, and the first subset of CORESETs is configured/indicated/activated with a first TCI state, and the second subset of CORESETs is configured/indicated/activated with a second TCI state. The terminal device 130 may detect a DCI in a PDCCH in a search space set associated with one CORESET in the first subset. In some embodiments, the terminal device 130 may be indicated with a third TCI state in the DCI, and the DCI schedules PDSCH transmission(s). In some embodiments, if the third TCI state is associated with the second TRP/subset, the DMRS port(s) of the PDSCH transmission(s) is associated with the second TCI state. For example, if the time offset between the reception of the DCI and the corresponding PDSCH is equal to or greater than a threshold. For example, the threshold may be the first threshold. In some embodiments, if the third TCI state is associated with the second TRP/subset, the DMRS port(s) of the PDSCH transmission(s) is associated with the first TCI state. In some embodiments, if the third TCI state is associated with the second TRP/subset, the DMRS port(s) of the PDSCH transmission(s) is associated with the first TCI state, if the time offset between the reception of the DCI and the corresponding PDSCH is less than a threshold. For example, the threshold may be the first threshold. In some embodiments, if the third TCI state is associated with the first TRP/subset, the DMRS port(s) of the PDSCH transmission(s) is associated with the first TCI state. In some embodiments, the terminal device may assume the DMRS ports(s) of the PDSCH transmission(s) is associated with the first TCI state and the second TCI state if the time offset between the reception of the DCI and the corresponding PDSCH is less than a threshold. For example, the threshold may be the first threshold. For another example, the terminal device supports two default TCI states.

Figure 7A:
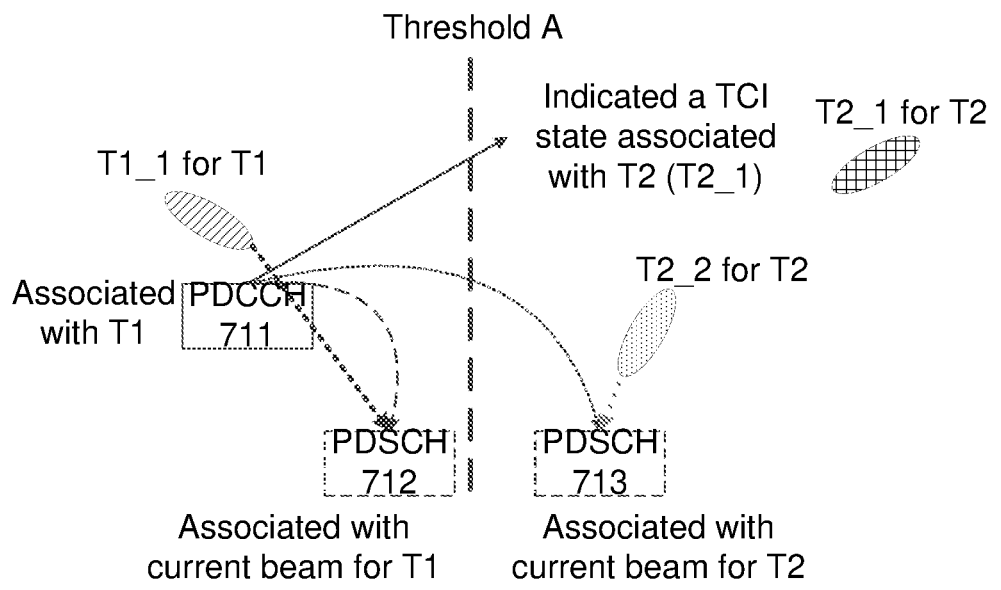
FIGS. 7A-7H illustrate examples of TCI state applying for PDSCH in accordance with some embodiments of the present disclosure.

FIGS. 7A-7H illustrate examples of TCI state applying for PDSCH in accordance with some embodiments of the present disclosure. As shown in FIG. 7A, the terminal device 130 may be configured a TCI state T1_1 for T1, and a TCI state T2_2 for T2. And the terminal device 130 may receive a PDCCH 711 (which is associated with T1) with T1_1, and the PDCCH 711 may schedule PDSCH, and the PDCCH 711 may indicate a TCI state T2_1, which is associated with T2. In some embodiments, if the first symbol of the PDSCH is earlier than threshold A (for example, PDSCH 712), the DMRS of PDSCH 712 is associated with TCI state T1_1. In some embodiments, if the first symbol of the PDSCH is not earlier than threshold A (for example, PDSCH 713), the DMRS of PDSCH 713 is associated with TCI state T2_2.

Figure 7B:
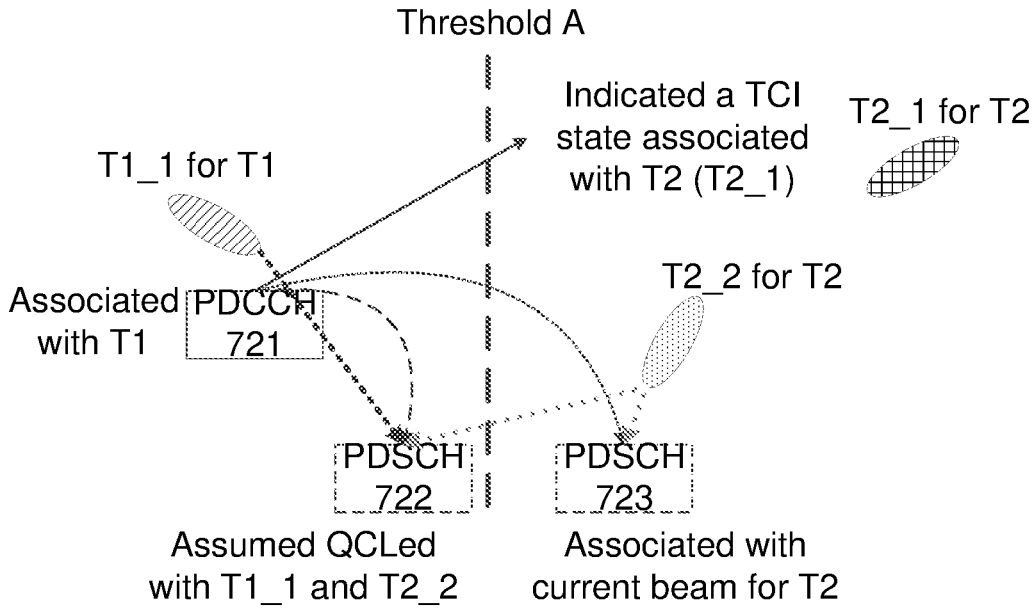

As shown in FIG. 7B, the terminal device 130 may be configured a TCI state T1_1 for T1, and a TCI state T2_2 for T2. And the terminal device 130 may receive a PDCCH 721 (which is associated with T1) with T1_1, and the PDCCH 721 may schedule PDSCH, and the PDCCH 721 may indicate a TCI state T2_1, which is associated with T2. In some embodiments, if the first symbol of the PDSCH is earlier than threshold A (for example, PDSCH 722), the DMRS of PDSCH 722 is assumed to be associated with TCI state T1_1 and TCI state T2_2. For example, the terminal device supports two default TCI states. In some embodiments, if the first symbol of the PDSCH is not earlier than threshold A (for example, PDSCH 723), the DMRS of PDSCH 723 is associated with TCI state T2_2.

In some embodiments, the terminal device 130 may be configured with a first subset of CORESETs and a second subset of CORESETs, and the first subset of CORESETs is configured/indicated/activated with a first TCI state, and the second subset of CORESETs is configured/indicated/activated with a second TCI state. The terminal device 130 may detect a DCI in a PDCCH in a search space set associated with one CORESET in the first subset. In some embodiments, the terminal device 130 may be indicated with a third TCI state and a fourth TCI state in the DCI, and the DCI schedules PDSCH transmission(s). In some embodiments, if the third TCI state is associated with the first TRP/subset and the fourth TCI state is associated with the second TRP/subset, the DMRS port(s) of the PDSCH transmission(s) is associated with the first TCI state and the second TCI state. For example, the mapping/association between the PDSCH transmission and the first TCI state and/or the second TCI state is disclosed in some embodiments in this disclosure. For example, if the time offset between the reception of the DCI and the corresponding PDSCH is equal to or greater than a threshold. For example, the threshold may be the first threshold. In some embodiments, if the third TCI state is associated with the first TRP/subset and the fourth TCI state is associated with the second TRP/subset, the DMRS port(s) of the PDSCH transmission(s) is associated with the first TCI state. In some embodiments, if the third TCI state is associated with the first TRP/subset and the fourth TCI state is associated with the second TRP/subset, the DMRS port(s) of the PDSCH transmission(s) is associated with the first TCI state, if the time offset between the reception of the DCI and the corresponding PDSCH is less than a threshold. For example, the threshold may be the first threshold. In some embodiments, the terminal device may assume the DMRS ports(s) of the PDSCH transmission(s) is associated with the first TCI state and the second TCI state if the time offset between the reception of the DCI and the corresponding PDSCH is less than a threshold. For example, the threshold may be the first threshold. For another example, the terminal device supports two default TCI states.

Figure 7C:
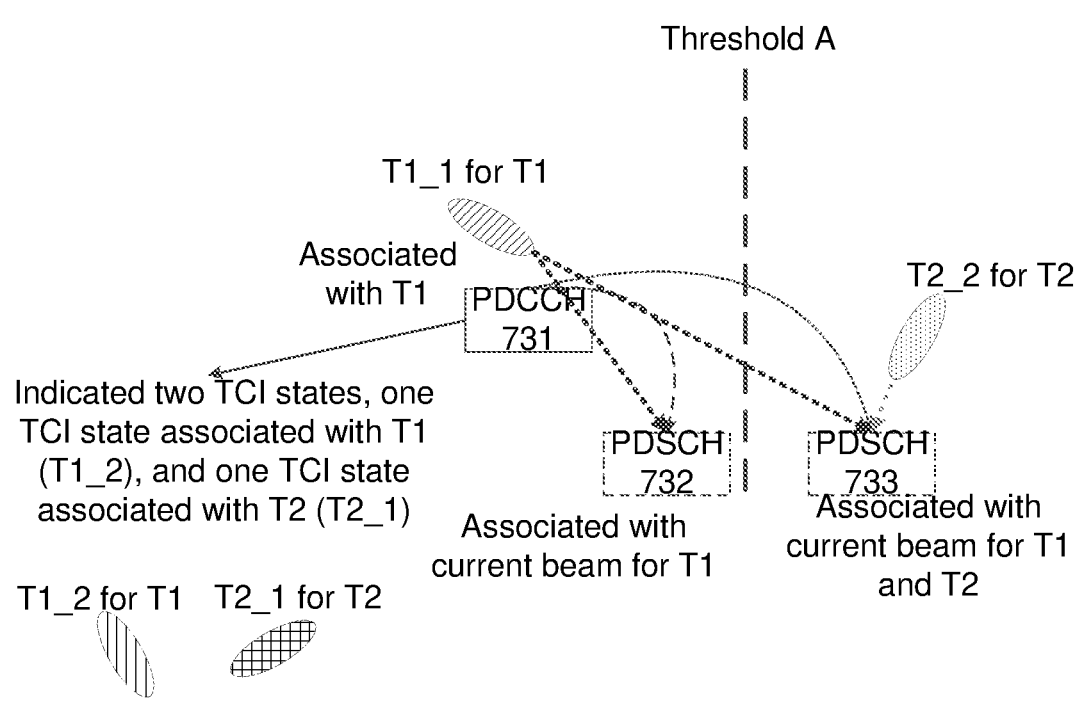

As shown in FIG. 7C, the terminal device 130 may be configured a TCI state T1_1 for T1, and a TCI state T2_2 for T2. And the terminal device 130 may receive a PDCCH 731 (which is associated with T1) with T1_1, and the PDCCH 731 may schedule PDSCH, and the PDCCH 731 may indicate a TCI state T1_2 and a TCI state T2_1, and T1_2 is associated with T1, T2_1 is associated with T2. In some embodiments, if the first symbol of the PDSCH is earlier than threshold A (for example, PDSCH 732), the DMRS of PDSCH 732 is associated with TCI state T1_1. In some embodiments, if the first symbol of the PDSCH is not earlier than threshold A (for example, PDSCH 733), the DMRS of PDSCH 733 is associated with TCI state T1_1 and T2_2.

Figure 7D:
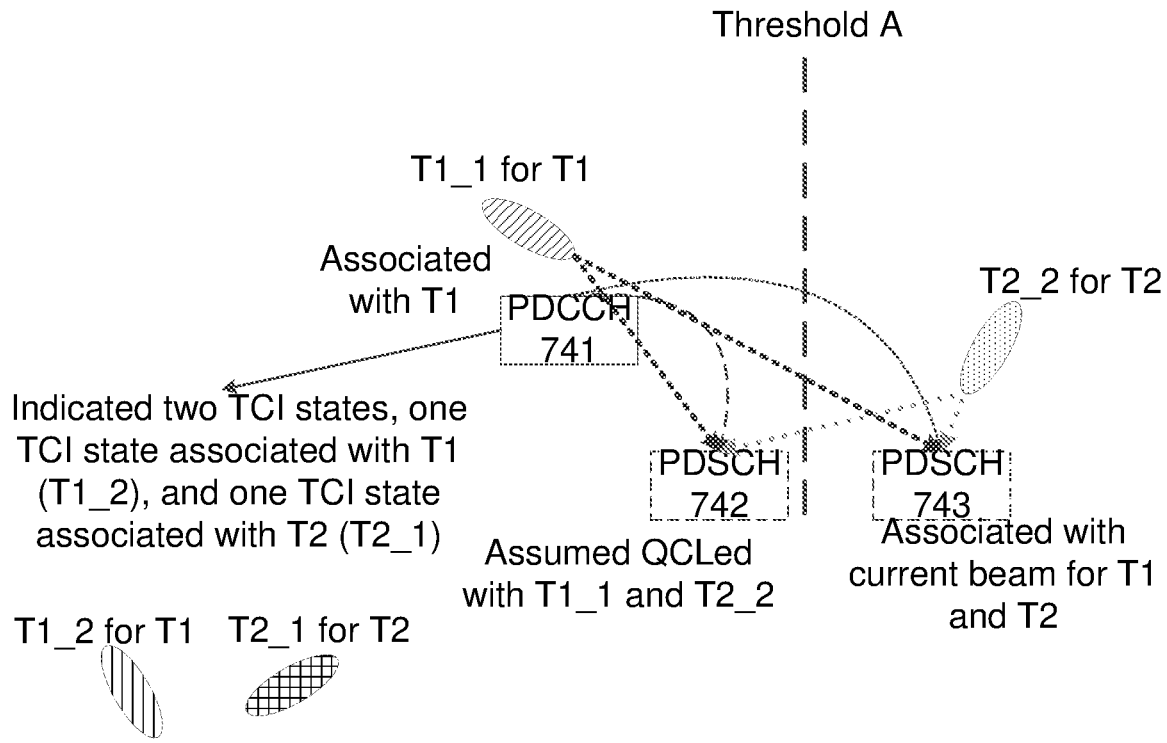

As shown in FIG. 7D, the terminal device 130 may be configured a TCI state T1_1 for T1, and a TCI state T2_2 for T2. And the terminal device 130 may receive a PDCCH 741 (which is associated with T1) with T1_1, and the PDCCH 741 may schedule PDSCH, and the PDCCH 741 may indicate a TCI state T1_2 and a TCI state T2_1, and T1_2 is associated with T1, T2_1 is associated with T2. In some embodiments, if the first symbol of the PDSCH is earlier than threshold A (for example, PDSCH 742), the DMRS of PDSCH 742 is assumed to be associated with TCI state T1_1 and TCI state T2_2. For example, the terminal device supports two default TCI states. In some embodiments, if the first symbol of the PDSCH is not earlier than threshold A (for example, PDSCH 743), the DMRS of PDSCH 743 is associated with TCI state T1_1 and TCI state T2_2.

In some embodiments, the terminal device 130 may be configured with a first subset of CORESETs and a second subset of CORESETs, and the first subset of CORESETs is configured/indicated/activated with a first TCI state, and the second subset of CORESETs is configured/indicated/activated with a second TCI state. The terminal device may be configured with a first PDCCH in a first search space set in a first CORESET in the first subset associated/linked with a second PDCCH in a second search space set in a second CORESET in the second subset. For example, the first PDCCH and the second PDCCH are two PDCCH repetitions. For another example, the payload in the first PDCCH is same as the payload in the second PDCCH. For another example, the scheduling/indication in the first PDCCH is same as the scheduling/indication in the second PDCCH. For another example, the first PDCCH and the second PDCCH are disclosed in some embodiments in this disclosure. The terminal device 130 may receive the first PDCCH and the second PDCCH. In some embodiments, the terminal device 130 may be indicated with a third TCI state in the DCI of the first PDCCH and second PDCCH, and the DCI schedules PDSCH transmission(s). In some embodiments, if the third TCI state is associated with the second TRP/subset, the DMRS port(s) of the PDSCH transmission(s) is associated with the second TCI state. For example, if the time offset between the reception of the DCI and the corresponding PDSCH is equal to or greater than a threshold. For example, the threshold may be the first threshold. In some embodiments, if the third TCI state is associated with the second TRP/subset, the DMRS port(s) of the PDSCH transmission(s) is associated with the first TCI state. In some embodiments, if the third TCI state is associated with the second TRP/subset, the DMRS port(s) of the PDSCH transmission(s) is associated with the first TCI state, if the time offset between the reception of the DCI and the corresponding PDSCH is less than a threshold. For example, the threshold may be the first threshold. In some embodiments, if the third TCI state is associated with the first TRP/subset, the DMRS port(s) of the PDSCH transmission(s) is associated with the first TCI state. In some embodiments, the terminal device may assume the DMRS ports(s) of the PDSCH transmission(s) is associated with the first TCI state and the second TCI state if the time offset between the reception of the DCI and the corresponding PDSCH is less than a threshold. For example, the threshold may be the first threshold. For another example, the terminal device supports two default TCI states.

Figure 7E:
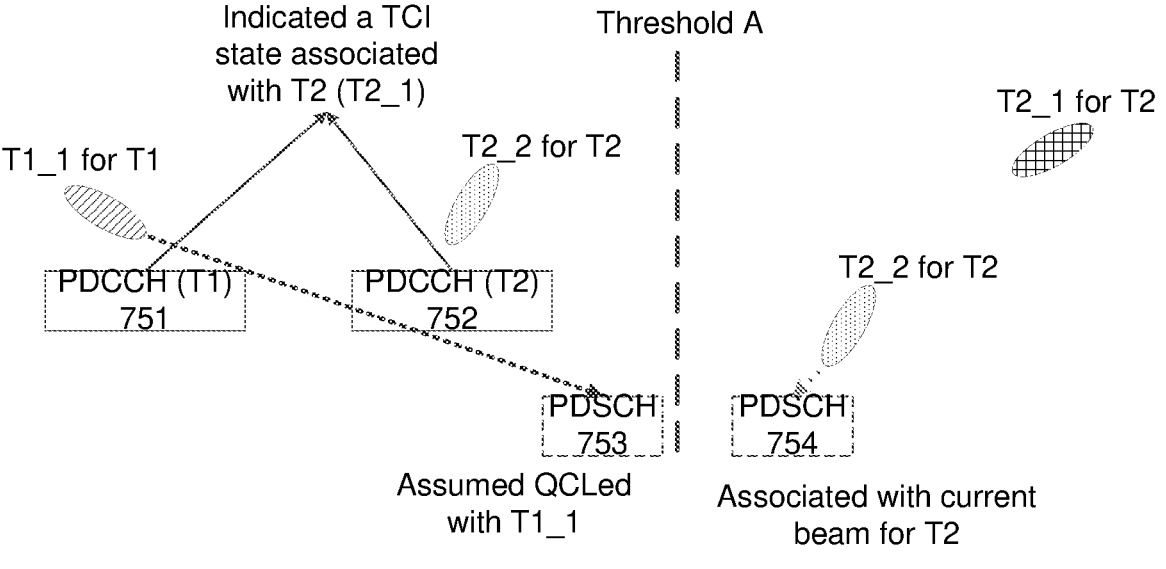

As shown in FIG. 7E, the terminal device 130 may be configured a TCI state T1_1 for T1, and a TCI state T2_2 for T2. And the terminal device 130 may receive PDCCH 751 (which is associated with T1) with T1_1, and receive PDCCH 752 (which is associated with T2) with T2_2 and the PDCCH 751 and PDCCH 752 may schedule PDSCH, and the PDCCH 751 and PDCCH 752 may indicate a TCI state T2_1, which is associated with T2. In some embodiments, if the first symbol of the PDSCH is earlier than threshold A (for example, PDSCH 753), the DMRS of PDSCH 753 is associated with TCI state T1_1. In some embodiments, if the first symbol of the PDSCH is not carlier than threshold A (for example, PDSCH 754), the DMRS of PDSCH 754 is associated with TCI state T2_2.

Figure 7F:
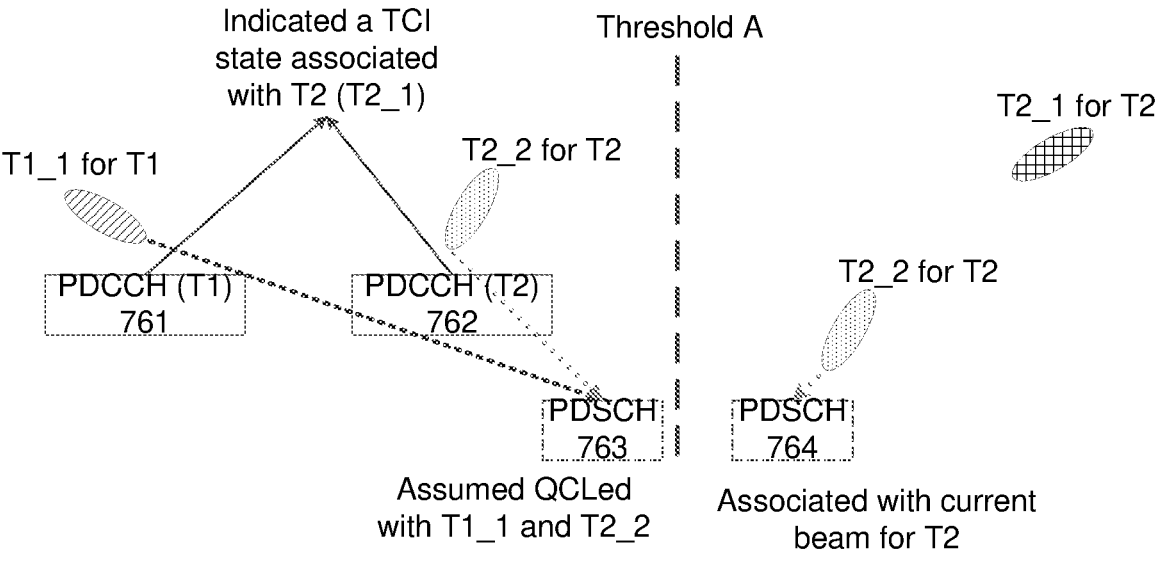

As shown in FIG. 7F, the terminal device 130 may be configured a TCI state T1_1 for T1, and a TCI state T2_2 for T2. And the terminal device 130 may receive PDCCH 761 (which is associated with T1) with T1_1, and receive PDCCH 762 (which is associated with T2) with T2_2 and the PDCCH 761 and PDCCH 762 may schedule PDSCH, and the PDCCH 761 and PDCCH 762 may indicate a TCI state T2_1, which is associated with T2. In some embodiments, if the first symbol of the PDSCH is carlier than threshold A (for example, PDSCH 763), the DMRS of PDSCH 763 is assumed to be associated with TCI state T1_1 and TCI state T2_2. For example, the terminal device supports two default TCI states. In some embodiments, if the first symbol of the PDSCH is not carlier than threshold A (for example, PDSCH 764), the DMRS of PDSCH 764 is associated with TCI state T2_2.

In some embodiments, the terminal device 130 may be configured with a first subset of CORESETs and a second subset of CORESETs, and the first subset of CORESETs is configured/indicated/activated with a first TCI state, and the second subset of CORESETs is configured/indicated/activated with a second TCI state. The terminal device may be configured with a first PDCCH in a first search space set in a first CORESET in the first subset associated/linked with a second PDCCH in a second search space set in a second CORESET in the second subset. For example, the first PDCCH and the second PDCCH are two PDCCH repetitions. For another example, the payload in the first PDCCH is same as the payload in the second PDCCH. For another example, the scheduling/indication in the first PDCCH is same as the scheduling/indication in the second PDCCH. For another example, the first PDCCH and the second PDCCH are disclosed in some embodiments in this disclosure. The terminal device 130 may receive the first PDCCH and the second PDCCH. In some embodiments, the terminal device 130 may be indicated with a third TCI state and a fourth TCI state in the DCI of the first PDCCH and second PDCCH, and the DCI schedules PDSCH transmission(s). In some embodiments, if the third TCI state is associated with the first TRP/subset and the fourth TCI state is associated with the second TRP/subset, the DMRS port(s) of the PDSCH transmission(s) is associated with the first TCI state and the second TCI state. For example, the mapping/association between the PDSCH transmission and the first TCI state and/or the second TCI state is disclosed in some embodiments in this disclosure. For example, if the time offset between the reception of the DCI and the corresponding PDSCH is equal to or greater than a threshold. For example, the threshold may be the first threshold. In some embodiments, if the third TCI state is associated with the first TRP/subset and the fourth TCI state is associated with the second TRP/subset, the DMRS port(s) of the PDSCH transmission(s) is associated with the first TCI state. In some embodiments, if the third TCI state is associated with the first TRP/subset and the fourth TCI state is associated with the second TRP/subset, the DMRS port(s) of the PDSCH transmission(s) is associated with the first TCI state, if the time offset between the reception of the DCI and the corresponding PDSCH is less than a threshold. For example, the threshold may be the first threshold. In some embodiments, the terminal device may assume the DMRS ports(s) of the PDSCH transmission(s) is associated with the first TCI state and the second TCI state if the time offset between the reception of the DCI and the corresponding PDSCH is less than a threshold. For example, the threshold may be the first threshold. For another example, the terminal device supports two default TCI states.

Figure 7G:
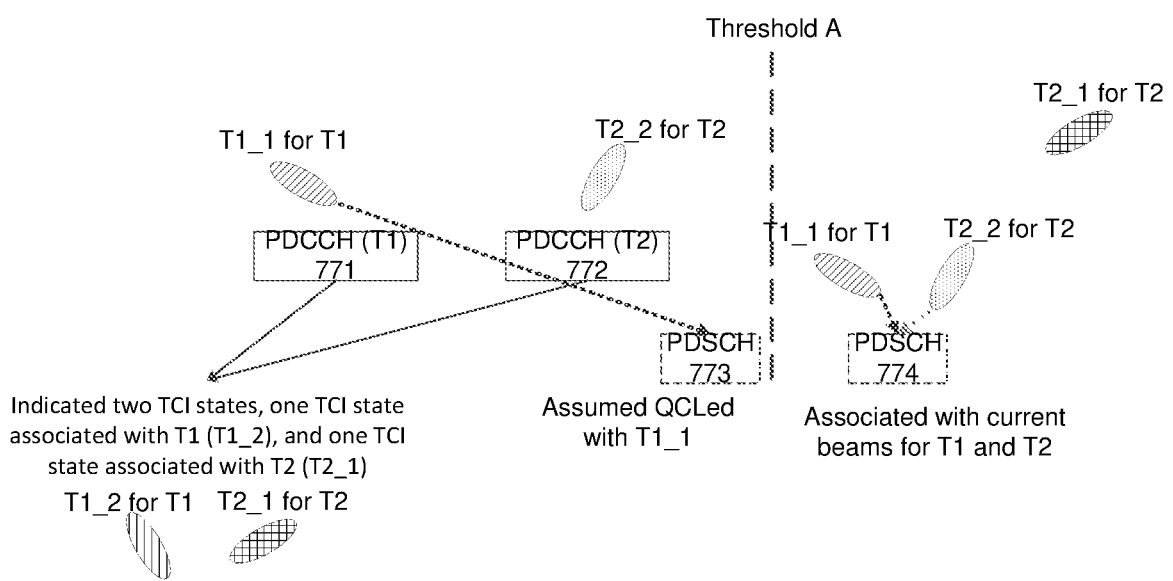

As shown in FIG. 7G, the terminal device 130 may be configured a TCI state T1_1 for T1, and a TCI state T2_2 for T2. And the terminal device 130 may receive PDCCH 771 (which is associated with T1) with T1_1, and receive PDCCH 772 (which is associated with T2) with T2_2 and the PDCCH 771 and PDCCH 772 may schedule PDSCH, and the PDCCH 771 and PDCCH 772 may indicate a TCI state T1_2 and a TCI state T2_1, and T1_2 is associated with T1, T2_1 is associated with T2. In some embodiments, if the first symbol of the PDSCH is earlier than threshold A (for example, PDSCH 773), the DMRS of PDSCH 773 is associated with TCI state T1_1. In some embodiments, if the first symbol of the PDSCH is not earlier than threshold A (for example, PDSCH 774), the DMRS of PDSCH 774 is associated with TCI state T1_1 and T2_2.

Figure 7H:
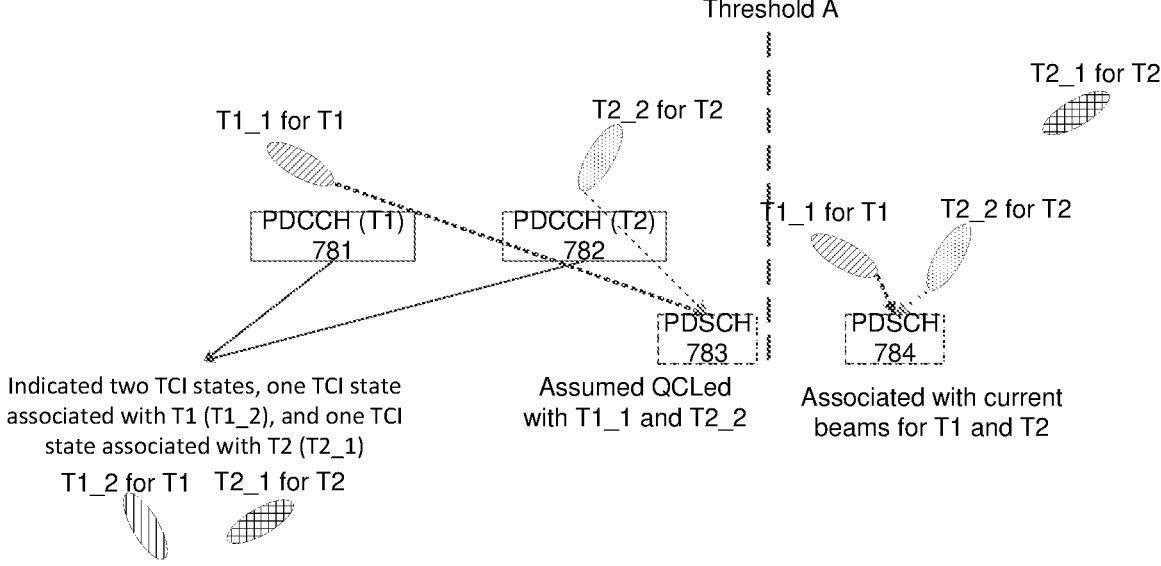

As shown in FIG. 7H, the terminal device 130 may be configured a TCI state T1_1 for T1, and a TCI state T2_2 for T2. And the terminal device 130 may receive PDCCH 781 (which is associated with T1) with T1_1, and receive PDCCH 782 (which is associated with T2) with T2_2 and the PDCCH 781 and PDCCH 782 may schedule PDSCH, and the PDCCH 781 and PDCCH 782 may indicate a TCI state T1_2 and a TCI state T2_1, and T1_2 is associated with T1, T2_1 is associated with T2. In some embodiments, if the first symbol of the PDSCH is earlier than threshold A (for example, PDSCH 783), the DMRS of PDSCH 783 is assumed to be associated with TCI state T1_1 and TCI state T2_2. For example, the terminal device supports two default TCI states. In some embodiments, if the first symbol of the PDSCH is not carlier than threshold A (for example, PDSCH 784), the DMRS of PDSCH 784 is associated with TCI state T1_1 and TCI state T2_2.

In some embodiments, the terminal device 130 may be configured with a CORESET, and the CORESET is configured/indicated/activated with a first TCI state and a second TCI state. For example, the first TCI state is associated with the first TRP/subset, and the second TCI state is associated with the second TRP/subset. The terminal device 130 may detect a DCI in a PDCCH in a search space set associated with the CORESET. In some embodiments, the terminal device 130 may be configured with a first subset of CORESETs and a second subset of CORESETs, and the first subset of CORESETs is configured/indicated/activated with a fourth TCI state, and the second subset of CORESETs is configured/indicated/activated with a fifth TCI state. For example, the first TCI state may be same or different from the fourth TCI state. For another example, the second TCI state may be same or different from the fifth TCI state. In some embodiments, the terminal device 130 may be indicated with a third TCI state in the DCI, and the DCI schedules PDSCH transmission(s). In some embodiments, if the third TCI state is associated with the second TRP/subset, the DMRS port(s) of the PDSCH transmission(s) is associated with the second TCI state. For example, if the time offset between the reception of the DCI and the corresponding PDSCH is equal to or greater than a threshold. For example, the threshold may be the first threshold. In some embodiments, if the third TCI state is associated with the second TRP/subset, the DMRS port(s) of the PDSCH transmission(s) is associated with the first TCI state. In some embodiments, if the third TCI state is associated with the second TRP/subset, the DMRS port(s) of the PDSCH transmission(s) is associated with the first TCI state, if the time offset between the reception of the DCI and the corresponding PDSCH is less than a threshold. For example, the threshold may be the first threshold. In some embodiments, if the third TCI state is associated with the first TRP/subset, the DMRS port(s) of the PDSCH transmission(s) is associated with the first TCI state. In some embodiments, the terminal device may assume the DMRS ports(s) of the PDSCH transmission(s) is associated with the first TCI state and the second TCI state if the time offset between the reception of the DCI and the corresponding PDSCH is less than a threshold. For example, the threshold may be the first threshold. For another example, the terminal device supports two default TCI states.

Figure 8A:
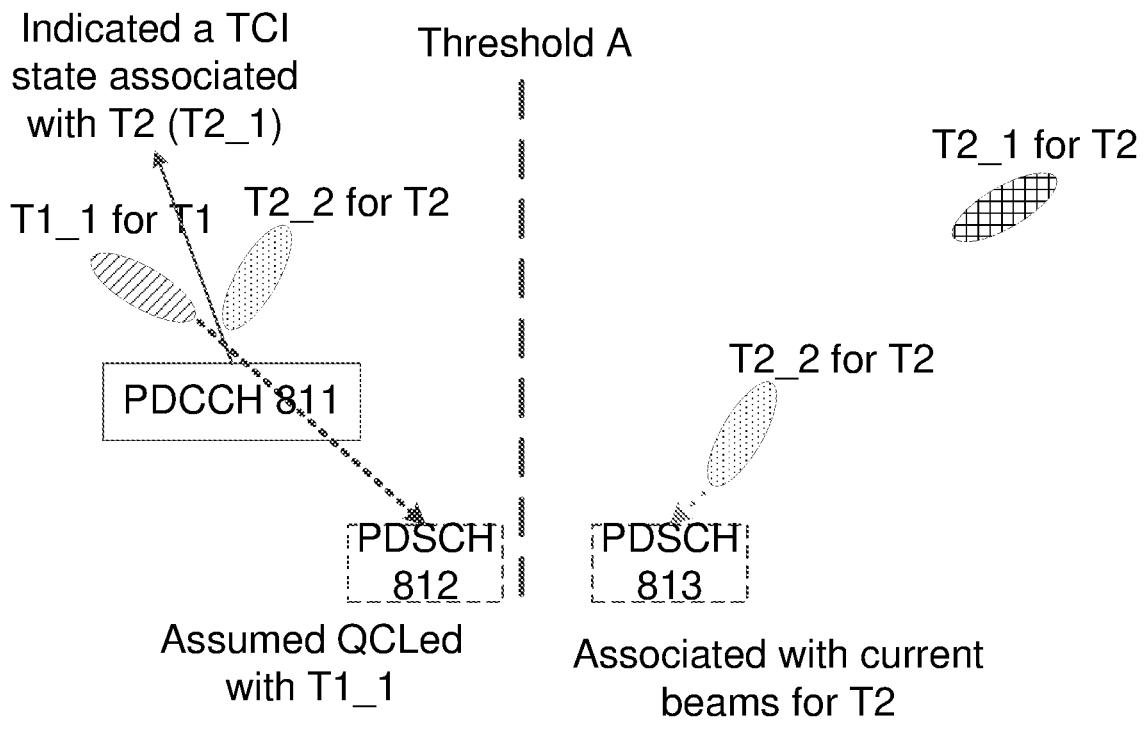
FIGS. 8A-8D illustrate examples of TCI state applying for PDSCH in accordance with some embodiments of the present disclosure.

FIGS. 8A-8D illustrate examples of TCI state applying for PDSCH in accordance with some embodiments of the present disclosure. As shown in FIG. 8A, the terminal device 130 may be configured a TCI state T1_1 for T1, and a TCI state T2_2 for T2 or the terminal device 130 may be configured with T1_1 and T2_2 for a PDCCH/CORESET. For example, the terminal device 130 may receive a PDCCH 811 (which is associated with T1 and T2) with T1_1 and T2_2, and the PDCCH 811 may schedule PDSCH, and the PDCCH 811 may indicate a TCI state T2_1, which is associated with T2. In some embodiments, if the first symbol of the PDSCH is earlier than threshold A (for example, PDSCH 812), the DMRS of PDSCH 812 is associated with TCI state T1_1. In some embodiments, if the first symbol of the PDSCH is not earlier than threshold A (for example, PDSCH 813), the DMRS of PDSCH 813 is associated with TCI state T2_2.

Figure 8B:
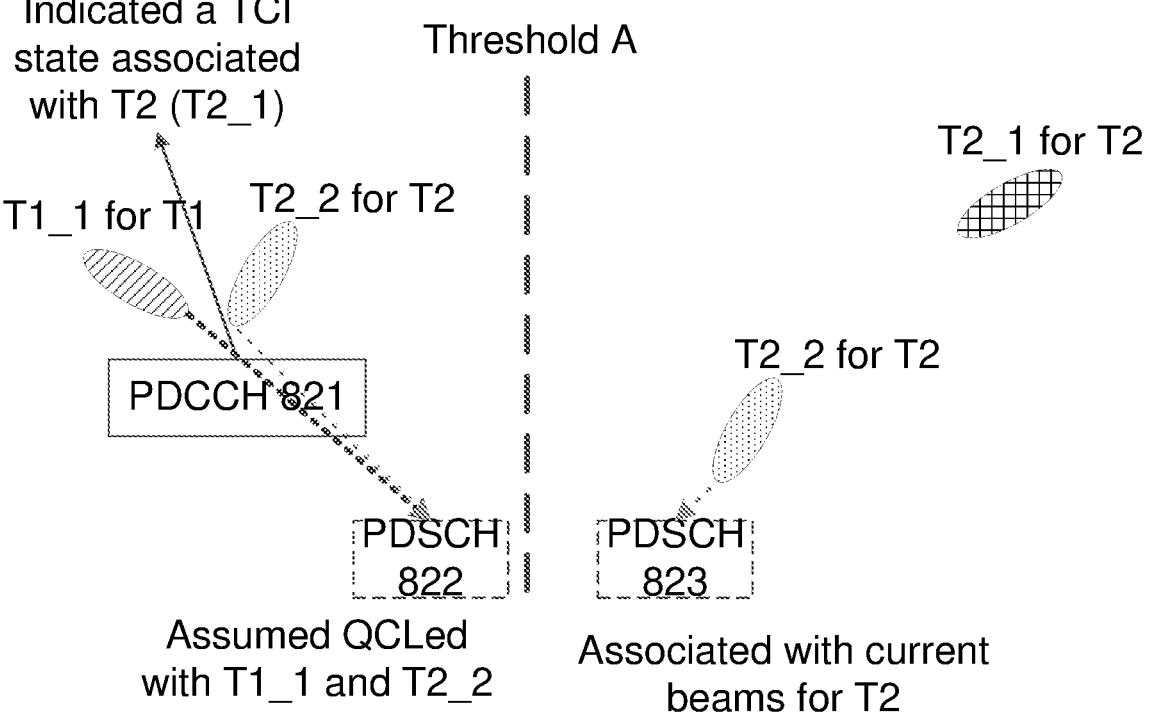

As shown in FIG. 8B, the terminal device 130 may be configured a TCI state T1_1 for T1, and a TCI state T2_2 for T2 or the terminal device 130 may be configured with T1_1 and T2_2 for a PDCCH/CORESET. For example, the terminal device 130 may receive a PDCCH 821 (which is associated with T1 and T2) with T1_1 and T2_2, and the PDCCH 821 may schedule PDSCH, and the PDCCH 821 may indicate a TCI state T2_1, which is associated with T2. In some embodiments, if the first symbol of the PDSCH is earlier than threshold A (for example, PDSCH 822), the DMRS of PDSCH 822 is assumed to be associated with TCI state T1_1 and TCI state T2_2. For example, the terminal device supports two default TCI states. In some embodiments, if the first symbol of the PDSCH is not earlier than threshold A (for example, PDSCH 823), the DMRS of PDSCH 823 is associated with TCI state T2_2.

In some embodiments, the terminal device 130 may be configured with a CORESET, and the CORESET is configured/indicated/activated with a first TCI state and a second TCI state. For example, the first TCI state is associated with the first TRP/subset, and the second TCI state is associated with the second TRP/subset. The terminal device 130 may detect a DCI in a PDCCH in a search space set associated with the CORESET. In some embodiments, the terminal device 130 may be configured with a first subset of CORESETs and a second subset of CORESETs, and the first subset of CORESETs is configured/indicated/activated with a fifth TCI state, and the second subset of CORESETs is configured/indicated/activated with a sixth TCI state. For example, the first TCI state may be same or different from the fifth TCI state. For another example, the second TCI state may be same or different from the sixth TCI state. In some embodiments, the terminal device 130 may be indicated with a third TCI state and a fourth TCI state in the DCI, and the DCI schedules PDSCH transmission(s). In some embodiments, if the third TCI state is associated with the first TRP/subset and the fourth TCI state is associated with the second TRP/subset, the DMRS port(s) of the PDSCH transmission(s) is associated with the first TCI state and the second TCI state. For example, the mapping/association between the PDSCH transmission and the first TCI state and/or the second TCI state is disclosed in some embodiments in this disclosure. For example, if the time offset between the reception of the DCI and the corresponding PDSCH is equal to or greater than a threshold. For example, the threshold may be the first threshold. In some embodiments, if the third TCI state is associated with the first TRP/subset and the fourth TCI state is associated with the second TRP/subset, the DMRS port(s) of the PDSCH transmission(s) is associated with the first TCI state. In some embodiments, if the third TCI state is associated with the first TRP/subset and the fourth TCI state is associated with the second TRP/subset, the DMRS port(s) of the PDSCH transmission(s) is associated with the first TCI state, if the time offset between the reception of the DCI and the corresponding PDSCH is less than a threshold. For example, the threshold may be the first threshold. In some embodiments, the terminal device may assume the DMRS ports(s) of the PDSCH transmission(s) is associated with the first TCI state and the second TCI state if the time offset between the reception of the DCI and the corresponding PDSCH is less than a threshold. For example, the threshold may be the first threshold. For another example, the terminal device supports two default TCI states.

Figure 8C:
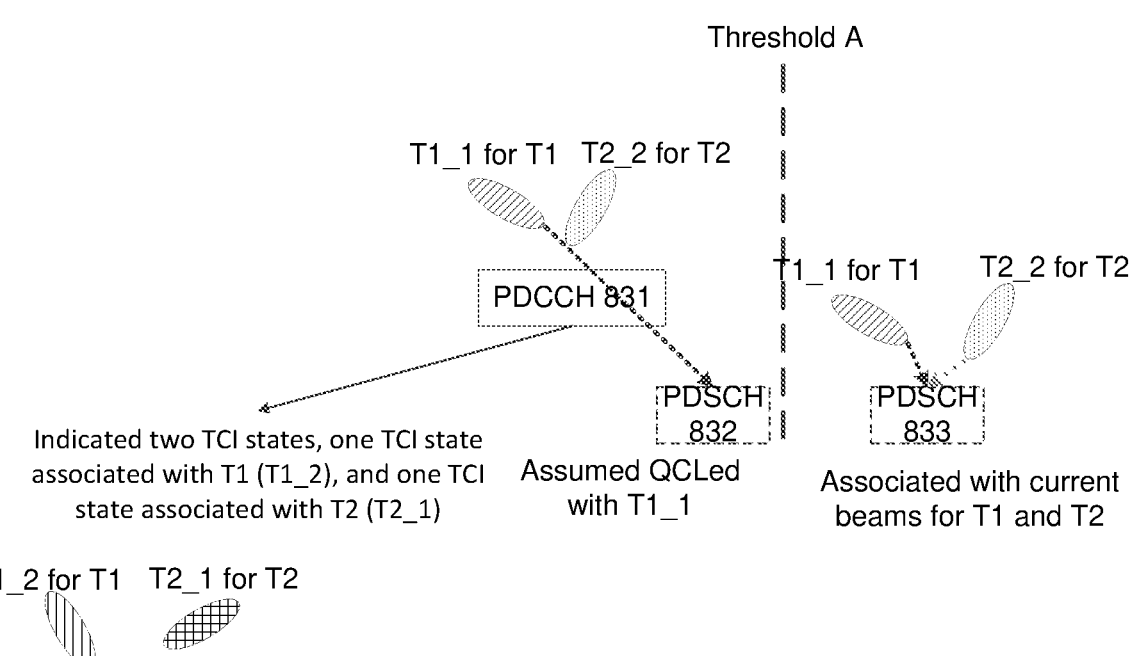

As shown in FIG. 8C, the terminal device 130 may be configured a TCI state T1_1 for T1, and a TCI state T2_2 for T2 or the terminal device 130 may be configured with T1_1 and T2_2 for a PDCCH/CORESET. For example, the terminal device 130 may receive a PDCCH 831 (which is associated with T1 and T2) with T1_1 and T2_2, and the PDCCH 831 may schedule PDSCH, and the PDCCH 831 may indicate a TCI state T1_2 and a TCI state T2_1, and T1_2 is associated with T1, T2_1 is associated with T2. In some embodiments, if the first symbol of the PDSCH is earlier than threshold A (for example, PDSCH 832), the DMRS of PDSCH 832 is associated with TCI state T1_1. In some embodiments, if the first symbol of the PDSCH is not earlier than threshold A (for example, PDSCH 833), the DMRS of PDSCH 833 is associated with TCI state T1_1 and T2_2.

Figure 8D:
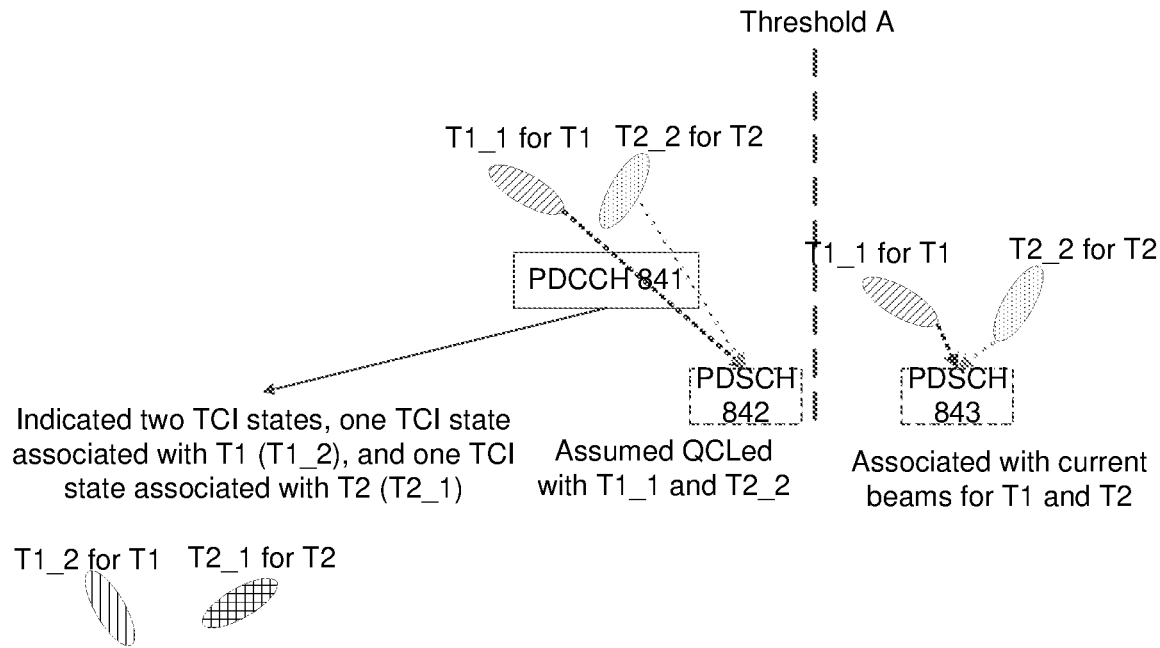

As shown in FIG. 8D, the terminal device 130 may be configured a TCI state T1_1 for T1, and a TCI state T2_2 for T2 or the terminal device 130 may be configured with T1_1 and T2_2 for a PDCCH/CORESET. For example, the terminal device 130 may receive a PDCCH 841 (which is associated with T1 and T2) with T1_1 and T2_2, and the PDCCH 841 may schedule PDSCH, and the PDCCH 841 may indicate a TCI state T1_2 and a TCI state T2_1, and T1_2 is associated with T1, T2_1 is associated with T2. In some embodiments, if the first symbol of the PDSCH is earlier than threshold A (for example, PDSCH 842), the DMRS of PDSCH 842 is assumed to be associated with TCI state T1_1 and TCI state T2_2. For example, the terminal device supports two default TCI states. In some embodiments, if the first symbol of the PDSCH is not earlier than threshold A (for example, PDSCH 843), the DMRS of PDSCH 843 is associated with TCI state T1_1 and TCI state T2_2.

In some embodiments, the terminal device 130 may be configured with a first subset of CORESETs and a second subset of CORESETs, and the first subset of CORESETs is configured/indicated/activated with a first TCI state, and the second subset of CORESETs is configured/indicated/activated with a second TCI state. In some embodiments, the PDCCH in a CORESET from the first subset may indicate a third TCI state, and the third TCI state is associated/applied to the second subset of CORESETs after a timing. For example, the third TCI state may be associated with the second TRP/subset. For example, the timing may be based on the second threshold. For example, TCI state indication/updating cross subsets of CORESETs is supported.

In some embodiments, the terminal device 130 may be configured with a first subset of CORESETs and a second subset of CORESETs, and the first subset of CORESETs is configured/indicated/activated with a first TCI state, and the second subset of CORESETs is configured/indicated/activated with a second TCI state. In some embodiments, the PDCCH in a CORESET from the first subset may indicate a third TCI state, and the third TCI state is not associated/applied to the second subset of CORESETs after a timing. For example, the third TCI state may be associated with the second TRP/subset. For example, the timing may be based on the second threshold. For example, TCI state indication/updating cross subsets of CORESETs is not supported. In other words, TCI state indication/updating for a subset of CORESETs can only be indicated/configured in a PDCCH in a CORESET from the subset.

In some embodiments, the terminal device 130 may be configured with a CORESET, and the CORESET is configured/indicated/activated with a first TCI state and a second TCI state. For example, the first TCI state is associated with the first TRP/subset, and the second TCI state is associated with the second TRP/subset. The terminal device 130 may detect a DCI in a PDCCH in a search space set associated with the CORESET. In some embodiments, the terminal device 130 may be configured with a first subset of CORE-SETs and a second subset of CORESETs, and the first subset of CORESETs is configured/indicated/activated with a fifth TCI state, and the second subset of CORESETs is configured/indicated/activated with a sixth TCI state. For example, the first TCI state may be same or different from the fifth TCI state. For another example, the second TCI state may be same or different from the sixth TCI state. In some embodiments, the PDCCH in the CORESET may indicate a third TCI state. For example, the third TCI state may be associated with the second TRP/subset. In some embodiments, the third TCI state is associated/applied to the second subset of CORESETs after a timing. In some embodiments, the third TCI state is associated/applied to the CORESET after a timing. For example, the third TCI state replaces the second TCI state for the CORESET. For another example, after the timing, the first TCI state and the third TCI state are associated/applied to the CORESET. For example, the timing may be based on the second threshold. For example, a PDCCH in a CORESET with two active TCI states can indicate a TCI state to be applied to the CORESET or applied to the first subset of CORESETs and/or the second subset of CORESETs.

In some embodiments, the terminal device 130 may be configured with a CORESET, and the CORESET is configured/indicated/activated with a first TCI state and a second TCI state. For example, the first TCI state is associated with the first TRP/subset, and the second TCI state is associated with the second TRP/subset. The terminal device 130 may detect a DCI in a PDCCH in a search space set associated with the CORESET. In some embodiments, the terminal device 130 may be configured with a first subset of CORE-SETs and a second subset of CORESETs, and the first subset of CORESETs is configured/indicated/activated with a fifth TCI state, and the second subset of CORESETs is configured/indicated/activated with a sixth TCI state. For example, the first TCI state may be same or different from the fifth TCI state. For another example, the second TCI state may be same or different from the sixth TCI state. In some embodiments, the PDCCH in the CORESET may indicate a third TCI state. For example, the third TCI state may be associated with the second TRP/subset. In some embodiments, the third TCI state is not associated/applied to the second subset of CORESETs after a timing. In some embodiments, the third TCI state is not associated/applied to the CORESET after a timing. For example, the timing may be based on the second threshold. For example, TCI state indicated in a PDCCH in a CORESET with two active TCI states is not applied to the CORESET or not applied to the first subset of CORESETs and/or the second subset of CORESETs.

In some embodiments, the terminal device 130 may be configured with a first subset of CORESETs and a second subset of CORESETs, and the first subset of CORESETs is configured/indicated/activated with a first TCI state, and the second subset of CORESETs is configured/indicated/activated with a second TCI state. The terminal device 130 may detect a DCI in a PDCCH in a search space set associated with one CORESET in the first subset. In some embodiments, the terminal device 130 may be indicated with a third TCI state in the DCI. For example, the DCI may or may not schedule PDSCH transmission(s). In some embodiments, if the third TCI state is associated with the second TRP/subset, the third TCI state is applied to T2 after a timing. For example, the timing may be based on the second threshold. In some embodiments, T1 is associated with the first TCI state.

Figure 9A:
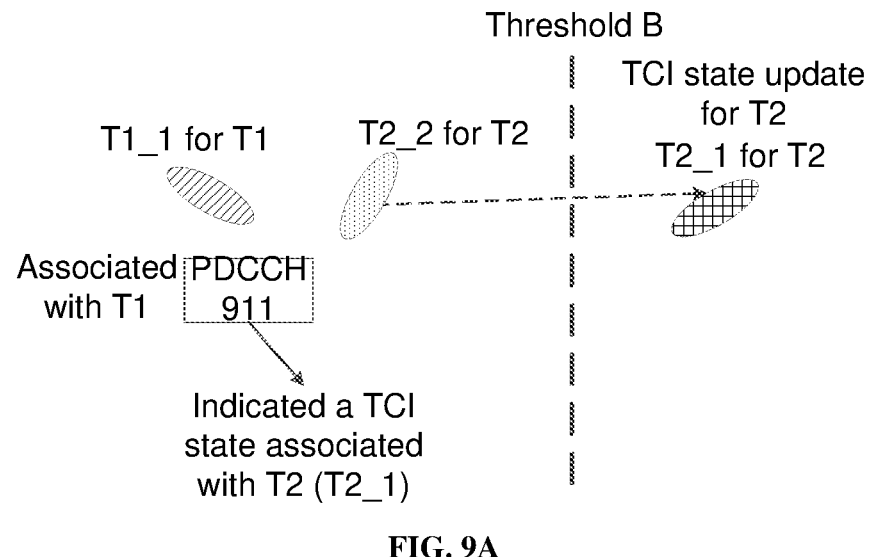
FIGS. 9A-9F illustrate examples of TCI state applying for PDCCH in accordance with some embodiments of the present disclosure.

FIGS. 9A-9F illustrate examples of TCI state applying for PDCCH in accordance with some embodiments of the present disclosure. As shown in FIG. 9A, the terminal device 130 may be configured a TCI state T1_1 for T1, and a TCI state T2_2 for T2. And the terminal device 130 may receive a PDCCH 911 (which is associated with T1) with T1_1, and the PDCCH 911 may indicate a TCI state T2_1, which is associated with T2. For example, the PDCCH 911 may or may not schedule PDSCH. In some embodiments, the TCI state T2_1 is applied/associated to T2 after a timing. For example, the timing may be based on the threshold B.

In some embodiments, the terminal device 130 may be configured with a first subset of CORESETs and a second subset of CORESETs, and the first subset of CORESETs is configured/indicated/activated with a first TCI state, and the second subset of CORESETs is configured/indicated/activated with a second TCI state. The terminal device 130 may detect a DCI in a PDCCH in a search space set associated with one CORESET in the first subset. In some embodiments, the terminal device 130 may be indicated with a third TCI state and a fourth TCI state in the DCI. For example, the DCI may or may not schedule PDSCH transmission(s). In some embodiments, if the third TCI state is associated with the first TRP/subset and the fourth TCI state is associated with the second TRP/subset, the third TCI state is applied to T1 after a timing, and the fourth TCI state is applied to T2 after the timing. For example, the timing may be based on the second threshold.

Figure 9B:
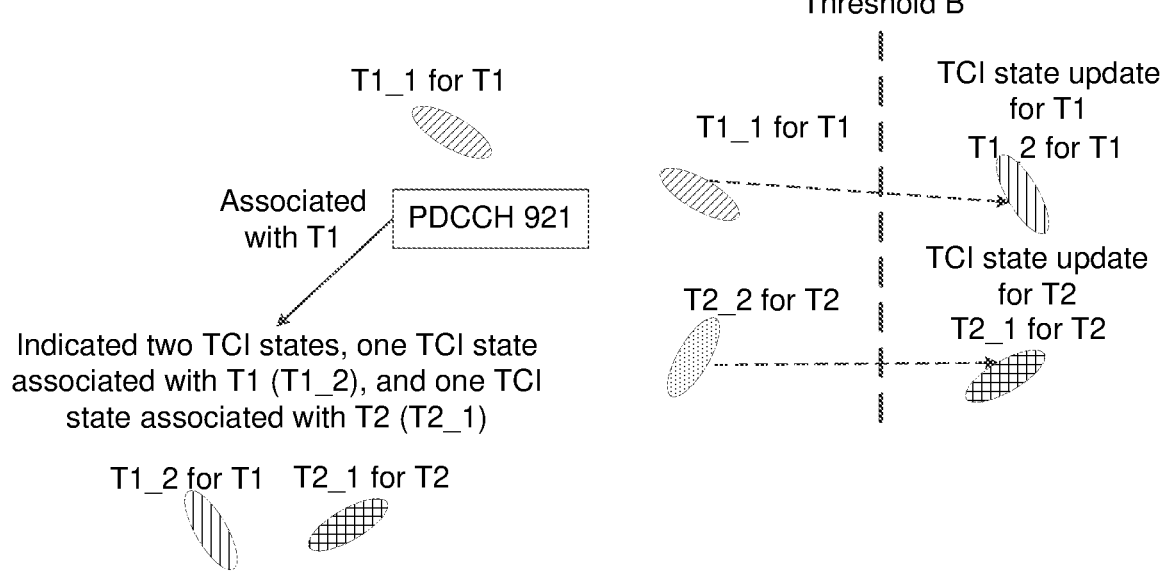

As shown in FIG. 9B, the terminal device 130 may be configured a TCI state T1_1 for T1, and a TCI state T2_2 for T2. And the terminal device 130 may receive a PDCCH 921 (which is associated with T1) with T1_1, and the PDCCH 921 may indicate a TCI state T1_2 and a TCI state T2_1, and T1_2 is associated with T1, T2_1 is associated with T2. For example, the PDCCH 921 may or may not schedule PDSCH transmission(s). In some embodiments, the TCI state T1_2 is applied to T1 after a timing, and the TCI state T2_1 is applied to T2 after the timing. For example, the timing may be based on the second threshold.

In some embodiments, the terminal device 130 may be configured with a first subset of CORESETs and a second subset of CORESETs, and the first subset of CORESETs is configured/indicated/activated with a first TCI state, and the second subset of CORESETs is configured/indicated/activated with a second TCI state. The terminal device may be configured with a first PDCCH in a first search space set in a first CORESET in the first subset associated/linked with a second PDCCH in a second search space set in a second CORESET in the second subset. For example, the first PDCCH and the second PDCCH are two PDCCH repetitions. For another example, the payload in the first PDCCH is same as the payload in the second PDCCH. For another example, the scheduling/indication in the first PDCCH is same as the scheduling/indication in the second PDCCH. For another example, the first PDCCH and the second PDCCH are disclosed in some embodiments in this disclosure. The terminal device 130 may receive the first PDCCH and the second PDCCH. In some embodiments, the terminal device 130 may be indicated with a third TCI state in the DCI of the first PDCCH and second PDCCH. For example, the DCI may or may not schedule PDSCH transmission(s). In some embodiments, if the third TCI state is associated with the second TRP/subset, the third TCI state is applied to T2 after a timing. For example, the timing may be based on the second threshold. In some embodiments, T1 is associated with the first TCI state. In some embodiments, the third TCI state is not associated/applied to the second CORESET. In some embodiments, there is no linkage or association between the first CORESET and the second CORESET after a timing. For example, the PDCCH in the first CORESET and the PDCCH in the second CORESET are not PDCCH repetitions.

Figure 9C:
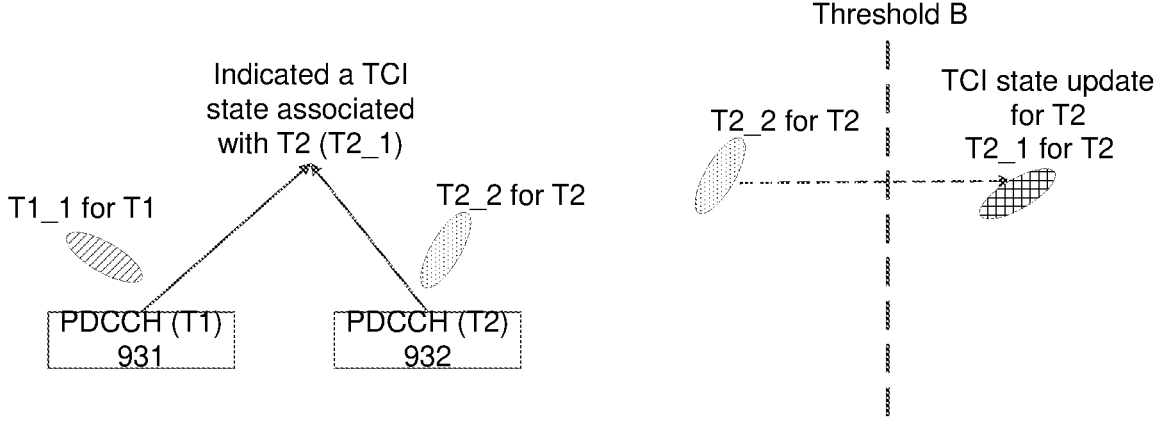

As shown in FIG. 9C, the terminal device 130 may be configured a TCI state T1_1 for T1, and a TCI state T2_2 for T2. And the terminal device 130 may receive PDCCH 931 (which is associated with T1) with T1_1, and receive PDCCH 932 (which is associated with T2) with T2_2, and the PDCCH 931 and PDCCH 932 may indicate a TCI state T2_1, which is associated with T2. For example, and PDCCH 931 and PDCCH 932 may or may not schedule PDSCH. In some embodiments, the TCI state T2_1 is applied/associated to T2 after a timing. For example, the timing may be based on the second threshold.

In some embodiments, the terminal device 130 may be configured with a first subset of CORESETs and a second subset of CORESETs, and the first subset of CORESETs is configured/indicated/activated with a first TCI state, and the second subset of CORESETs is configured/indicated/activated with a second TCI state. The terminal device may be configured with a first PDCCH in a first search space set in a first CORESET in the first subset associated/linked with a second PDCCH in a second search space set in a second CORESET in the second subset. For example, the first PDCCH and the second PDCCH are two PDCCH repetitions. For another example, the payload in the first PDCCH is same as the payload in the second PDCCH. For another example, the scheduling/indication in the first PDCCH is same as the scheduling/indication in the second PDCCH. For another example, the first PDCCH and the second PDCCH are disclosed in some embodiments in this disclosure. The terminal device 130 may receive the first PDCCH and the second PDCCH. In some embodiments, the terminal device 130 may be indicated with a third TCI state and a fourth TCI state in the DCI of the first PDCCH and second PDCCH. For example, and the DCI may or may not schedule PDSCH transmission(s). In some embodiments, if the third TCI state is associated with the first TRP/subset and the fourth TCI state is associated with the second TRP/subset, the third TCI state is applied to T1 after a timing, and the fourth TCI state is applied to T2 after the timing. For example, the timing may be based on the second threshold. In some embodiments, the third TCI state is not associated/applied to the first CORESET and the fourth TCI state is not associated/applied to the second CORESET. In some embodiments, there is no linkage or association between the first CORESET and the second CORESET after a timing. For example, the PDCCH in the first CORESET and the PDCCH in the second CORESET are not PDCCH repetitions.

Figure 9D:
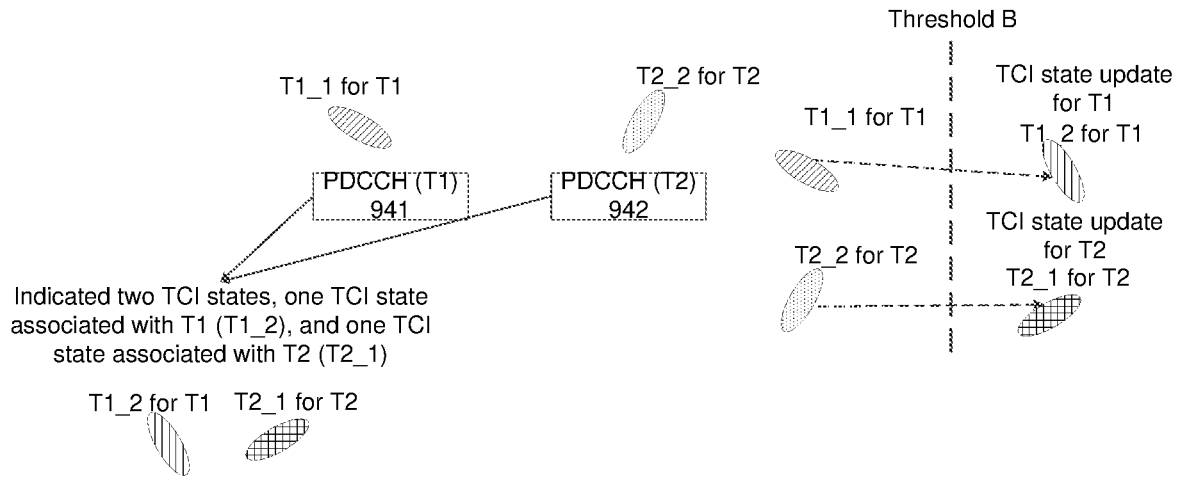

As shown in FIG. 9D, the terminal device 130 may be configured a TCI state T1_1 for T1, and a TCI state T2_2 for T2. And the terminal device 130 may receive PDCCH 941 (which is associated with T1) with T1_1, and receive PDCCH 942 (which is associated with T2) with T2_2, and the PDCCH 771 and PDCCH 772 may indicate a TCI state T1_2 and a TCI state T2_1, and T1_2 is associated with T1, T2_1 is associated with T2. For example, the PDCCH 771 and PDCCH 772 may or may not schedule PDSCH. In some embodiments, the TCI state T1_2 is applied to T1 after a timing, and the TCI state T2_1 is applied to T2 after the timing. For example, the timing may be based on the second threshold.

Figure 9E:
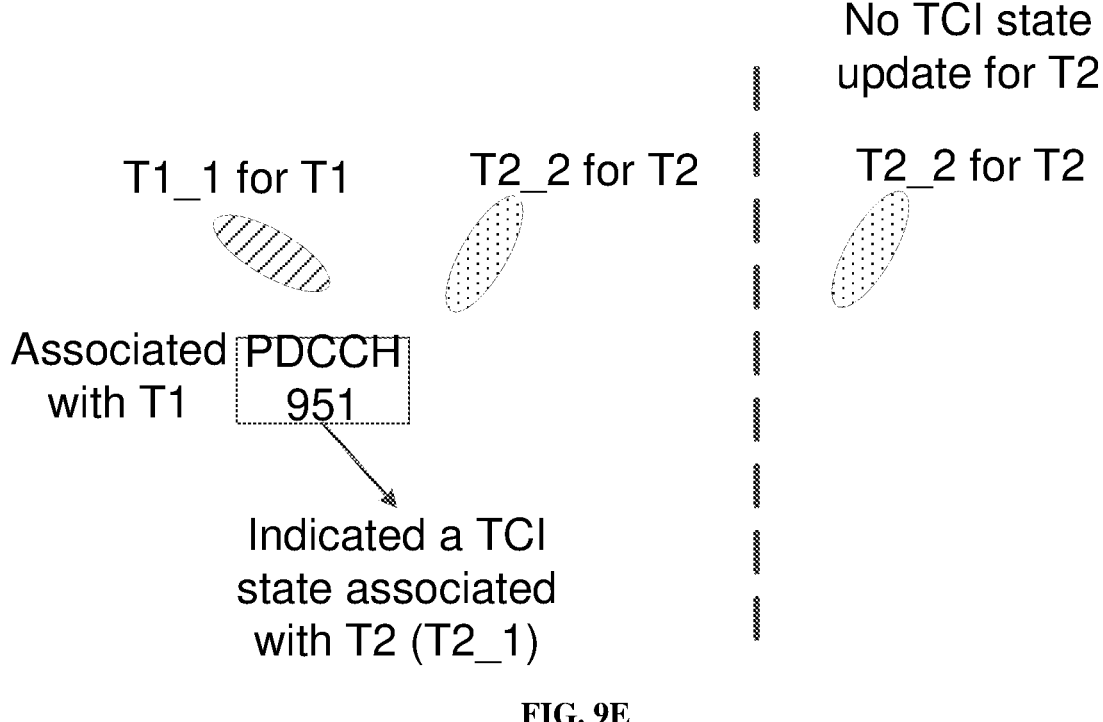

As shown in FIG. 9E, the terminal device 130 may be configured a TCI state T1_1 for T1, and a TCI state T2_2 for T2. And the terminal device 130 may receive a PDCCH 951 (which is associated with T1) with T1_1, and the PDCCH 951 may indicate a TCI state T2_1, which is associated with T2. For example, the PDCCH 951 may or may not schedule PDSCH. In some embodiments, the TCI state T2_1 is not applied/associated to T2. In other words, TCI state 2_2 is still applied/associated to T2.

Figure 9F:
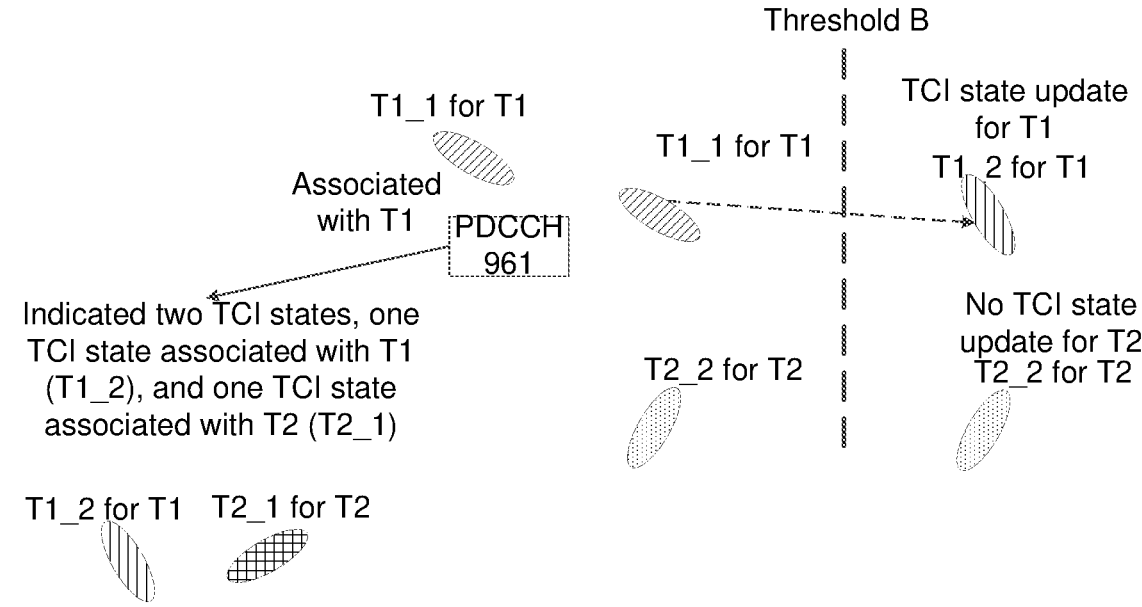

As shown in FIG. 9F, the terminal device 130 may be configured a TCI state T1_1 for T1, and a TCI state T2_2 for T2. And the terminal device 130 may receive a PDCCH 961 (which is associated with T1) with T1_1, and the PDCCH 961 may indicate a TCI state T1_2 and a TCI state T2_1, and T1_2 is associated with T1, T2_1 is associated with T2. For example, the PDCCH 961 may or may not schedule PDSCH transmission(s). In some embodiments, the TCI state T1_2 is applied to T1 after a timing, and the TCI state T2_1 is not applied to T2 after the timing. For example, the timing may be based on the second threshold. For example, the TCI state T2_2 is still applied to T2.

In some embodiments, the terminal device 130 may be configured with a CORESET, and the CORESET is configured/indicated/activated with a first TCI state and a second TCI state. For example, the first TCI state is associated with the first TRP/subset, and the second TCI state is associated with the second TRP/subset. The terminal device 130 may detect a DCI in a PDCCH in a search space set associated with the CORESET. In some embodiments, the terminal device 130 may be configured with a first subset of CORE-SETs and a second subset of CORESETs, and the first subset of CORESETs is configured/indicated/activated with a fourth TCI state, and the second subset of CORESETs is configured/indicated/activated with a fifth TCI state. For example, the first TCI state may be same or different from the fourth TCI state. For another example, the second TCI state may be same or different from the fifth TCI state. In some embodiments, the terminal device 130 may be indicated with a third TCI state in the DCI, and the DCI schedules PDSCH transmission(s). In some embodiments, if the third TCI state is associated with the second TRP/subset, the third TCI state is applied to T2 after a timing. For example, the timing may be based on the second threshold. In some embodiments, T1 is associated with the first TCI state. In some embodiments, the third TCI state is not associated/applied to the CORESET.

As shown in FIG. 8A, the terminal device 130 may be configured a TCI state T1_1 for T1, and a TCI state T2_2 for T2 or the terminal device 130 may be configured with T1_1 and T2_2 for a PDCCH/CORESET. For example, the terminal device 130 may receive a PDCCH 811 (which is associated with T1 and T2) with T1_1 and T2_2, and the PDCCH 811 may schedule PDSCH, and the PDCCH 811 may indicate a TCI state T2_1, which is associated with T2. In some embodiments, if the first symbol of the PDSCH is earlier than threshold A (for example, PDSCH 812), the DMRS of PDSCH 812 is associated with TCI state T1_1. In some embodiments, if the first symbol of the PDSCH is not earlier than threshold A (for example, PDSCH 813), the DMRS of PDSCH 813 is associated with TCI state T2_2.

As shown in FIG. 8B, the terminal device 130 may be configured a TCI state T1_1 for T1, and a TCI state T2_2 for T2 or the terminal device 130 may be configured with T1_1 and T2_2 for a PDCCH/CORESET. For example, the terminal device 130 may receive a PDCCH 821 (which is associated with T1 and T2) with T1_1 and T2_2, and the PDCCH 821 may schedule PDSCH, and the PDCCH 821 may indicate a TCI state T2_1, which is associated with T2. In some embodiments, if the first symbol of the PDSCH is earlier than threshold A (for example, PDSCH 822), the DMRS of PDSCH 822 is assumed to be associated with TCI state T1_1 and TCI state T2_2. For example, the terminal device supports two default TCI states. In some embodiments, if the first symbol of the PDSCH is not carlier than threshold A (for example, PDSCH 823), the DMRS of PDSCH 823 is associated with TCI state T2_2.

In some embodiments, the terminal device 130 may be configured with a CORESET, and the CORESET is configured/indicated/activated with a first TCI state and a second TCI state. For example, the first TCI state is associated with the first TRP/subset, and the second TCI state is associated with the second TRP/subset. The terminal device 130 may detect a DCI in a PDCCH in a search space set associated with the CORESET. In some embodiments, the terminal device 130 may be configured with a first subset of CORE-SETs and a second subset of CORESETs, and the first subset of CORESETs is configured/indicated/activated with a fifth TCI state, and the second subset of CORESETs is configured/indicated/activated with a sixth TCI state. For example, the first TCI state may be same or different from the fifth TCI state. For another example, the second TCI state may be same or different from the sixth TCI state. In some embodiments, the terminal device 130 may be indicated with a third TCI state and a fourth TCI state in the DCI, and the DCI schedules PDSCH transmission(s). In some embodiments, if the third TCI state is associated with the first TRP/subset and the fourth TCI state is associated with the second TRP/subset, the DMRS port(s) of the PDSCH transmission(s) is associated with the first TCI state and the second TCI state. For example, the mapping/association between the PDSCH transmission and the first TCI state and/or the second TCI state is disclosed in some embodiments in this disclosure. For example, if the time offset between the reception of the DCI and the corresponding PDSCH is equal to or greater than a threshold. For example, the threshold may be the first threshold. In some embodiments, if the third TCI state is associated with the first TRP/subset and the fourth TCI state is associated with the second TRP/subset, the DMRS port(s) of the PDSCH transmission(s) is associated with the first TCI state. In some embodiments, if the third TCI state is associated with the first TRP/subset and the fourth TCI state is associated with the second TRP/subset, the DMRS port(s) of the PDSCH transmission(s) is associated with the first TCI state, if the time offset between the reception of the DCI and the corresponding PDSCH is less than a threshold. For example, the threshold may be the first threshold. In some embodiments, the terminal device may assume the DMRS ports(s) of the PDSCH transmission(s) is associated with the first TCI state and the second TCI state if the time offset between the reception of the DCI and the corresponding PDSCH is less than a threshold. For example, the threshold may be the first threshold. For another example, the terminal device supports two default TCI states.

As shown in FIG. 8C, the terminal device 130 may be configured a TCI state T1_1 for T1, and a TCI state T2_2 for T2 or the terminal device 130 may be configured with T1_1 and T2_2 for a PDCCH/CORESET. For example, the terminal device 130 may receive a PDCCH 831 (which is associated with T1 and T2) with T1_1 and T2_2, and the PDCCH 831 may schedule PDSCH, and the PDCCH 831 may indicate a TCI state T1_2 and a TCI state T2_1, and T1_2 is associated with T1, T2_1 is associated with T2. In some embodiments, if the first symbol of the PDSCH is carlier than threshold A (for example, PDSCH 832), the DMRS of PDSCH 832 is associated with TCI state T1_1. In some embodiments, if the first symbol of the PDSCH is not earlier than threshold A (for example, PDSCH 833), the DMRS of PDSCH 833 is associated with TCI state T1_1 and T2_2.

As shown in FIG. 8D, the terminal device 130 may be configured a TCI state T1_1 for T1, and a TCI state T2_2 for T2 or the terminal device 130 may be configured with T1_1 and T2_2 for a PDCCH/CORESET. For example, the terminal device 130 may receive a PDCCH 841 (which is associated with T1 and T2) with T1_1 and T2_2, and the PDCCH 841 may schedule PDSCH, and the PDCCH 841 may indicate a TCI state T1_2 and a TCI state T2_1, and T1_2 is associated with T1, T2_1 is associated with T2. In some embodiments, if the first symbol of the PDSCH is earlier than threshold A (for example, PDSCH 842), the DMRS of PDSCH 842 is assumed to be associated with TCI state T1_1 and TCI state T2_2. For example, the terminal device supports two default TCI states. In some embodiments, if the first symbol of the PDSCH is not earlier than threshold A (for example, PDSCH 843), the DMRS of PDSCH 843 is associated with TCI state T1_1 and TCI state T2_2.

In some embodiments, the terminal device 130 may be configured with a first subset of CORESETs and a second subset of CORESETs, and the first subset of CORESETs is configured/indicated/activated with a first TCI state, and the second subset of CORESETs is configured/indicated/activated with a second TCI state. In some embodiments, the PDCCH in a CORESET from the first subset may indicate a third TCI state, and the third TCI state is associated/applied to the second subset of CORESETs after a timing. For example, the third TCI state may be associated with the second TRP/subset. For example, the timing may be based on the second threshold. For example, TCI state indication/updating cross subsets of CORESETs is supported.

In some embodiments, the terminal device 130 may be configured with a first subset of CORESETs and a second subset of CORESETs, and the first subset of CORESETs is configured/indicated/activated with a first TCI state, and the second subset of CORESETs is configured/indicated/activated with a second TCI state. In some embodiments, the PDCCH in a CORESET from the first subset may indicate a third TCI state, and the third TCI state is not associated/applied to the second subset of CORESETs after a timing. For example, the third TCI state may be associated with the second TRP/subset. For example, the timing may be based on the second threshold. For example, TCI state indication/updating cross subsets of CORESETs is not supported. In other words, TCI state indication/updating for a subset of CORESETs can only be indicated/configured in a PDCCH in a CORESET from the subset.

In some embodiments, the terminal device 130 may be configured with a CORESET, and the CORESET is configured/indicated/activated with a first TCI state and a second TCI state. For example, the first TCI state is associated with the first TRP/subset, and the second TCI state is associated with the second TRP/subset. The terminal device 130 may detect a DCI in a PDCCH in a search space set associated with the CORESET. In some embodiments, the terminal device 130 may be configured with a first subset of CORE-SETs and a second subset of CORESETs, and the first subset of CORESETs is configured/indicated/activated with a fifth TCI state, and the second subset of CORESETs is configured/indicated/activated with a sixth TCI state. For example, the first TCI state may be same or different from the fifth TCI state. For another example, the second TCI state may be same or different from the sixth TCI state. In some embodiments, the PDCCH in the CORESET may indicate a third TCI state. For example, the third TCI state may be associated with the second TRP/subset. In some embodiments, the third TCI state is associated/applied to the second subset of CORESETs after a timing. In some embodiments, the third TCI state is associated/applied to the CORESET after a timing. For example, the third TCI state replaces the second TCI state for the CORESET. For another example, after the timing, the first TCI state and the third TCI state are associated/applied to the CORESET. For example, the timing may be based on the second threshold. For example, a PDCCH in a CORESET with two active TCI states can indicate a TCI state to be applied to the CORESET or applied to the first subset of CORESETs and/or the second subset of CORESETs.

In some embodiments, the terminal device 130 may be configured with a CORESET, and the CORESET is configured/indicated/activated with a first TCI state and a second TCI state. For example, the first TCI state is associated with the first TRP/subset, and the second TCI state is associated with the second TRP/subset. The terminal device 130 may detect a DCI in a PDCCH in a search space set associated with the CORESET. In some embodiments, the terminal device 130 may be configured with a first subset of CORE-SETs and a second subset of CORESETs, and the first subset of CORESETs is configured/indicated/activated with a fifth TCI state, and the second subset of CORESETs is configured/indicated/activated with a sixth TCI state. For example, the first TCI state may be same or different from the fifth TCI state. For another example, the second TCI state may be same or different from the sixth TCI state. In some embodiments, the PDCCH in the CORESET may indicate a third TCI state. For example, the third TCI state may be associated with the second TRP/subset. In some embodiments, the third TCI state is not associated/applied to the second subset of CORESETs. In some embodiments, the third TCI state is not associated/applied to the CORESET. For example, TCI state indicated in a PDCCH in a CORESET with two active TCI states is not applied to the CORESET or not applied to the first subset of CORESETs and/or the second subset of CORESETs.

In some embodiments, the terminal device 130 may be configured with a CORESET, and the CORESET is configured/indicated/activated with a first TCI state and a second TCI state. In some embodiments, a DCI detected in a PDCCH associated with the CORESET may indicate one or two TCI states. And the one or two TCI states are not applied to the CORESET and/or the first subset of CORESETs and/or the second subset of CORESETs and/or the first TRP and/or the second TRP. For example, after a timing based on the second threshold.

In some embodiments, the terminal device 130 may be configured with a first subset of CORESETs and a second subset of CORESETs, and the first subset of CORESETs is configured/indicated/activated with a first TCI state, and the second subset of CORESETs is configured/indicated/activated with a second TCI state. In some embodiments, the terminal device may be configured with a first PDCCH in a first search space set in a first CORESET in the first subset associated/linked with a second PDCCH in a second search space set in a second CORESET in the second subset. For example, the first PDCCH and the second PDCCH are two PDCCH repetitions. For another example, the payload in the first PDCCH is same as the payload in the second PDCCH. For another example, the scheduling/indication in the first PDCCH is same as the scheduling/indication in the second PDCCH. For another example, the first PDCCH and the second PDCCH are disclosed in some embodiments in this disclosure. For example, the terminal device 130 may receive the first PDCCH and the second PDCCH. In some embodiments, the terminal device 130 may be indicated with one or two TCI states in the DCI of the first PDCCH and second PDCCH. And the one or two TCI states are not applied to a CORESET with two activated TCI states and/or the first subset of CORESETs and/or the second subset of CORESETs and/or the first TRP and/or the second TRP. For example, after a timing based on the second threshold.

In some embodiments, the terminal device 130 may be indicated with two TCI states in a DCI in a PDCCH or in two linked PDCCH candidates. And the DCI schedules a PDSCH transmission. For example, the two TCI states are applied to the PDSCH. In some embodiments, the two TCI states are not applied to a CORESET with two activated TCI states and/or the first subset of CORESETs and/or the second subset of CORESETs and/or the first TRP and/or the second TRP. For example, after a timing based on the second threshold. In some embodiments, the two TCI states indicated for a PDSCH transmission is not suitable for common beam/TCI state indication/update for one TRP/subset.

Figure 10:
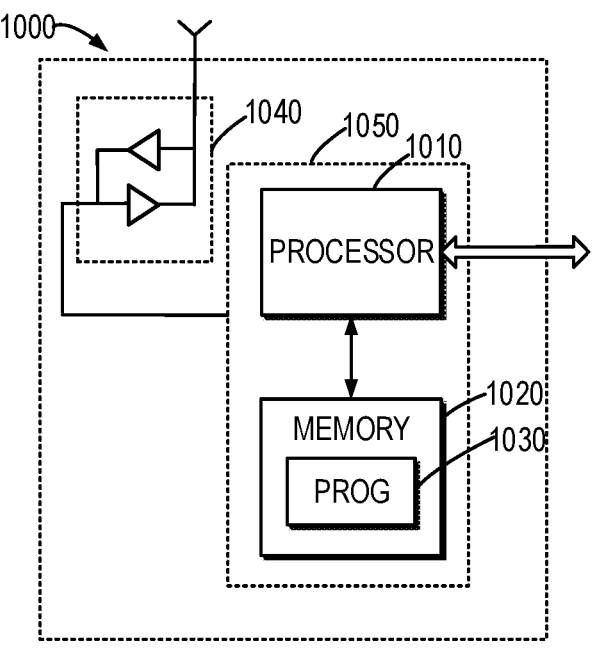
FIG. 10 is a simplified block diagram of a device that is suitable for implementing embodiments of the present disclosure.

FIG. 10 is a simplified block diagram of a device 1000 that is suitable for implementing embodiments of the present disclosure. The device 1000 can be considered as a further example implementation of the network device 110 or the terminal device 130 as shown in FIG. 1 and/or FIG. 2. Accordingly, the device 1000 can be implemented at or as at least a part of the network device 110 or the terminal device 130 as shown in FIG. 1 and/or FIG. 2.

As shown, the device 1000 includes a processor 1010, a memory 1020 coupled to the processor 1010, a suitable transmitter (TX) and receiver (RX) 1040 coupled to the processor 1010, and a communication interface coupled to the TX/RX 1040. The memory 1010 stores at least a part of a program 1030. The TX/RX 1040 is for bidirectional communications. The TX/RX 1040 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the CNB, Un interface for communication between the CNB and a relay node (RN), or Uu interface for communication between the eNB and a terminal device.

The program 1030 is assumed to include program instructions that, when executed by the associated processor 1010, enable the device 1000 to operate in accordance with the embodiments of the present disclosure, as discussed herein with reference to FIGS. 1 to 0. The embodiments herein may be implemented by computer software executable by the processor 1010 of the device 1000, or by hardware, or by a combination of software and hardware. The processor 1010 may be configured to implement various embodiments of the present disclosure. Furthermore, a combination of the processor 1010 and memory 1020 may form processing means 1050 adapted to implement various embodiments of the present disclosure.

The memory 1020 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1020 is shown in the device 1000, there may be several physically distinct memory modules in the device 1000. The processor 1010 may be of any type suitable to the local technical network, and may include one or more of general purpose computers, special purpose computers, microprocessors, digital signal processors (DSPs) and processors based on multicore processor architecture, as non-limiting examples. The device 1000 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIG. 6 and/or FIG. 7. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context

US 12,695,582 B2

53 / 54 of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method of communication, performed by a terminal device, comprising:

receiving, from a network device, at least one configuration of a first set of transmission configuration indicator (TCI) states and a second set of TCI states, wherein the first set of TCI states is associated with a first identity, and the second set of TCI states is associated with a second identity;

receiving a downlink control information (DCI) with an indication of a codepoint corresponding to one of a first TCI state from the first set of TCI states or a second TCI state from the second set of TCI states; and receiving, after a timing, a first physical downlink control channel (PDCCH) with the first TCI state, in a case where the first PDCCH is in a control resource set (CORESET) associated with a first set of CORESETs, receiving, after the timing, the first PDCCH with the second TCI state, in a case where the first PDCCH is in a CORESET associated with a second set of CORESETs, wherein the timing is based on a configured time period and a last symbol of a physical uplink control channel (PUCCH) or a physical uplink shared channel (PUSCH) with a hybrid automatic repeat request (HARQ).

2. The method of claim 1, wherein
the first identity is a first control resource set (CORESET) pool index, and the second identity is a second CORESET pool index.

3. The method of claim 1, wherein
the codepoint corresponds to one TCI state from the first set of TCI states, in a case where the DCI is in a PDCCH in the first set of CORESETs, and the codepoint corresponds to one TCI state from the second set of TCI states, in a case where the DCI is in a PDCCH in the second set of CORESETs.

4. A method of communication, performed by a network device, comprising:

transmitting, to a terminal device, at least one configuration of a first set of transmission configuration indicator (TCI) states and a second set of TCI states, wherein the first set of TCI states is associated with a first identity, and the second set of TCI states is associated with a second identity;

transmitting a downlink control information (DCI) with an indication of a codepoint corresponding to one of a first TCI state from the first set of TCI states or a second TCI state from the second set of TCI states; and transmitting, after a timing, a first physical downlink control channel (PDCCH) with the first TCI state, in a case where the first PDCCH is in a control resource set (CORESET) associated with a first set of CORESETs, transmitting, after the timing, the first PDCCH with the second TCI state, in a case where the first PDCCH is in a CORESET associated with a second set of CORESETs, wherein the timing is based on a configured time period and a last symbol of a physical uplink control channel (PUCCH) or a physical uplink shared channel (PUSCH) with a hybrid automatic repeat request (HARQ).

5. The method of claim 4, wherein
the first identity is a first control resource set (CORESET) pool index, and the second identity is a second CORESET pool index.

6. The method of claim 4, wherein
the codepoint corresponds to one TCI state from the first set of TCI states, in a case where the DCI is in a PDCCH in the first set of CORESETs, and the codepoint corresponds to one TCI state from the second set of TCI states, in a case where the DCI is in a PDCCH in the second set of CORESETs.

7. A terminal device, comprising:

at least one processor configured to cause the terminal device to:

receive, from a network device, at least one configuration of a first set of transmission configuration indicator (TCI) states and a second set of TCI states, wherein the first set of TCI states is associated with a first identity, and the second set of TCI states is associated with a second identity;

receive a downlink control information (DCI) with an indication of a codepoint corresponding to one of a first TCI state from the first set of TCI states or and a second TCI state from the second set of TCI states; and receive, after a timing, a first physical downlink control channel (PDCCH) with the first TCI state, in a case where the first PDCCH is in a control resource set (CORESET) associated with a first set of CORESETs, receive, after the timing, the first PDCCH with the second TCI state, in a case where the first PDCCH is in a CORESET associated with a second set of CORESETs, wherein the timing is based on a configured time period and a last symbol of a physical uplink control channel (PUCCH) or a physical uplink shared channel (PUSCH) with a hybrid automatic repeat request (HARQ).

8. The terminal device of claim 7, wherein
the first identity is a first control resource set (CORESET) pool index, and the second identity is a second CORESET pool index.

9. The terminal device of claim 7, wherein the codepoint corresponds to one TCI state from the first set of TCI states, in a case where the DCI is in a PDCCH in the first set of CORESETs, and the codepoint corresponds to one TCI state from the second set of TCI states, in a case where the DCI is in a PDCCH in the second set of CORESETs.

10. A network device, comprising:

at least one processor configured to cause the network device to:

transmit, to a terminal device, at least one configuration of a first set of transmission configuration indicator (TCI) states and a second set of TCI states, wherein the first set of TCI states is associated with a first identity, and the second set of TCI states is associated with a second identity;

transmit a downlink control information (DCI) with an indication of a codepoint corresponding to one of a first TCI state from the first set of TCI states or and a second TCI state from the second set of TCI states; and transmit, after a timing, a first physical downlink control channel (PDCCH) with the first TCI state, in a case where the first PDCCH is in a control resource set (CORESET) associated with a first set of CORESETs, transmit, after the timing, the first PDCCH with the second TCI state, in a case where the first PDCCH is in a CORESET associated with a second set of CORE-SETs, wherein the timing is based on a configured time period and a last symbol of a physical uplink control channel (PUCCH) or a physical uplink shared channel (PUSCH) with a hybrid automatic repeat request (HARQ).

11. The network device of claim 10, wherein the first identity is a first control resource set (CORESET) pool index, the second identity is a second CORESET pool index.

12. The network device of claim 10, wherein the codepoint corresponds to one TCI state from the first set of TCI states, in a case where the DCI is in a PDCCH in the first set of CORESETs, and the codepoint corresponds to one TCI state from the second set of TCI states, in a case where the DCI is in a PDCCH in the second set of CORESETs.

* * * * *